(12) United States Patent
Kawazu et al.

(10) Patent No.: US 7,242,116 B2
(45) Date of Patent: Jul. 10, 2007

(54) SAFETY CONTROLLER

(75) Inventors: Mugen Kawazu, Takatsuki (JP);
Toshiyuki Higuchi, Fukuchiyama (JP);
Hisashi Takeuchi, Kyoto (JP);
Ryuichiro Takaichi, Kyoto (JP);
Noboru Kawaike, Kyoto (JP)

(73) Assignees: Japan Control Engineering Co., Ltd., Takatsuki (JP); Omron Corporation, Kyoto-Shi (JP)

(*) Notice: Subject to any disclaimer, the term of this patent is extended or adjusted under 35 U.S.C. 154(b) by 571 days.

(21) Appl. No.: 10/775,338

(22) Filed: Feb. 11, 2004

(65) Prior Publication Data

US 2004/0218317 A1    Nov. 4, 2004

(30) Foreign Application Priority Data

Feb. 12, 2003  (JP)  ............................. 2003-076578
Mar. 13, 2003  (JP)  ............................. 2003-068942

(51) Int. Cl.
*H02J 11/00*    (2006.01)
(52) U.S. Cl. .................................................... 307/326
(58) Field of Classification Search ................ 307/326, 307/134
See application file for complete search history.

(56) References Cited

U.S. PATENT DOCUMENTS 4,415,884 A    11/1983   Delin et al.
5,628,013 A *  5/1997   Anderson et al. ............ 718/107
6,388,563 B1 * 5/2002   Brown et al. ............. 340/286.02

FOREIGN PATENT DOCUMENTS

| EP | 1 396 963 A1 | | 3/2004 |
|---|---|---|---|
| JP | 02118465 A | * | 5/1990 |
| WO | WO 02/067065 A | | 8/2002 |
| WO | WO 02/098065 A | | 12/2002 |

* cited by examiner

*Primary Examiner*—Robert L. DeBeradinis
(74) *Attorney, Agent, or Firm*—Foley & Lardner LLP

(57) ABSTRACT

A basic module 2 has operation program storing part for prescribing the relation between the state of a safety input signal to be fetched from external input terminal sections 32, 33 and the state of a safety output signal to be transmitted to external output terminal sections 41, 42 for each type of predetermined safety switches, type-of-switch setting part for setting external input terminal sections 31, 32 and the type of safety switches to be connected to the external input terminal sections, and operation program executing part for selecting a safety operation program corresponding to the type of the switch set by the setting part among a plurality of types of safety operation programs stored in the operation program storing part and executing the selected program for the external input terminal sections 31, 32 set by the setting part.

14 Claims, 62 Drawing Sheets

Fig. 21

| Type | Address | Bytes | Data | Value range |
|---|---|---|---|---|
| Common specification setting, Basic module setting | 0 | 2 | CRC | 0~FFFFh |
| | 2 | 30 | Delay time table | 0~300 |
| | 20 | 1 | (reserve) | |
| | 21 | 1 | Daly mode | 0: Off-ready<br>1: On-ready |
| | 22 | 2 | Delay time | 0~300 |
| | 24 | 1 | Main module: Operation mode | 0: 2N.C (Emergency stop switch or the like)<br>1: 1N.C + 1N.O<br>2: Two-hand switch<br>3: Mat switch<br>4: Light curtain |
| | 25 | 1 | (reserve) | |
| | 26 | 30 | Digital filter value | 1~255 |
| | 30 | 1 | Allowance of time difference between safety input systems | 0: Infinite, 1 - 255 |
| | 31 | 1 | Maximum time of manual reset on | 0: Infinite, 1 - 255 |
| | 32 | 8 | Format data | |
| | 3A | 2 | (reserve) | |
| | 3C | 4 | Hardware version | 0.00~99.99 |
| Expansion module setting | 40 | 16 | Connection module 1 | |
| | 50 | 16 | Connection module 2 | |
| | 60 | 16 | Connection module 3 | |
| | 70 | 16 | Connection module 4 | |
| | 80 | 16 | Connection module 5 | |
| | 90 | 16 | Connection module 6 | |
| | A0 | 16 | Connection module 7 | |
| | B0 | 16 | Connection module 8 | |

Fig. 22

| Type | Address | Bytes | Data | Value range |
|---|---|---|---|---|
| Expansion input module | 0 | 1 | Module ID | 00H : No connection<br>11H : Input module<br>12H : Input module 1 for specific switch<br>13H : Input module 2 for specific switch<br>14H : Input module 3 for specific switch |
| | 1 | 1 | Operation mode | 0 : Emergency stop<br>1 : Emergency stop + Input 1 reversal<br>2 : Two hands<br>3 : Mat<br>4 : Light curtain |
| | 2 | 1 | Allowance of time difference between safety input systems | 0: Infinite, 1 - 255 |
| | 3 | 1 | (reserve) | |
| | 4 | 2 | Digital filter value | 1~255 |
| | 6 | 1 | Operation mode | 0 : Emergency stop<br>1 : Emergency stop + Input 1 reversal<br>2 : Two hands<br>3 : Mat<br>4 : Light curtain |
| | 7 | 1 | Allowance of time difference between safety input systems | 0: Infinite, 1 - 255 |
| | 8 | 1 | (reserve) | |
| | 9 | 2 | Digital filter value | 1~255 |
| | B | 1 | (reserve) | |
| | C | 4 | Hardware version | 0.00~99.99 |

Fig. 23

| Type | Address | Bytes | Data | Value range |
|---|---|---|---|---|
| Expansion output module | 0 | 1 | Module ID | 00H : No connection<br>01H : AC semiconductor output module<br>02H : Relay output module |
| | 1 | 1 | Delay mode | 0 : Off-ready<br>1 : On-ready |
| | 2 | 2 | Delay time | 0~300 |
| | 4 | 8 | (reserve) | |
| | C | 4 | Hardware version | 0.00~99.99 |

Fig. 37

| Input | Mode 1 byte | Diagnosis result | | | | | Reference 1 byte | Remarks |
|---|---|---|---|---|---|---|---|---|
| | | Trouble of self-input section of table 1 2 byte | Trouble of other input section of table 2 2 byte | Short between safety inputs of table 3 2 byte | Disconnection of tables 4 and 6 2 byte | Trouble of monitor circuit of table 5 2 byte | | |
| Basic | 0 | | | | | | | |
| Expansion 1 | 2 | −1 | −1 | −1 | 1 | −1 | 2 | |
| Expansion 2 | 3 | −1 | −1 | −1 | 0 | −1 | 2 | |
| . | | −1 | −1 | 0 | −1 | −1 | 2 | |
| . | | | | | | | | |
| Expansion 8 | −1 | | | | | | 2 | |

Modes: Modes stored in EEPROM
  0: Emergency stop
  1: Emergency stop + Input-1 active reversal
  2: Two hands
  3: Mat
  4: Light curtain
  −1: No connection Results 0: Diagnosis unexecuted
  (Regularly cleared depending on system)
  −1: Normal end
  1: Trouble first time
  2: Trouble second time

Fig. 43A  Memory map of history generation area
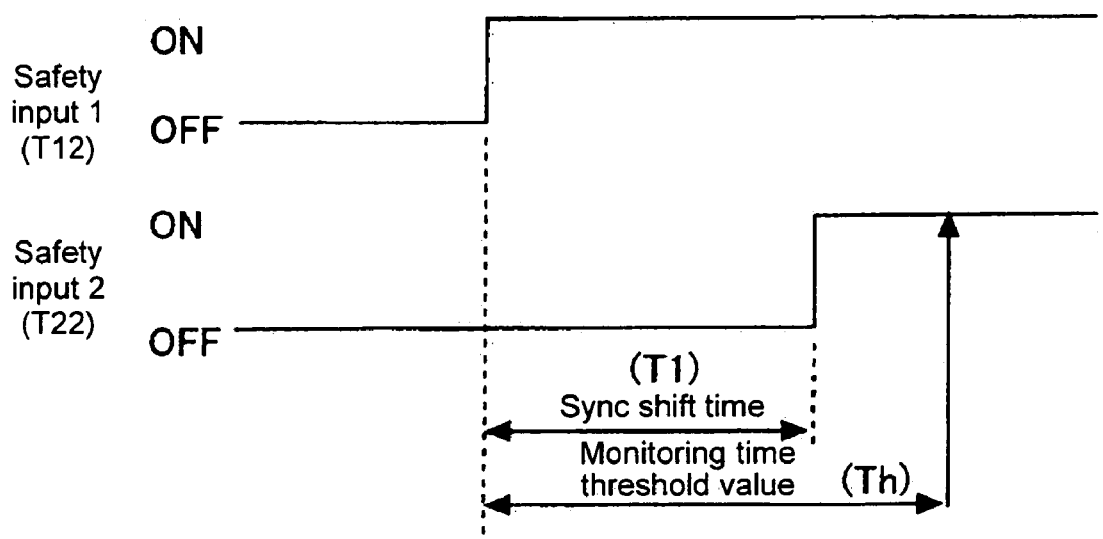
Fig. 43B  Waveform diagram for explaining contact welding diagnosis theory

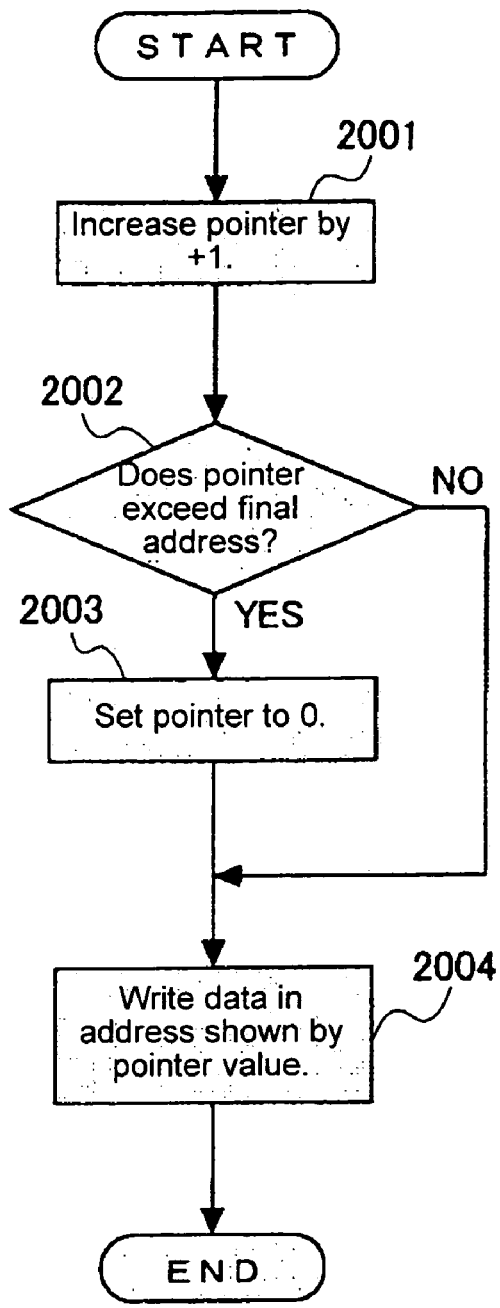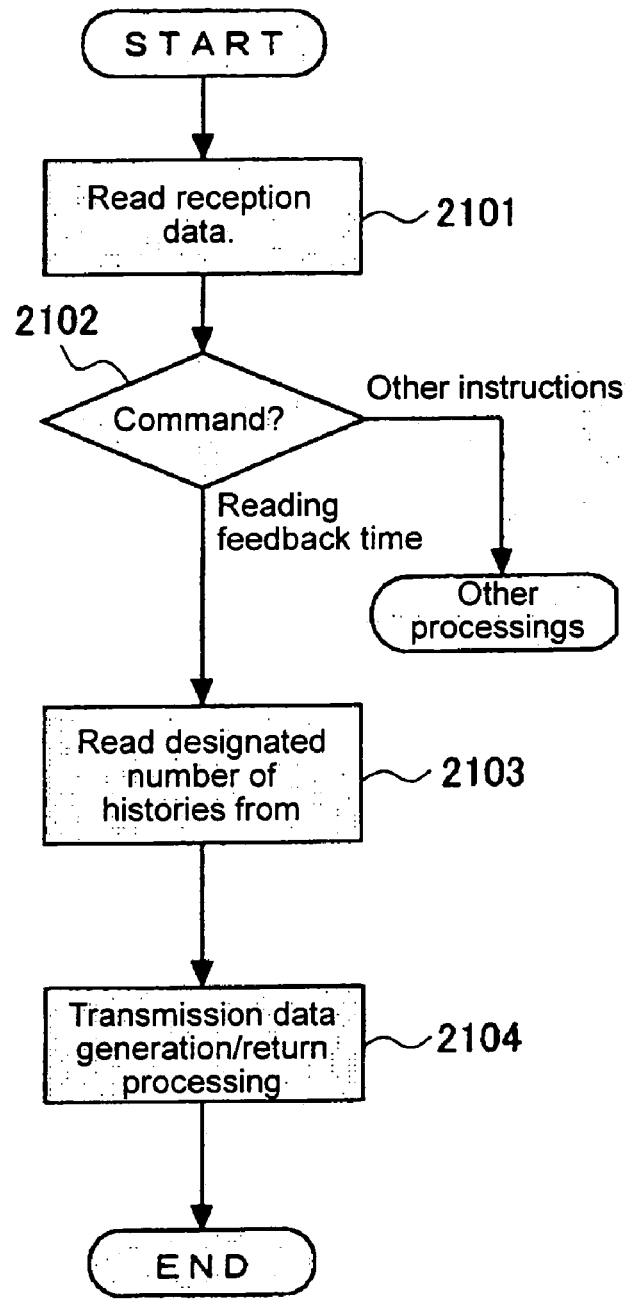
Fig. 56A History generation processing
Fig. 56B History read processing

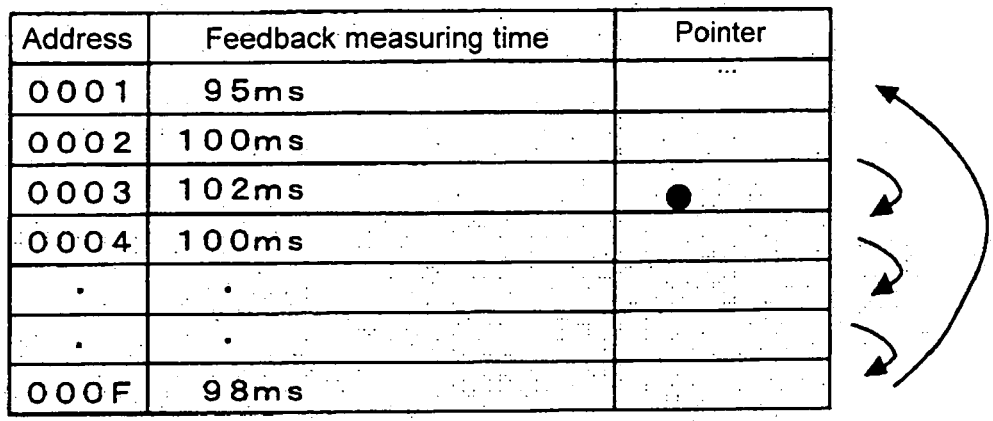
Fig. 57A  Memory map of history generation area
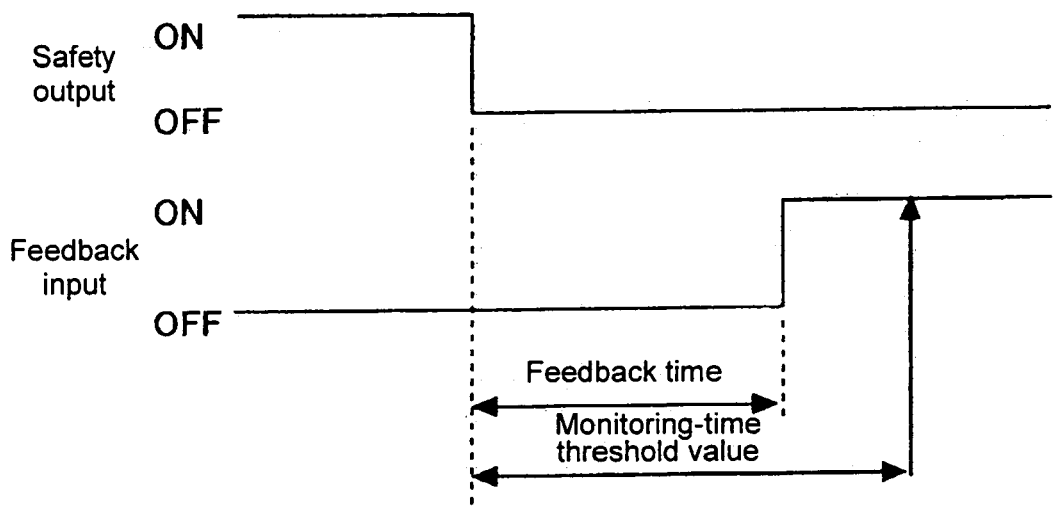
Fig. 57B  Waveform diagram for explaining contact welding diagnosis theory

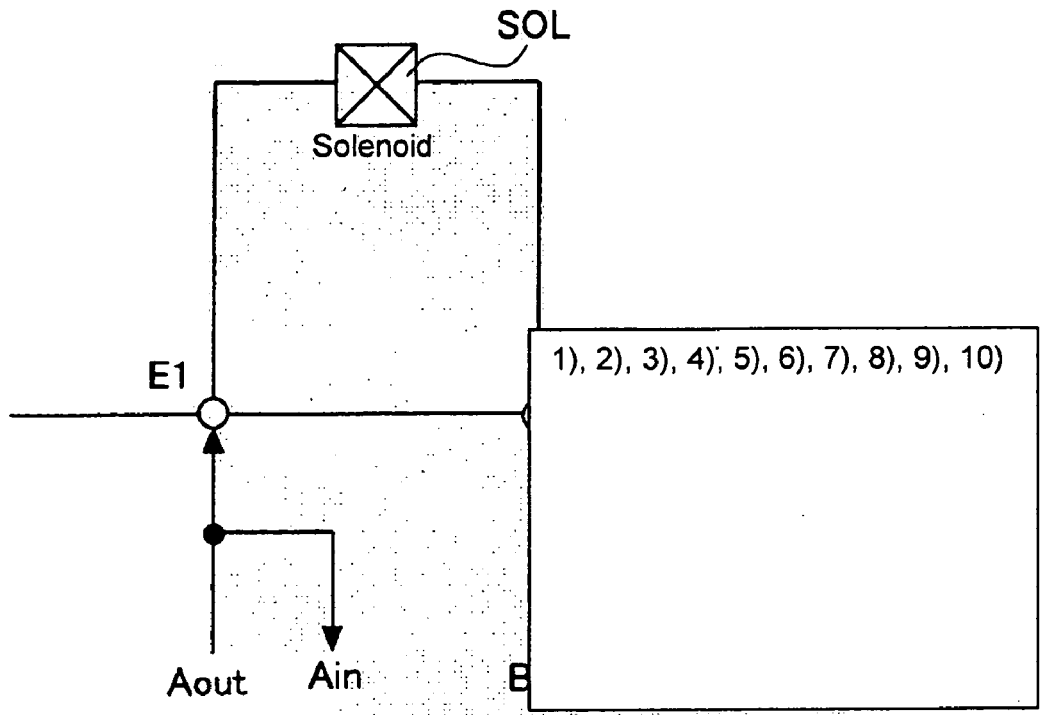
Fig. 60A  Block diagram of input circuit
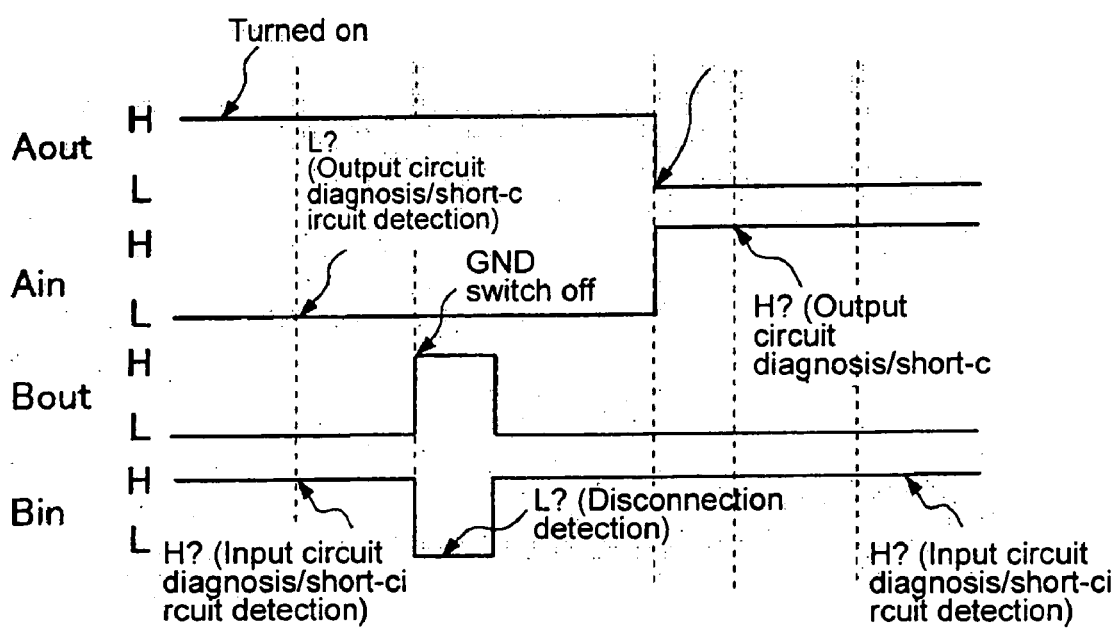
Fig. 60B  Waveform diagram for explaining diagnosis theory

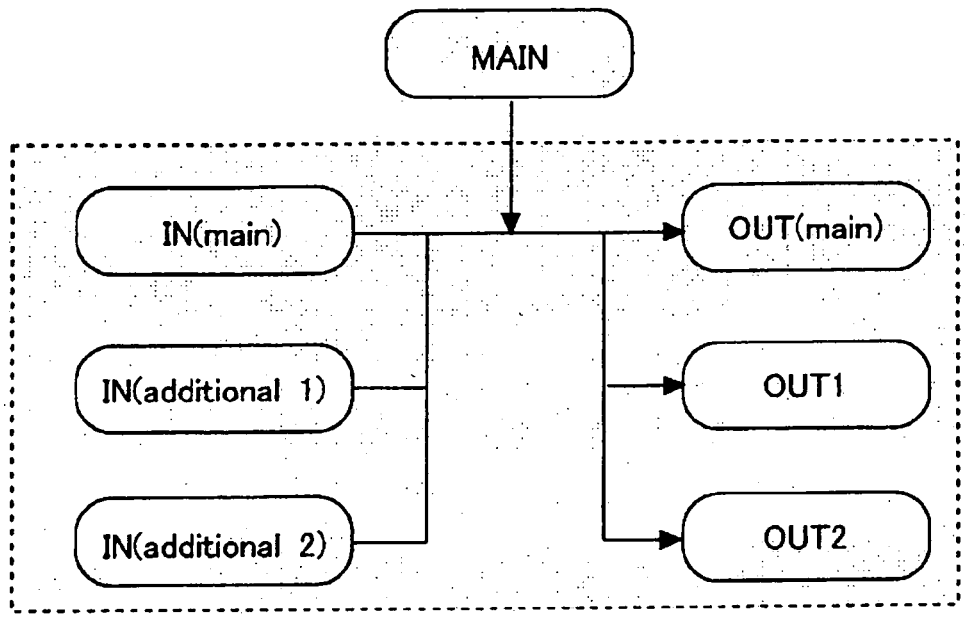
Fig. 61A  Simultaneously turning off outputs corresponding to OR
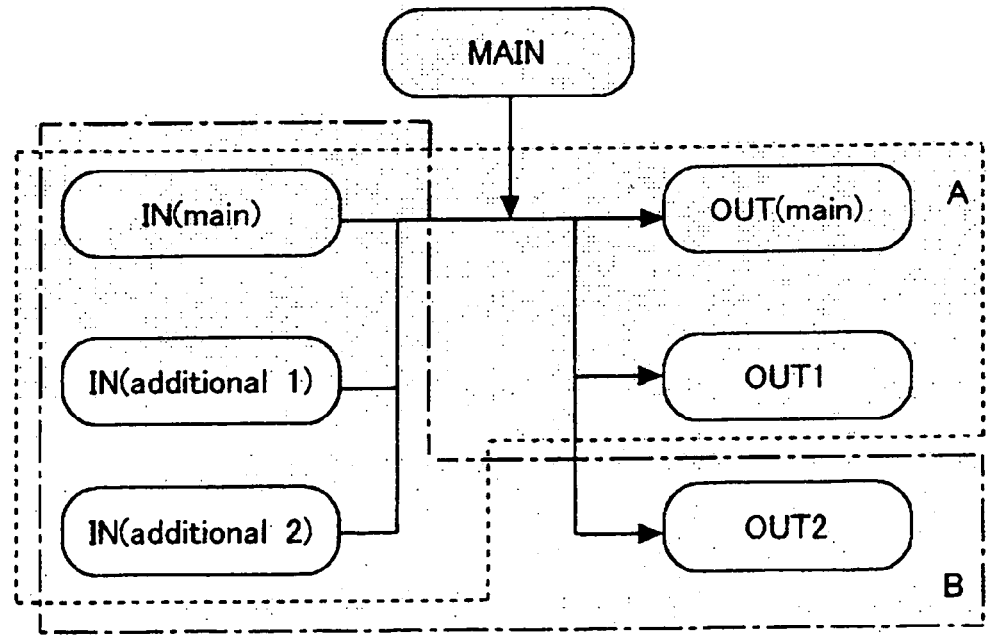
Fig. 61B  Simultaneously turning off outputs corresponding to moment and delay

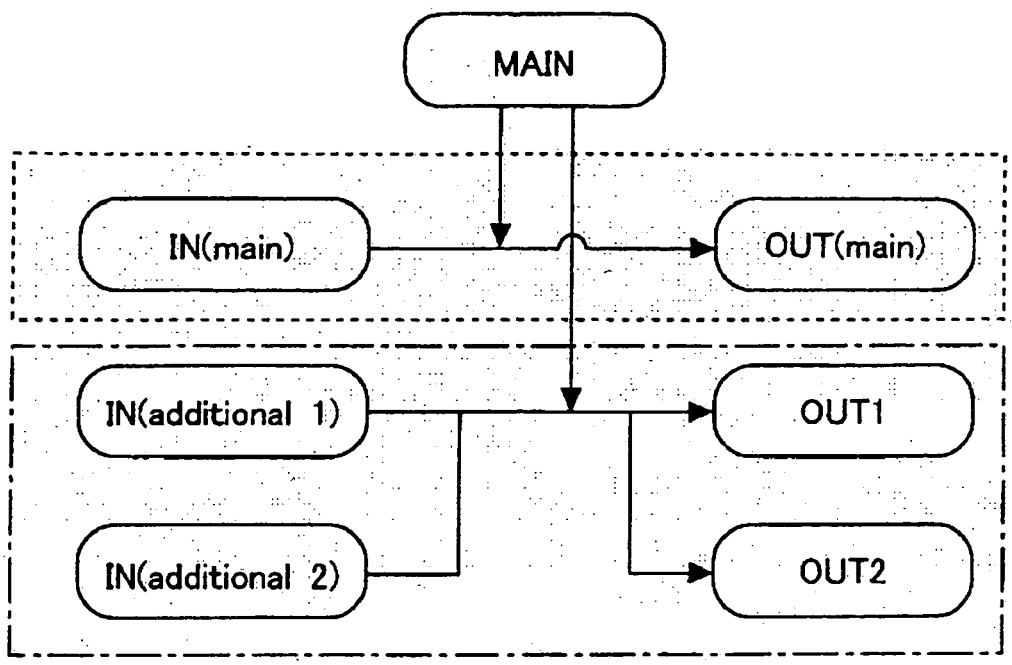
Fig. 62A Output division off corresponding to each input
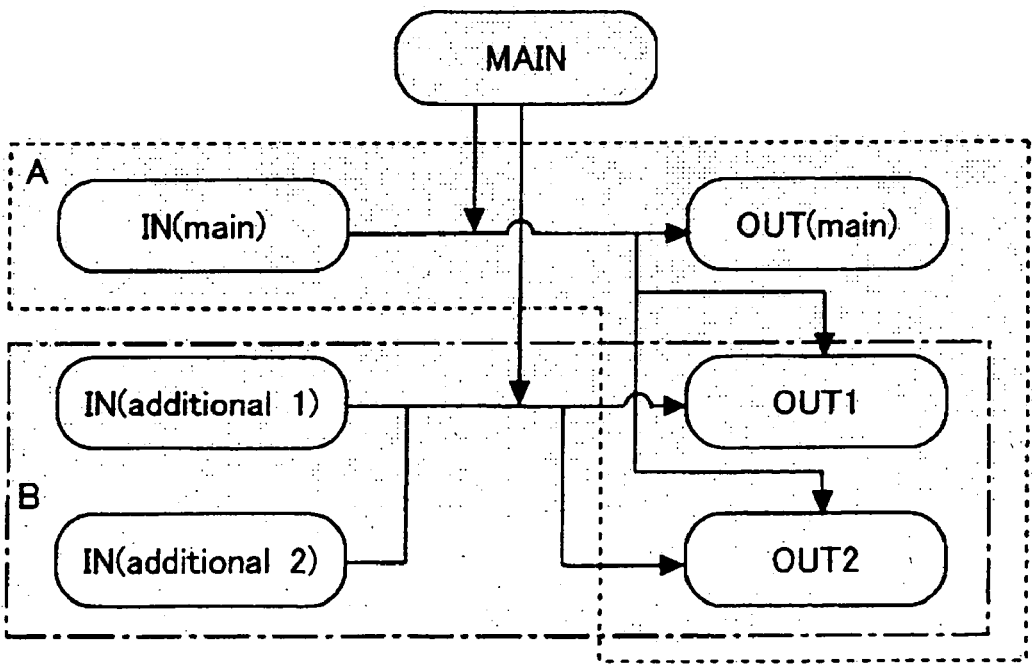
Fig. 62B Output division (partially duplicated) off corresponding to each input

SAFETY CONTROLLER

BACKGROUND OF THE INVENTION

1. Field of the Invention

The present invention relates to a safety controller preferable for construction of a safety system (safety operation system) in a factory, particularly to a safety controller set between various safety switches and production equipment which may be a dangerous source to execute the control for avoiding a state in which a worker is exposed to danger.

2. Description of the Prior Art

To construct a safety system in a factory, various safety controllers are used. The basic function of this type of safety controllers executes the control for stopping production equipment by determining a state in which a worker is exposed to danger between various types of safety switches (e.g. emergency stop switch, two-hand-control switch, mat switch, safety limit switch, light curtain, and electromagnetically-locking safety door switch) and production equipment (robot arm, machine tool, and conveyer).

A safety PCL (Programmable Logic Controller) and a safety relay unit are known as conventional safety controllers. The safety PLC is a controller whose operation reliability is improved compared to a normal PLC by duplexing hardware and software or adding a troubleshooting function. The safety relay unit is a unit having a built-in exclusive safety relay set between a safety switch and production equipment. A safety relay unit is conventionally known which can be applied to various types of safety switches by automatically recognizing the type of a connected safety switch and changing a program to a corresponding operation program (for example, refer to Patent Document 1).

Patent Document 1 is National Publication of International Patent Application No. 2001-521669.

However, because the safety PLC is basically a PLC, it is necessary for a vendor who is a user or an end user to prepare an operation program for prescribing the relation between a signal input from a safety switch and a signal output to a dangerous source. Therefore, the above mentioned is troublesome and a programming error easily occurs. Moreover, the above mentioned is very troublesome because it is necessary to obtain an approval on whether the safety standard is satisfied whenever installation of an operation program in the safety PLC is completed when installing the program in equipment to be exported to Europe which requests a severe safety standard. Furthermore, when the number of safety switches increases and addition of operation programs is necessary because of expansion of equipment in a production line, it is necessary that the added operation programs are newly approved by the safety standard. Therefore, the same problem as described above occurs.

In the case of the safety relay unit, an operation for prescribing the relation between a signal input from a safety switch and a signal output to a dangerous source is fixed in hardware or software. Therefore, if the unit is approved by the safety standard when the unit is shipped, it is not necessary that the unit is repeatedly approved by the standard when installation of the unit in an actual safety system is completed. However, because an exclusive unit is necessary every type of safety switch, it is necessary to purchase an exclusive safety relay unit every type of switch in order to correspond to a safety system including various types of safety switches. Thus, ordering is troublesome and stock management requires a lot of time and the cost will be increased. Moreover, also whenever expanding equipment in a production line, it is necessary to purchase a relay unit corresponding to a newly added safety. Therefore, the cost will be increased.

Because the safety relay unit having a built-in CPU and being able to be applied to various types of safety switches described in Patent Document 1 can be applied to only one safety switch, a plurality of safety switches respectively having a built-in CPU is necessary in order to correspond to a safety system including a plurality of safety switches and therefore, the cost will be extremely increased.

SUMMARY OF THE INVENTION

The present invention is made to solve the above problems and its object is to provide a safety controller which is able to set a necessary operation program to any type of safety switch as long as the switch is any one of a plurality of predetermined safety switches and moreover which does not have to obtain a safety standard approval whenever it is built in a safety system when it is exported to Europe.

It is another object of the present invention to provide a safety controller having a high expandability and capable of reducing the cost for constructing a safety system including many safety switches or expanding safety switches of an existing safety system.

A person skilled in the art will be able to easily understand still another object or effect of the present invention by referencing the description of the following specification.

A safety controller of the present invention has a basic module, one or more expansion modules, and a mother board provided with an expansion slot for connecting the modules by a bus.

An input expansion module which is one of the expansion modules includes one or more external input terminal sections capable of connecting one or more safety switches and an input circuit for receiving safety signals from one or more external terminal sections. In this case, a "safety switch" denotes a switch or sensor for detecting a state when a person approaches an apparatus or machine which is a dangerous source or stopping the machine. Specifically, a safety switch, emergency stop switch, two-hand-control switch, tape switch, and light curtain correspond to the switch or sensor. These safety switches are respectively provided with a fail-safe function or troubleshooting function and the safety or reliability of them is improved by multiplexing hardware or software. The number of terminals or the terminal arrangement of each of these safety switches depends on the type of the terminals. Therefore, the number of external terminals corresponding to any predetermined type of safety switches to be connected is prepared. Moreover, the input circuit includes a circuit configuration capable of transmitting or receiving a desired signal to or from each external terminal even if any predetermined type of safety switches is connected.

An output expansion module which is one of the expansion modules includes an external output terminal section which can be connected to the output control system of a dangerous source and an output circuit for transmitting a safety output signal to the external output terminal section. In this case, the "output control system of the dangerous source" denotes the control circuit of a magnet switch (such as magnet contactor: electromagnetic contactor) for turning on/off a driving source such as one of a robot arm, machine tool, and conveyer which are dangerous sources. The number of units or devices to be connected to an external output terminal section is not restricted to one. Therefore, a necessary number of external output terminals are prepared for the external output terminal section in accordance with an assumed output control system. An output device constituting an output circuit can use not only an electromagnetic relay but also a solid-state relay (SSR) having a built-in semiconductor switching device. The number of these output devices is properly decided in accordance with the number of external output terminals.

The basic module includes operation program storing part for storing a safety operation program for defining the relation between the state of a safety input signal and the state of a safety output signal every predetermined type of safety switch, type-of-switch setting part for setting an external input terminal section and the type of safety switch to be connected to the external input terminal section, and operation program executing part for selecting a safety operation program corresponding to the type of switch set by the setting part among a plurality of types of safety operation programs stored in the operation program storing part and executing the selected program for the external input terminal section set by the setting part. In this case, the "safety operation program" denotes, in short, a program for realizing operations for determining the operation state (on-state/off-state) of each of safety switches connected to one or more external input terminal sections correspondingly to the configuration of each safety switch, generating a final output state by applying these determination results to a specified logic, and transmitting the final output state to the unit or device connected to each external terminal of the external output terminal section. As a general example, in the case of a safety system, only when all safety switches are turned on, the magnet contactor of the driving source (such as motor) of a dangerous source is turned on and when any one of the safety switches is turned off, the contactor is turned off. However, it is a matter of course that there are also exceptions.

According to the above configuration, only by setting a type of safety switch to be connected to an external output terminal section, the safety operation program concerned is automatically executed. Therefore, only by connecting a safety switch and an output device or unit to the external input terminal section or external output terminal section concerned, it is possible to easily and quickly construct a desired safety system without preparing a safety operation program like the case of a safety PLC. Moreover, because a specified program is used as a safety operation program, by obtaining the approval of a safety standard once when the program is shipped from the factory, it is thereafter unnecessary to newly obtain a safety-standard approval even if any safety system is constructed. Therefore, it is possible to smoothly export the program to Europe which requires a safety-standard approval. Furthermore, when constructing a safety system including many safety switches or expanding an existing safety system, it is only necessary to expand an expansion module and then perform the same setting operation. Therefore, there is an advantage that a very high expansion flexibility of a system is obtained.

In the case of a preferred embodiment of the present invention, it is allowed that an emergency stop switch is included as a predetermined type of safety switch, and a safety operation program corresponding to the emergency stop switch executes;

a first step of detecting a short circuit, disconnection, or discontinuity of each system by supplying output signals of two systems having on- and off-signals to the external terminal section of an input expansion module whose set switch type is an emergency stop switch through the bus connection, capturing input signals of two systems from emergency stop switches corresponding to the output signals respectively through a break contact, and confirming whether the input signals correspond to the output signals respectively and on- and off-signals can be obtained, a second step of detecting a disconnection or discontinuity in either of input circuits of two systems by supplying an on-signal to each of input circuits of two systems for capturing the input signals of two systems, confirming whether on-signals can be obtained from the input circuits and/or supplying an off-signal to the input circuits, and confirming whether off-signals can be obtained from the input circuits, and a third step of confirming that a short circuit does not occur between two systems by outputting on- and off-signals to the output signals of two systems at timings reverse to each other, capturing input signals kept in the corresponding relation reverse to the corresponding relation in the first step, and a fourth step of transmitting a safety output signal to the external output terminal of the output expansion module through the bus connection and the output circuit when at least either of the two systems becomes a discontinuity in the first step, a disconnection or discontinuity occurs at least either of the two systems in the second step, or a short circuit occurs between the two systems in the third step.

In the case of a preferred embodiment of the present invention, it is allowed that a mat switch is included as a predetermined type of safety switch, and a safety operation program corresponding to the mat switch executes;

a fifth step of detecting a continuity, disconnection, or erroneous wiring of each system by supplying output signals of two systems having on- and off-signals to the external input terminal section of an input expansion module whose set switch type is the mat switch through the bus connection at the timing in which the signals of two systems are not overlapped each other, capturing input signals of two system from mat switches corresponding to output signals respectively, and confirming whether on- and off-signals can be obtained correspondingly to the output signals, a sixth step of detecting a disconnection or discontinuity in either of input circuits of two systems by supplying an on-signal to input circuits of two systems for capturing the input signals of two systems, confirming whether on-signals can be obtained from the input circuits and/or supplying an off-signal to an input circuit, and confirming whether off-signals can be obtained from the input circuit, a seventh step of detecting a continuity or discontinuity between two systems by outputting on- and off-signals to the output signals of two systems at timings reverse to each other, capturing input signals kept in the corresponding relation reverse to the corresponding relation in the first step, and confirming that the supplied on-output signals are not obtained as input signals, and an eighth step of transmitting a safety output signal to the external output terminal of the output expansion module through the bus connection and the output circuit when at least either of the two systems detects a disconnection or erroneous wiring in the fifth step, a disconnection or discontinuity occurs in at least either of input circuits of two systems in the sixth step, or a discontinuity occurs between the two systems in the seventh step.

In the case of a preferred embodiment of the present invention, it is allowed that a two-hand-control switch is included as a predetermined type of safety switch, and a safety operation program corresponding to the two-hand-control switch executes;

a ninth step of detecting that the two-hand-control switch is correctly operated by supplying output signals of two systems which are on-signals to the external input terminal of an input expansion module whose set switch type is a two-hand-control switch through the bus connection, capturing input signals of two systems through make contacts of two-hand-control switches corresponding to the output signals respectively, and confirming whether the input signals of two systems are turned on within a predetermined time, a tenth step of detecting a disconnection or discontinuity in input circuits of two systems for capturing the input signals of two systems by supplying an on-signal to the input circuits, confirming whether on-signals can be obtained from the input circuits and/or supplying an off-signal to the input circuits, and confirming whether the off-signal can be obtained from the input circuits, and an eleventh step of confirming that a short circuit does not occur between two systems by outputting on- and off-signals to the output signals of two systems at timings reverse to each other, capturing input signals kept in the corresponding relation reverse to the corresponding relation in the first step, and confirming that the supplied on-signals are not obtained as input signals, and a twelfth step of transmitting a safety output signal to the external output terminal of the output expansion module through the bus connection and the output circuit when it is detected that the two-hand-control switch is correctly operated in the ninth step, a disconnection or discontinuity occurs in either of the circuits of two systems in the tenth step, or a short circuit occurs between the two systems in the eleventh step.

In the case of a preferred embodiment of the present invention, it is allowed that a light curtain is included as a predetermined type of safety switch, and a safety operation program corresponding to the light curtain executes;

a thirteenth step of detecting that the light curtain is interrupted from light when input signals of two systems sent from the light curtain are captured from the external input terminal of an input expansion module whose set switch type is the light curtain through the bus connection to obtain an off-signal, a fourteenth step of detecting a disconnection or discontinuity in input circuits of two systems by supplying an on-signal to input circuits of two systems for capturing the input signals of two systems, confirming whether on-signals can be obtained from the input circuits and/or supplying an off-signal to an input circuit, and confirming whether off-signals can be obtained from the input circuits, and a fifteenth step of transmitting a safety output signal to the external output terminal of the output expansion module through the bus connection and the output circuit when the light interrupted state of the light curtain is detected by detecting an off-signal by at least either of the two systems in the thirteenth step or a disconnection or discontinuity occurs in either of the input circuits of two systems in the fourteenth step.

In the case of a preferred embodiment of the present invention, it is allowed that the basic module includes one or more external input terminal sections capable of connecting one or more safety switches, an input circuit for receiving safety input signals from one or more external input terminal sections, an external output terminal section which can be connected to the output control system of a dangerous source, and an output circuit for transmitting a safety output signal to the external output terminal section. According to the above configuration, it is possible to construct a safety system even by only the basic unit.

In the case of a preferred embodiment of the present invention, it is allowed that the basic module includes part for executing a diagnostic program for diagnosing whether a predetermined expansion module is set to each expansion slot by collating the module identifying information read from an expansion slot on a mother board with the module identifying information set to the basic module. According to the above configuration, it is possible to avoid the risk of a malfunction caused by setting a not-predetermined expansion module to an expansion slot.

In the case of a preferred embodiment of the present invention, it is allowed that the basic module further includes troubleshooting-program storing part for storing a troubleshooting program for troubleshooting a safety switch connected to an external connection terminal section every type of predetermined safety switch and troubleshooting-program executing part for selecting a troubleshooting program corresponding to the type of a switch set by setting part and executing the selected troubleshooting program for the external input terminal section set by the setting part. According to the above configuration, it is possible to improve the reliability of a safety system by securing the operational reliability for each safety switch.

In the case of a preferred embodiment of the present invention, it is allowed that a troubleshooting program of an electromagnetically-locking door switch having an unlocking solenoid includes a solenoid diagnostic function for diagnosing a trouble of the unlocking solenoid. According to the above configuration, it is possible to improve the reliability of the door switch by securing the operational reliability of the unlocking solenoid.

In the case of a preferred embodiment of the present invention, it is allowed that a troubleshooting program includes a history generating function for making it possible to diagnose the contact deterioration of a safety switch in accordance with the aging of the time difference between signals of two systems coming from a pair of interlocking contacts included in the safety switch. According to the above configuration, it is possible to automatically diagnose the contact deterioration of the safety switch.

In the case of a preferred embodiment of the present invention, a troubleshooting program includes a history generating function for making it possible to diagnose the contact deterioration of a contactor in accordance with the aging of the time difference until a feedback signal arrives from a contactor auxiliary contact after transmitting a safety output signal. According to the above configuration, it is possible to automatically diagnose the contact deterioration of the contactor.

In the case of a preferred embodiment of the present invention, it is allowed that the basic module includes output-monitoring-program executing part for monitoring the state of a contactor constituting the output control system of a dangerous source in accordance with a contactor auxiliary-contact signal received from a feedback input terminal set to the basic module or an expansion module. According to the above configuration, it is possible to confirm whether the contactor is correctly operated after transmitting a safety output signal.

In the case of a preferred embodiment of the present invention, it is allowed that the basic module includes interlocking-program executing part for controlling the propriety of an output operation which is an execution result of the safety operation program in accordance with a PLC operation state signal received from a PLC operation state input terminal set to the basic module or an expansion module. According to the above configuration, it is possible to prevent the unnecessary switching that a contactor is turned off by the safety output of a safety controller though there is no danger when a PLC outputs an operation stop command and the operation of a device to be controlled is stopped by linking the operation state of the PLC to the operational condition of a contactor. Moreover, by monitoring the operation stop command of the PLC and preventing the contactor from operating before a command is output from the PLC, it is possible to omit a contactor in the control system of an apparatus.

BRIEF DESCRIPTION OF THE DRAWINGS

FIG. 21 shows an illustration showing the whole of data arrangement in an EEPROM in the form of a table.

FIG. 22 shows an illustration showing data arrangement for expansion input modules in an EEPROM in the form of a table.

FIG. 23 shows an illustration showing data arrangement for expansion input modules in an EEPROM in the form of a table.

FIG. 37 shows an illustration showing contents of an error table for input diagnosis.

FIG. 40 shows a flowchart showing a processing program for determining that an emergency stop switch is changed from off to on.

FIGS. 43A and 43B show illustrations of contact welding diagnosis using the time when a safety switch operates.

FIG. 46 shows a flowchart (1) showing a processing program for determining that a two-hand-control switch is changed from off to on.

FIG. 47 shows a flowchart (2) showing a processing program for determining that a two-hand-control switch is changed from off to on.

FIGS. 56A and 56B show flowcharts (2) showing processings for second back check.

FIGS. 57A and 57B show illustrations of contact welding diagnosis using the time when second back check is executed.

FIGS. 60A and 60B show illustrations of the solenoid diagnosis using an input circuit.

FIGS. 61A and 61B show illustrations showing output control modes (1) corresponding to safety switches respectively.

FIGS. 62A and 62B show illustrations showing output control modes corresponding to safety switches respectively.

DESCRIPTION OF THE PREFERRED EMBODIMENTS

An embodiment of a safety controller of the present invention is described below in detail by referring to the accompanying drawings.

Figure 1:
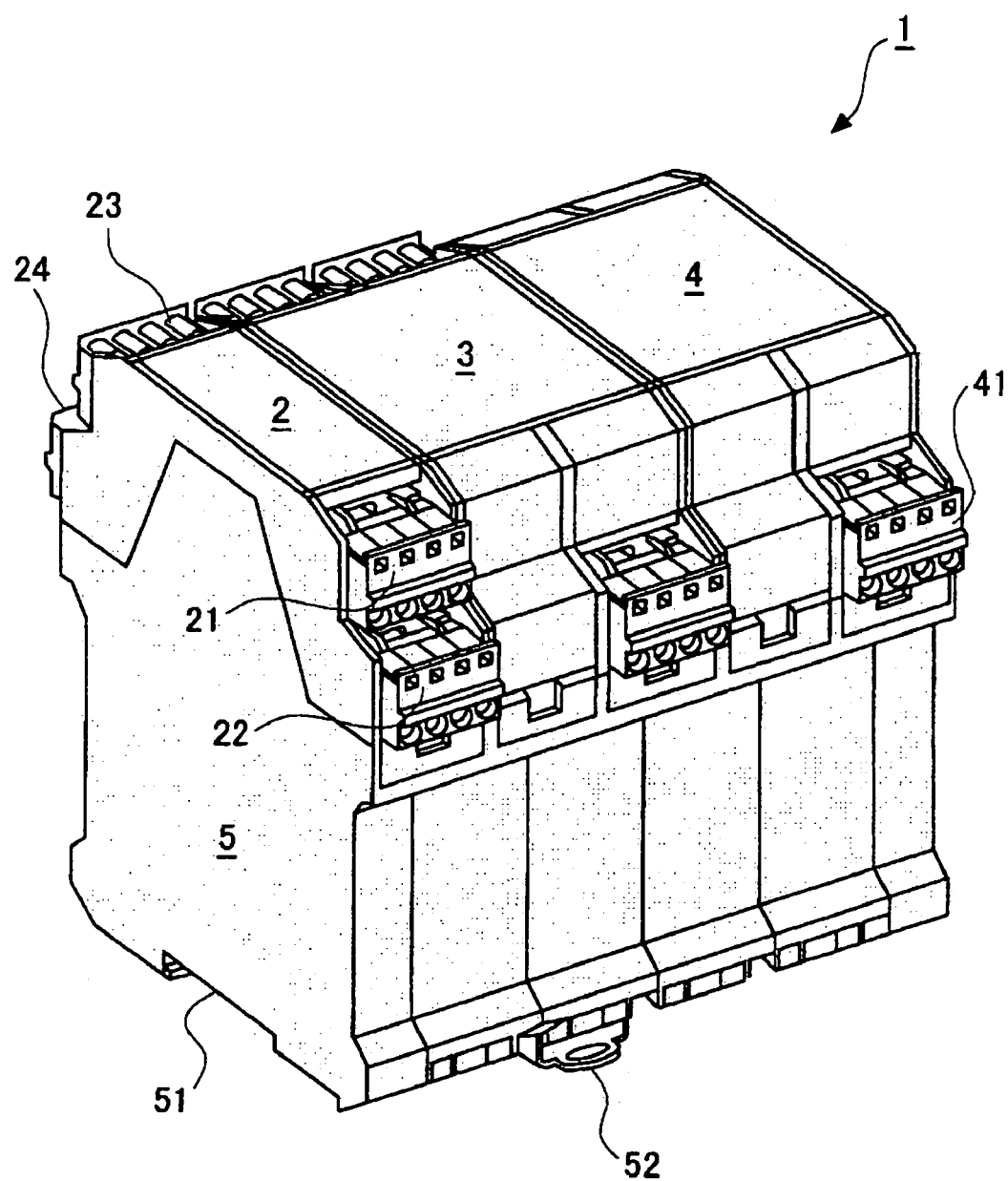
FIG. 1 shows a perspective view of the appearance of a safety controller when all modules are set on it.
Figure 2:
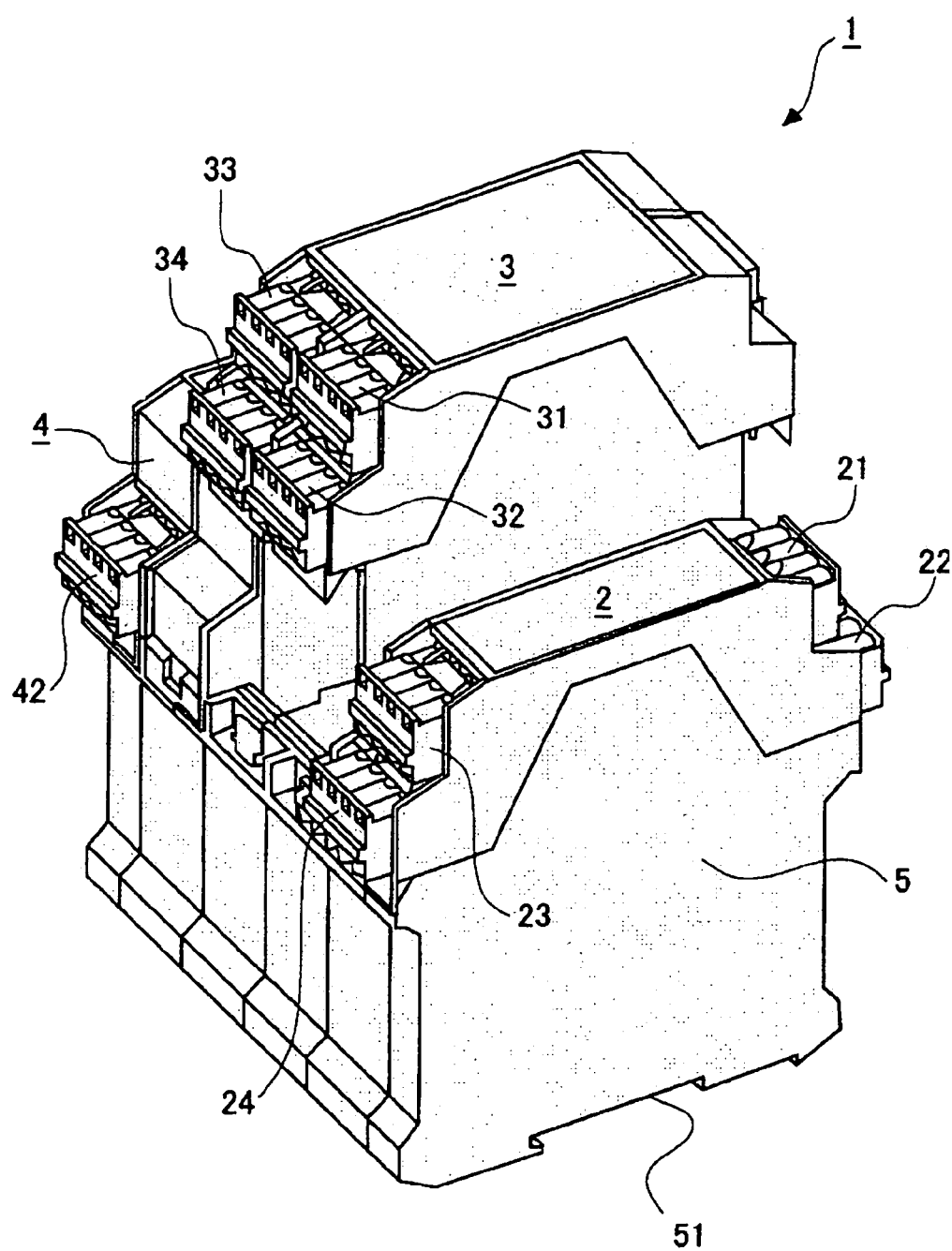
FIG. 2 shows a perspective view of the appearance of a safety controller when expansion modules are removed from it.
Figure 3:
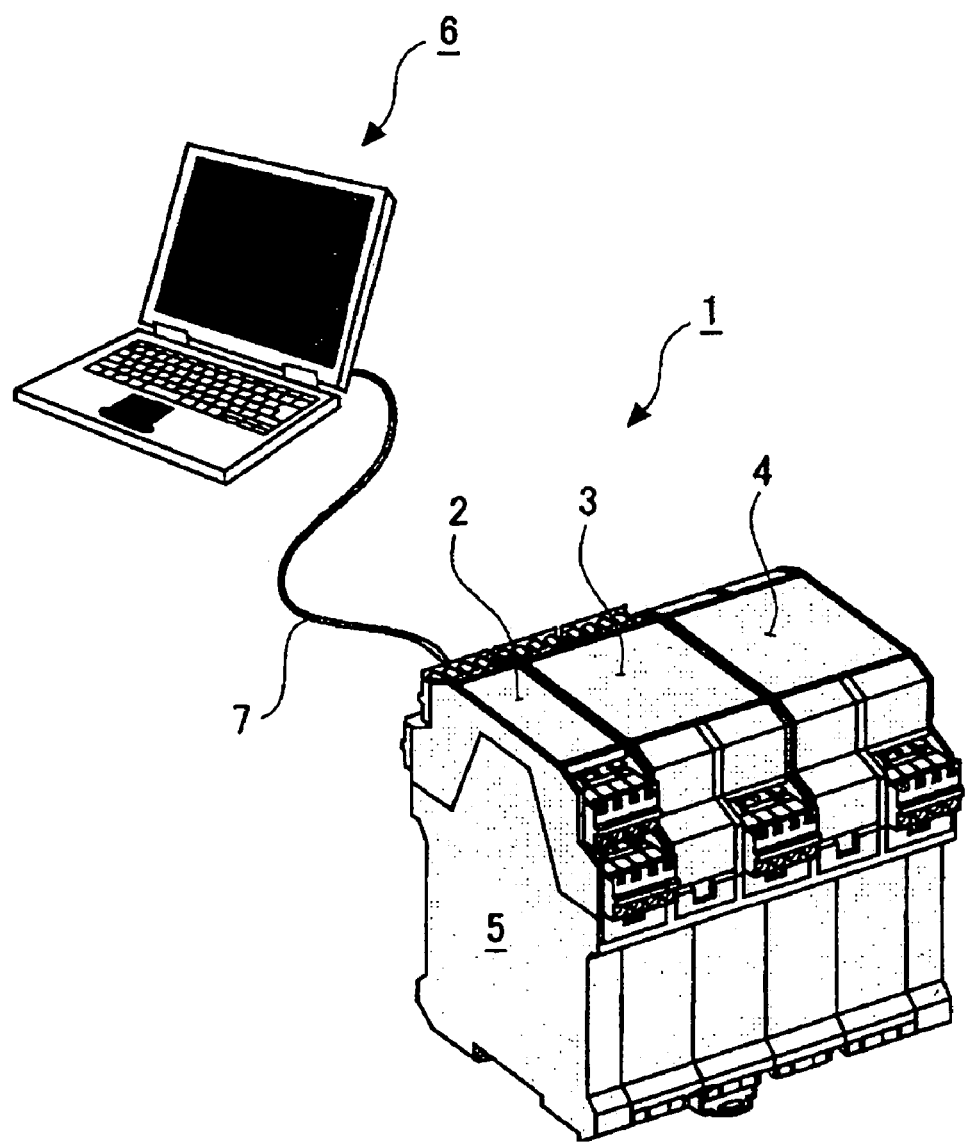
FIG. 3 shows an outline view of a system when a personal computer is connected to a controller.

FIG. 1 shows a perspective view of the appearance of a safety controller when all modules are set, FIG. 2 shows a perspective view of the appearance of the safety controller when expansion modules are removed from the safety controller, and FIG. 3 shows the appearance of a system when a personal computer is connected to the controller.

Figure 11:
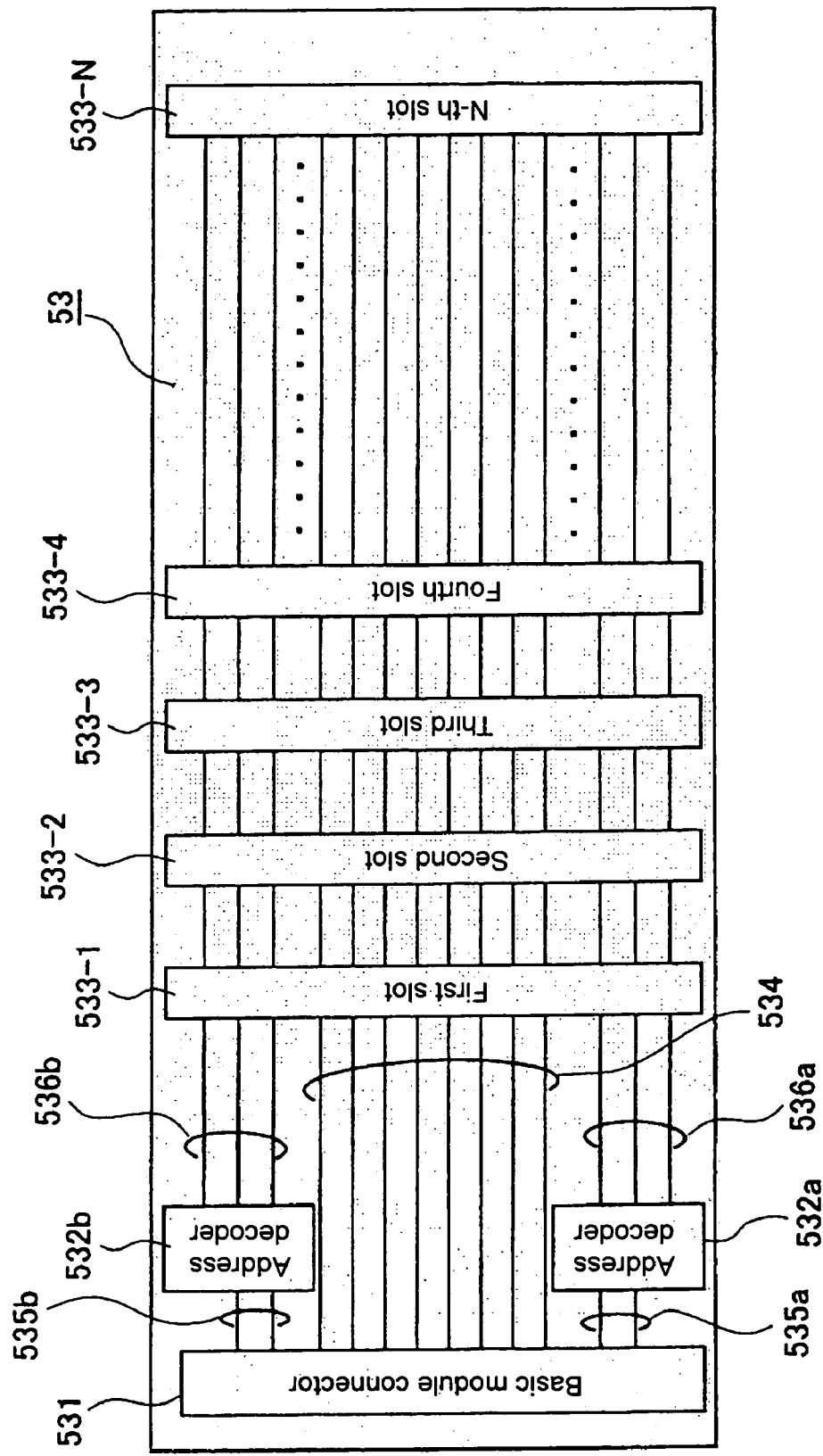
FIG. 11 shows an illustration showing a hardware configuration of a mother board.

As shown in these drawings, a safety controller 1 is provided with a basic module 2, input expansion module 3, and output expansion module 4. These modules 2, 3, and 4 are aligned, positioned, and fixed through a module holder 5. The module holder 5 is a boxy housing whose upside is opened and a DIN-rail setting groove 51 and a DIN-rail securing attachment 52 are set to the bottom of the housing. Therefore, the module holder 5 can be set to a not-illustrated DIN rail. The illustrated example shows a case of setting two expansion modules 3 and 4 to one basic module. However, it is also allowed to further increase the number of expansion modules so that many expansion modules such as 8 or 16 modules can be set. A mother board 53 to be described later by referring to FIG. 11 is set to the bottom of the inside of the module holder 5. Moreover, the basic module 2, input expansion module 3, and output expansion module 4 can be inserted into a basic-module connector 531 and expansion-module connectors 533-1 to 533-n on the mother board 53.

A first input terminal block 21 and a second input terminal block 22 are set to one side of the basic module 2 at two stages of top and bottom and a first output terminal block 23 and a second output terminal block 24 are set to the other side of the basic module 2 at two stages of top and bottom. Similarly, a first input terminal block 31, second input terminal block 32, third input terminal block 33, and fourth input terminal block 34 are set to the other side of the input expansion module 3 at two stages of top and bottom.

Moreover, a first output terminal block 41 is set to one side of the output expansion module 4 and a second output terminal block 42 is set to the other side of the output expansion module 4.

As shown in FIG. 11, four signal lines can be connected to each terminal block and an electric wire constituting each signal line can be easily fixed through a core-plug-in-type damper mechanism.

As shown in FIG. 3, the basic module 2 constituting the safety controller 1 can be communicated with a personal computer 6 through an RS-232C cord 7, various setting operations to be described later are performed through the keyboard of the personal computer 6, and the set data thus obtained is written in a memory (such as EEPROM) of the basic module 2 constituting the safety controller 1 through the RS-232C cord 7. Because this type of data communication and memory writing are publicly known by various types of documents, detailed description is omitted.

FIGS. 1 to 3 show examples of setting one basic module 2 and two expansion modules 3 and 4. However, the number of and the type of the expansion modules are not restricted to the examples in FIGS. 1 to 3. For example, it is possible to removably connect many modules such as 8 or 16 modules.

Figure 4:
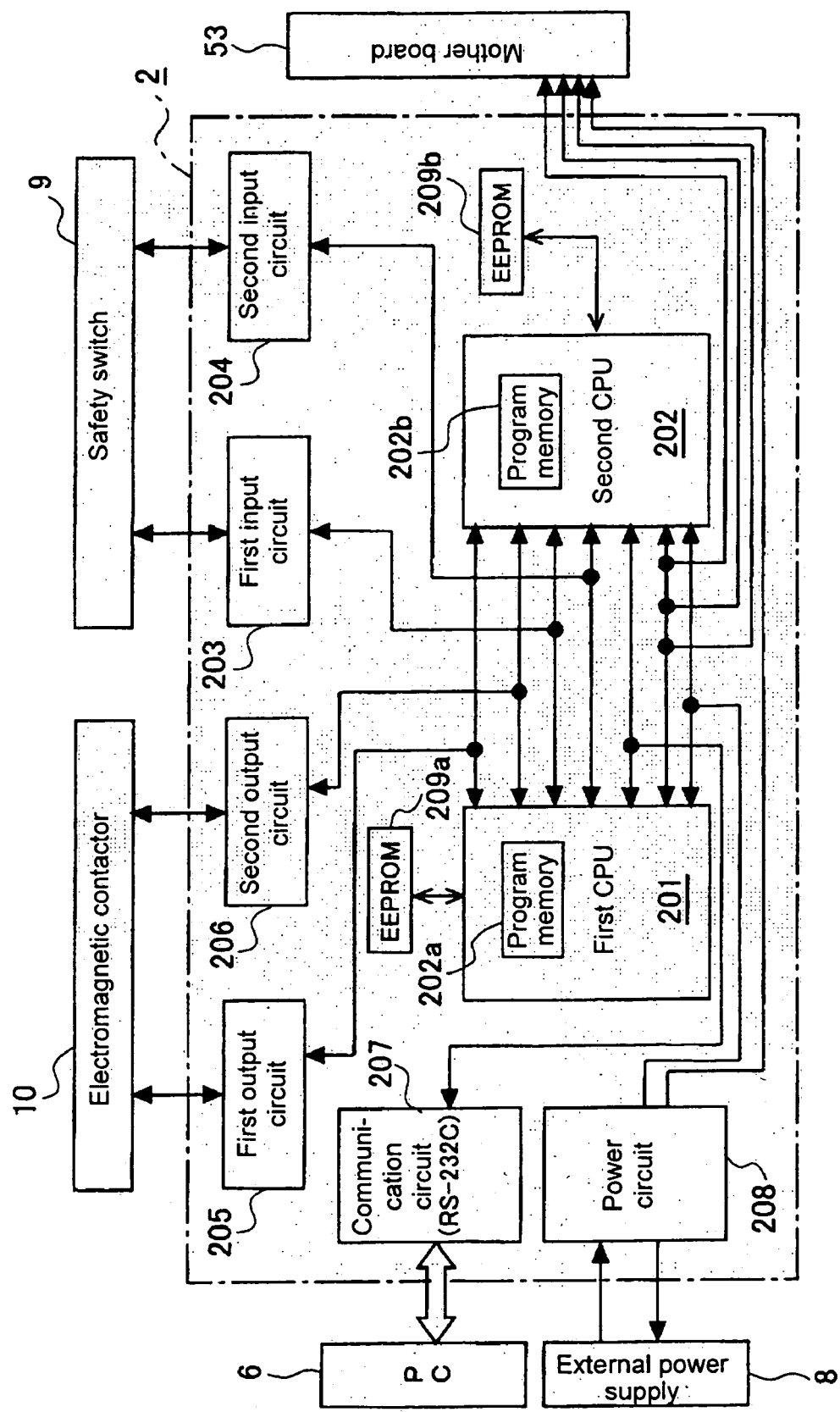
FIG. 4 shows a block diagram showing a configuration of the hard ware of a basic module.

FIG. 4 is a block diagram showing a hardware configuration of a basic module. As shown in FIG. 4, the basic module 2 includes a first CPU 201, second CPU 202, first input circuit 203, second input circuit 204, first output circuit 205, second output circuit 206, communication circuit (RS-232C) 207, and power circuit 208.

The first CPU 201 and second CPU 202 are used to achieve duplexing of control and respectively execute almost the same program. The first CPU 201 stores a program memory (such as flash memory) 202a for storing a safety operation program to be described later. Similarly, the second CPU 202 stores a program memory 202b for storing a safety operation program to be described later. Moreover, EEPROMs 209a and 209b for storing various set data values to be described later are set to outsides of the first CPU 201 and second CPU 202 respectively. The stored content of the program memory 202a is almost the same as that of the program memory 202b and also the stored content of the EEPROM 209a is almost the same as that of the EEPROM 209b. Thereby, even if either of the first CPU 201 and second CPU 202 is broken down, the safety is improved by taking over control by the other normal CPU.

A safety switch 9 to be described later is connected to the first input circuit 203 and second input circuit 204 and an electromagnetic contactor (magnet contactor:magnet switch) 10 is connected to the first output circuit 205 and second output circuit 206 in the case of this example. Moreover, the personal computer (PC) 6 is connected to the communication circuit (RS-232C) 207 and an external power supply 8 is connected to the power circuit 208. Furthermore, the mother board 53 is connected to a bus line for connecting the first CPU 201 and second CPU 202. Thereby, it is possible to transmit data to each expansion module from the basic module through the mother board 53 or receive the data coming from each expansion module by the basic module through the mother board 53. Moreover, various data values generated by the personal computer (PC) 6 are supplied to the basic module 2 through the communication circuit (RS-232C) 207. Configurations of the safety switch 9 and electromagnetic contactor 10 will be described later in detail.

Figure 5:
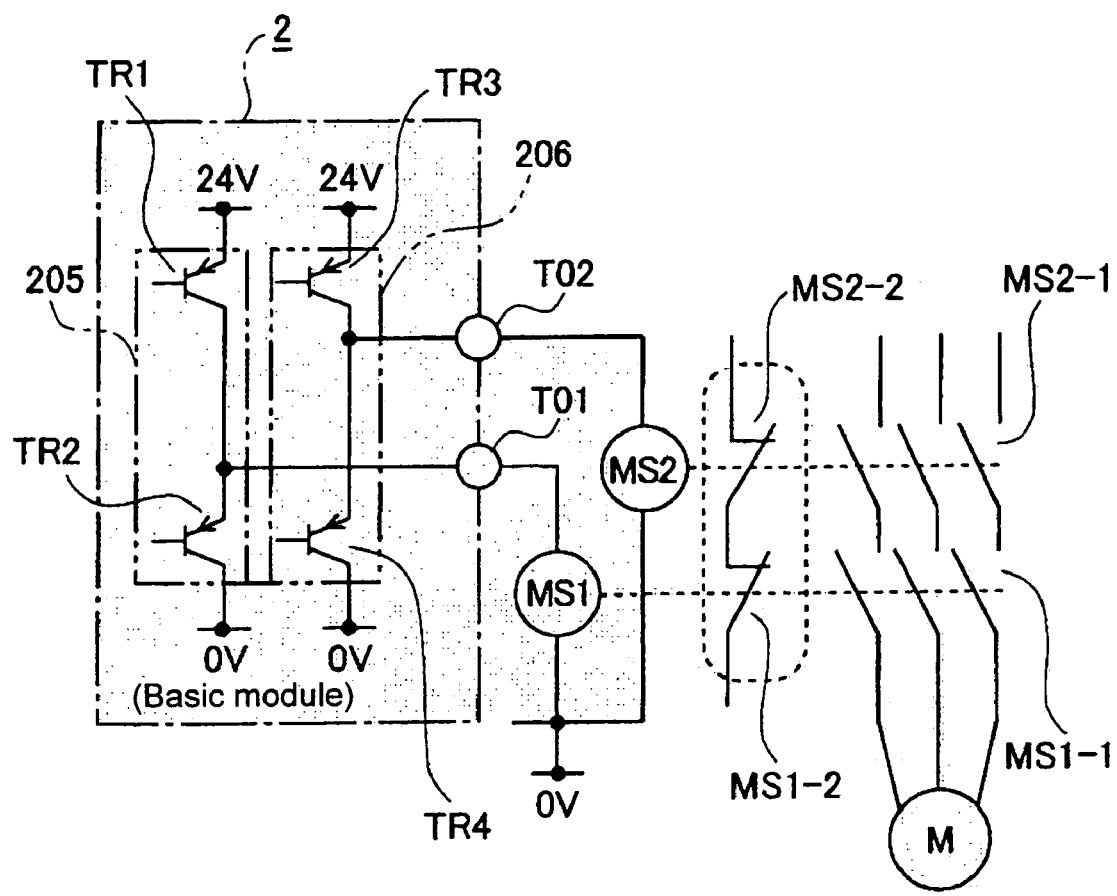
FIG. 5 shows a wiring diagram showing wire connections between first and second output circuits in a basic module and external electromagnetic contactors.

FIG. 5 is a wiring diagram showing a wire connection between the first and second output circuits 205 and 206 in the basic module and the external electromagnetic contactor 10. As shown in FIG. 5, the first output circuit 205 in the basic module 2 is constituted by tow transistors TR1 and TR2 complementarily connected each other and the second output circuit 206 is constituted by two transistors TR3 and TR4 complementarily connected each other. The connection point between the transistors TR1 and TR2 and that between the transistors TR3 and TR4 are taken out to external terminals T01 and T02. Coils MS1 and MS2 of magnet switches are connected between the external terminals T01 and T02 and a 0-V terminal respectively. The magnet switch MS1 has a triple-pole single-throw main-make contact MS1-1 and single-pole single-throw auxiliary break contact MS1-2. Similarly, the magnet switch MS2 has a triple-pole single-throw main-make contact MS2-1 and a single-pole single-throw auxiliary break contact MS2-2. Then, these two main make contacts MS1-1 and MS2-1 are connected to a current-carrying route to a motor M which is the driving source of a dangerous source in series. Therefore, when both the first output circuit 205 and second output circuit 206 are turned on, the magnet switches MS1 and MS2 operate and the three-phase motor M is electrified by closing the main make contacts MS1-1 and MS2-1.

Figure 6:
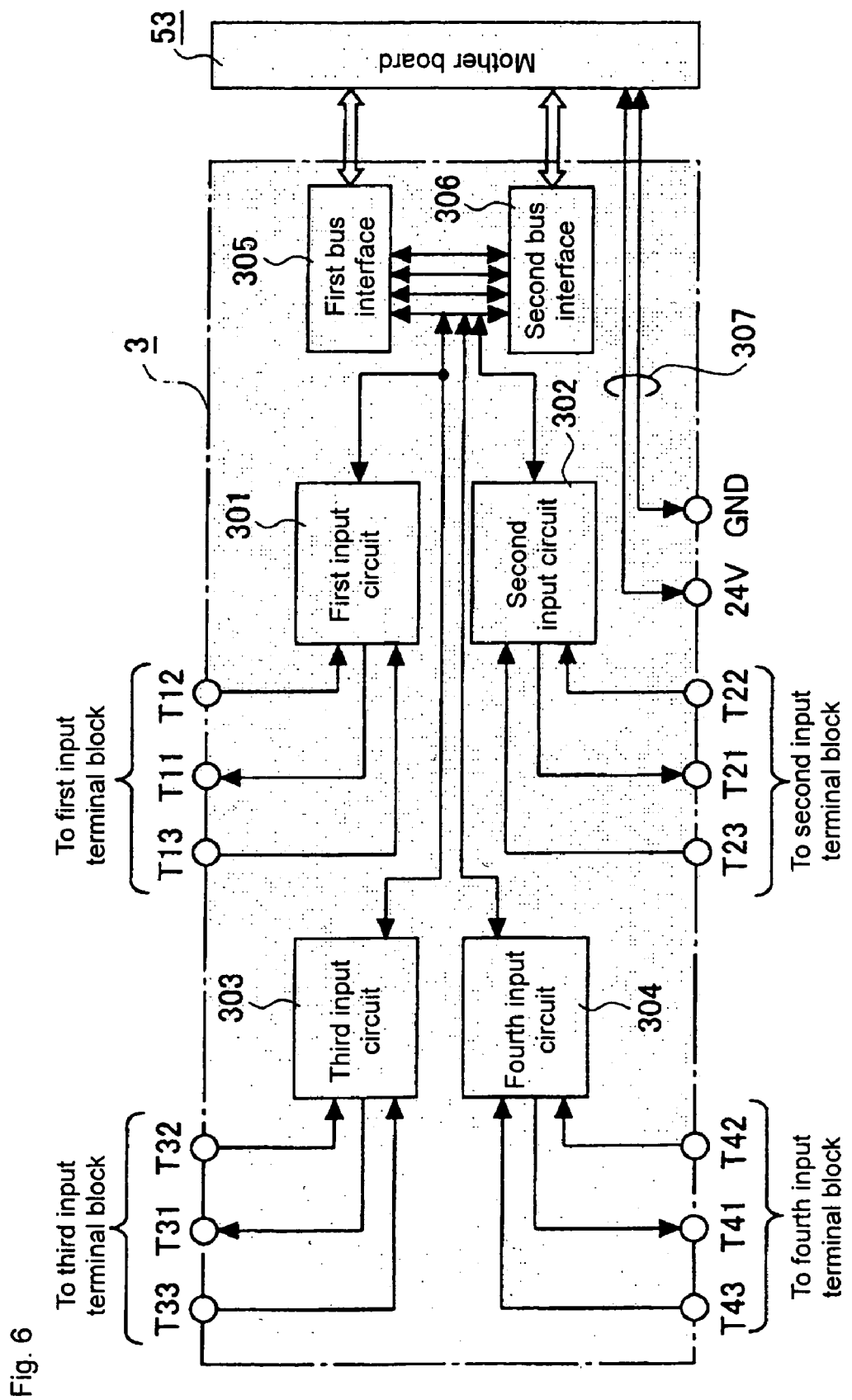
FIG. 6 shows a block diagram showing a hardware configuration of an input expansion module.

FIG. 6 is a block diagram showing a hardware configuration of an input expansion module. As shown in FIG. 6, the input expansion module 3 includes a first input circuit 301, second input circuit 302, third input circuit 303, fourth input circuit 304, first bus interface 305, and second bus interface 306.

The first input circuit 301 has three external input terminals T11, T12, and T13 to be connected to the first terminal block (refer to FIG. 2) 31. The second input circuit 302 has three external input terminals T21, T22, and T23 to be connected to the second input terminal block (refer to FIG. 2) 32. The third input circuit 303 has three external input terminals T31, T32, and T33 to be connected to the third input terminal block (refer to FIG. 2) 33. The fourth input circuit 304 has three external input terminals T41, T42, and T43 to be connected to the fourth input terminal block (refer to FIG. 2) 34. Moreover, a power terminal (24 V, GND) is connected to the mother board 53 through a power supply line 307. The first bus interface 305 and second bus interface 306 respectively include a nonvolatile memory and the memory stores the information for identifying the input expansion module 3 (module identifying information) and the like. the module identifying information (ID) is used to diagnose whether a predetermined expansion module is set to each expansion slot by collating the module identifying information read from the expansion slot 533-1 to N on the mother board 53 with the module identifying information set to the basic module.

Figure 7:
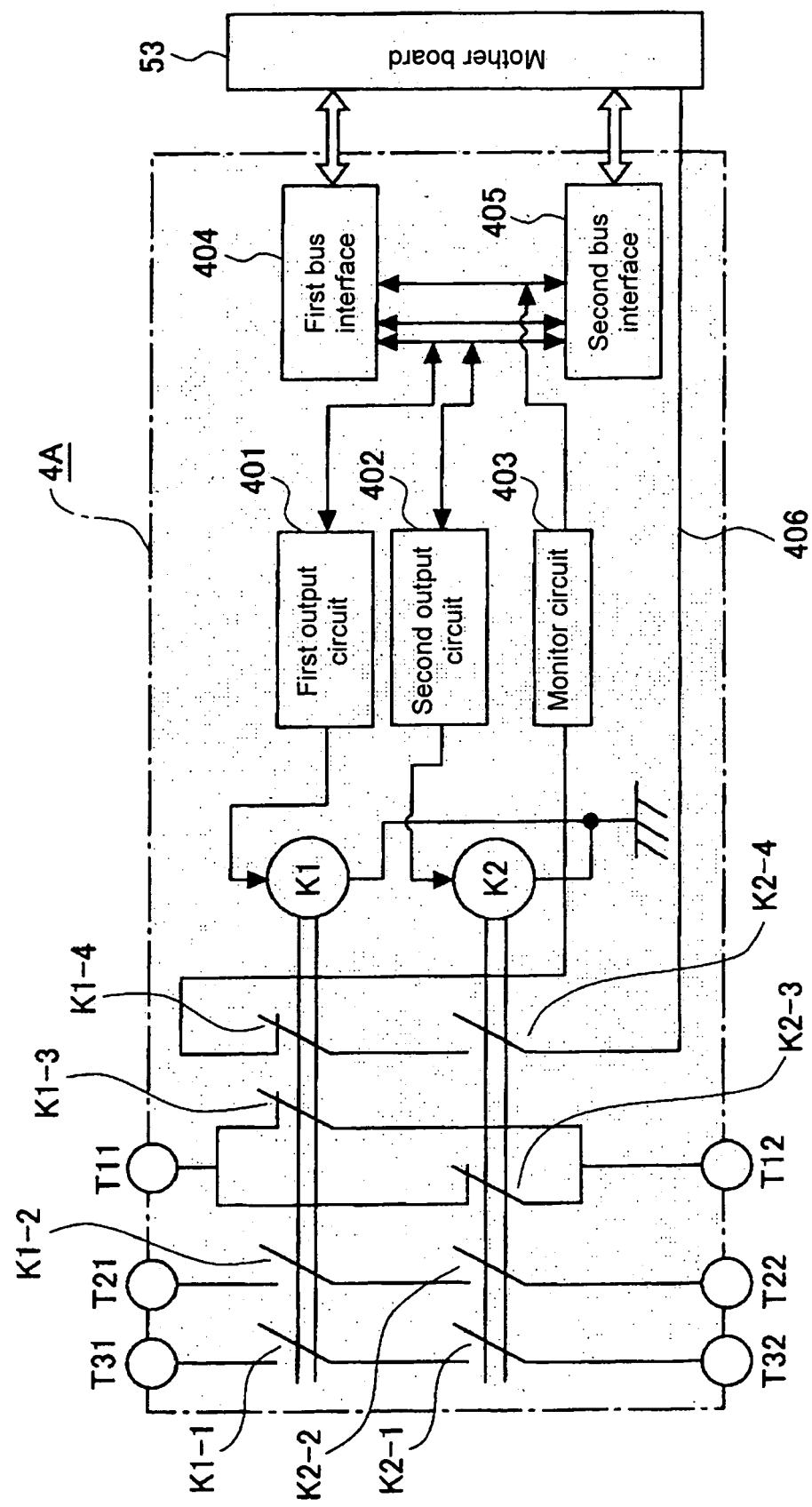
FIG. 7 shows a block diagram showing a hardware configuration of an electromagnetic-relay output module serving as an output expansion module.

FIG. 7 is a block diagram showing a hardware configuration of an electromagnetic-relay output module serving as an output expansion module. As shown in FIG. 7, the electromagnetic-relay output module 4A includes a first output circuit 401, second output circuit 402, monitor circuit 403, first bus interface 404, and second bus interface 405. Moreover, the electromagnetic-relay output module 4A includes an electromagnetic relays K1 and K2. The electromagnetic relay K1 has two single-pole single-throw make contacts K1-1 and K1-2 and two single-pole single-throw break contacts K1-3 and K1-4. Furthermore, the electromagnetic relay K2 has two single-pole single-throw make contacts K2-1 and K2-2 and two single-pole single-throw break contacts K2-3 and K2-4. These contacts are set between external terminal strings T11, T21, and T31 on one hand and external terminal strings T12, T22, and T32 on the other in series or in parallel.

Figure 8:
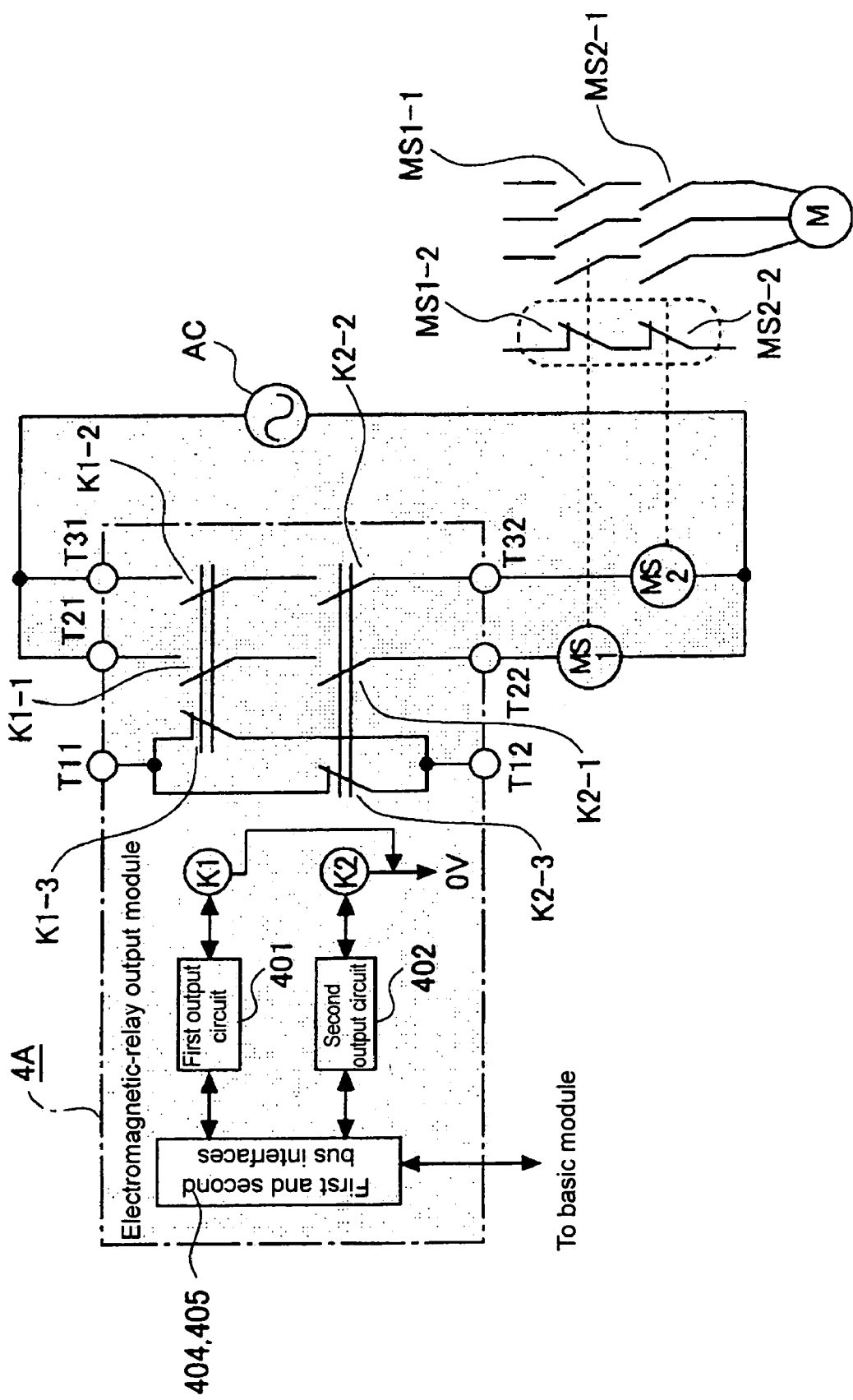
FIG. 8 shows a wiring diagram showing wire connections between relay contacts in an electromagnetic-relay output module serving as an output expansion module and external magnet switches.

FIG. 8 is a wiring diagram showing a wire connection between a relay contact in an electromagnetic-relay output module serving as an output expansion module and an external magnet switch. In FIG. 8, the same terminal as that in FIG. 7 is provided with the same symbol and its description is omitted. As shown in FIG. 8, when both the electromagnetic relays K1 and K2 operate, coils of two magnet switches MS1 and MS2 are electrified, both the triple-pole single-throw main make contacts MS1-1 and MS2-1 are turned on, the three-phase motor M is electrified.

Figure 9:
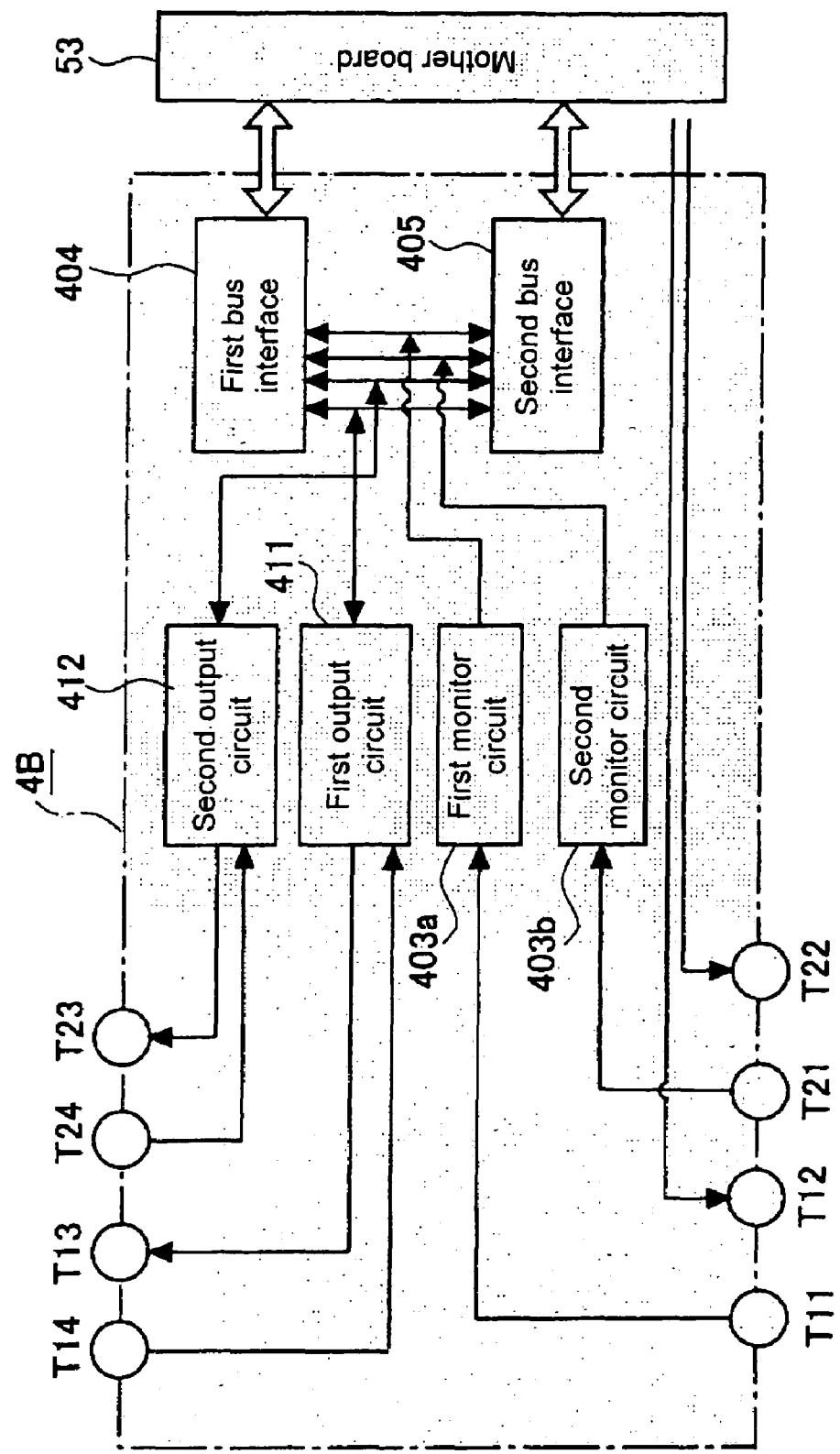
FIG. 9 shows a block diagram showing a hardware configuration of a solid-state-relay output module serving as an output expansion module.

FIG. 9 is a block diagram showing a hardware configuration of a solid-state-relay output module serving as an output expansion module. As shown in FIG. 9, the solid-state-relay output module 4B includes a first output circuit 411, second output circuit 412, first monitor circuit 403a, second monitor circuit 403b, first bus interface 404, and second bus interface 405. The first output circuit 411 is connected to external terminals T13 and T14. The second output circuit 412 is connected to external terminals T23 and T24. The first monitor circuit 403a is connected to an external terminal T11 and the second monitor circuit 403b is connected to an external terminal T21. External terminals T12 and T22 are connected to a power supply coming from the mother board 53.

Figure 10:
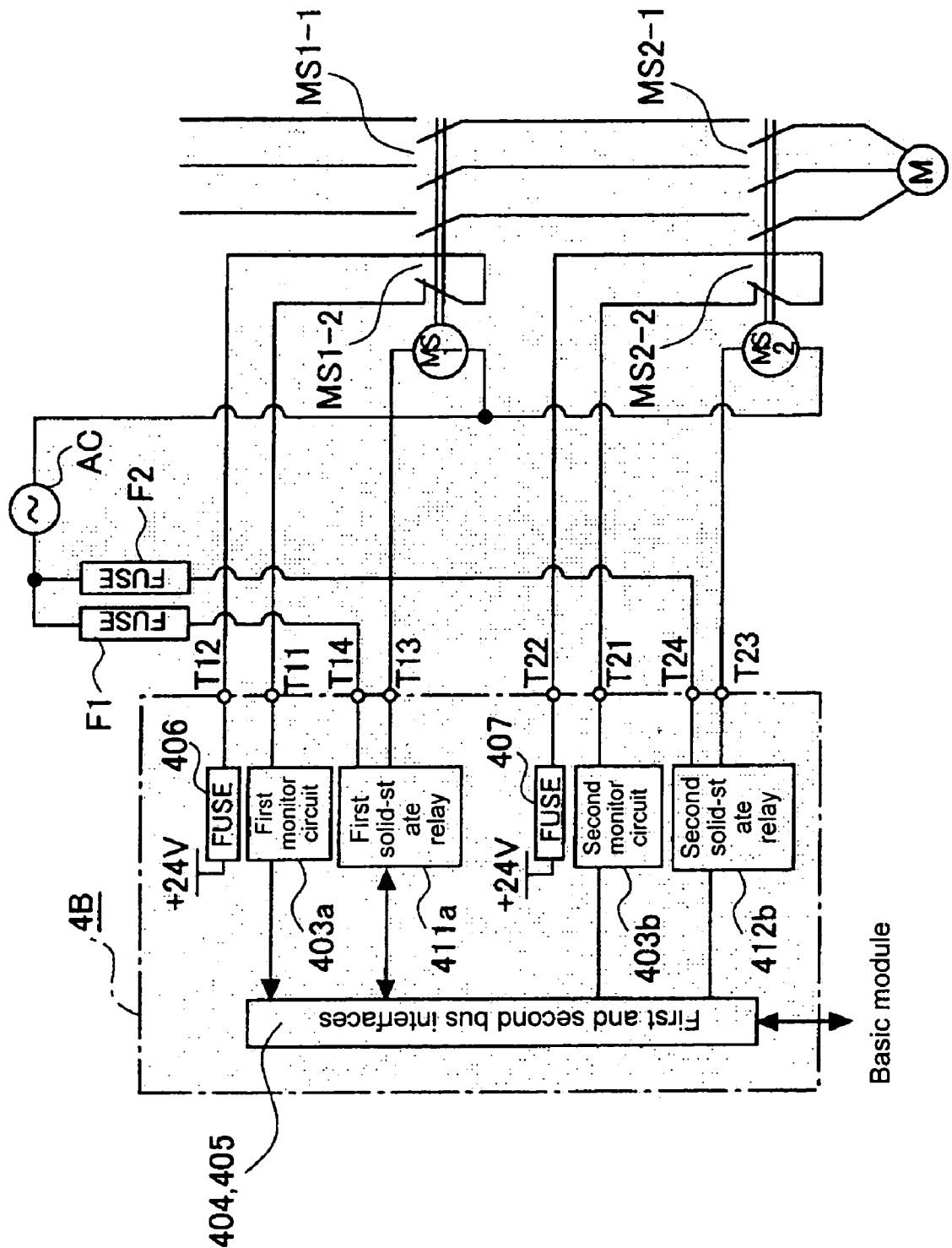
FIG. 10 shows a wiring diagram showing wire connections between relays in a solid-state-relay output module and external electromagnetic contactors.

FIG. 10 is a wiring diagram showing a wire connection between a relay in a solid-state-relay output module and an external electromagnetic contactor. As shown in FIG. 10, the solid-state-relay output module 4B includes a first solid-state relay 411a, second solid-state relay 412b, first monitor circuit 403a, second monitor circuit 403b, first and second bus interfaces 404 and 405, and fuses 406 and 407. Moreover, as shown in FIG. 10, when both the solid-state relay 411a and second solid-state relay 412b operate, the magnet switches MS1 and MS2 are electrified and the three-phase motor M is electrified when the main make contacts MS1-1 and MS2-1 are turned on. At the same time, when auxiliary break contacts MS1-2 and MS2-2 of the magnet switches MS1 and MS2 are turned off, it is possible to confirm through the first monitor circuit 403a and second monitor circuit 403b whether the magnet switches MS1 and MS2 are normally operated. In FIG. 10, AC denotes an alternate-current power supply and F1 and F2 denote fuses.

FIG. 11 is an illustration showing a hardware configuration of a mother board. As shown in FIG. 11, the mother board 53 is set in the module holder 5 of the safety controller 1 and has the basic module connector 531, two address decoders 532a and 532b, and n expansion-module connectors 533-1 and 533-2 to 533-n. A data line 534 and address lines 535a and 535b of two systems are derived from the basic-module connector 531. The address line 535a is decoded by the address decoder 532a and thereby, a slot select line 536a is derived. Moreover, the address line 535b is decoded by the address decoder 532b and thereby, a slot select line 536b is generated. It is needless to say that the basic module 2 is removably set to the basic-module connector 531. Furthermore, various expansion modules (such as input expansion module 3 and output expansion module 4) are removably set to the expansion-module connectors 533-1 to 533-n. In FIG. 11, n expansion-module connectors 533-1 to 533-n are drawn as first slot, second slot, . . . , and n-th slot. However, when specific configurations shown in FIG. 2 are purposed, it is not needless to say that only two expansion-module connects are necessary.

Then, some safety switches to be used for the safety controller 1 of the present invention are described below by referring to FIGS. 12 to 17.

Figure 12:
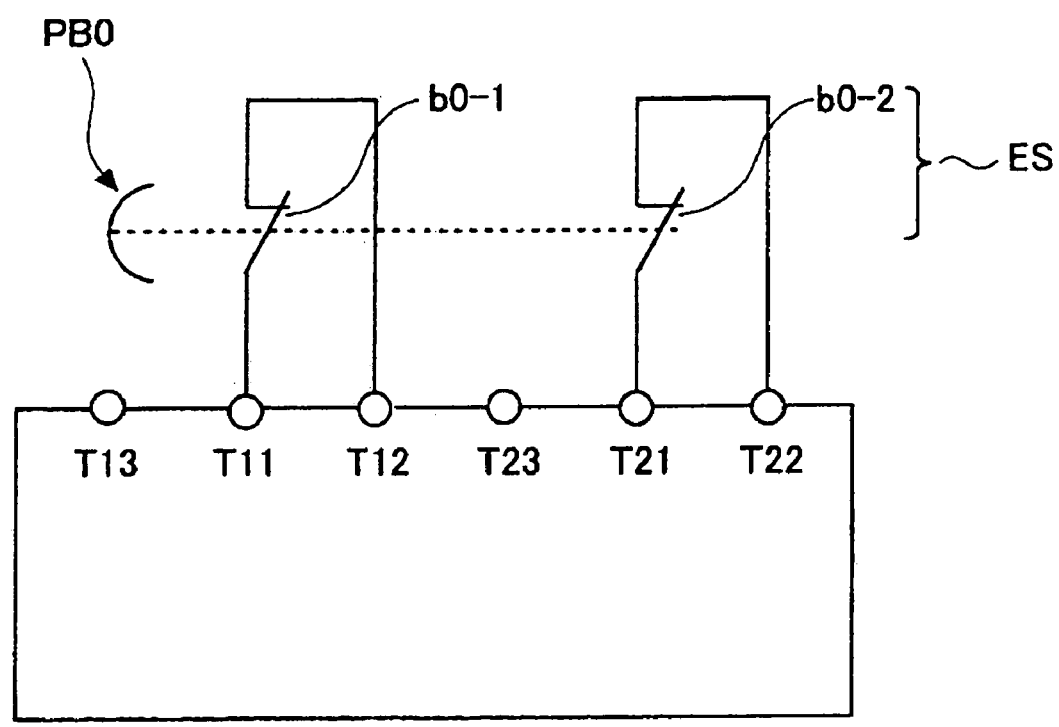
FIG. 12 shows a wiring diagram showing a method for connecting terminal blocks of an emergency stop switch.

FIG. 12 is a wiring diagram showing a method for wire-connecting terminal blocks of an emergency stop switch. As shown in FIG. 12, in external terminal blocks for one safety switch (for example, constituted by top and bottom terminal blocks 21 and 22), six external terminals T13, T11, T12, T23, T21, and T22 are arranged in order. Moreover, an emergency stop switch ES includes one pushbutton PB0 and two break contacts b0-1 (first system) and b0-2 (second system) to be operated while interlocking with operations of the pushbutton PB0. The first break contact b0-1 is connected between the external terminals T11 and T12 and the second break contact b0-2 is connected between the external terminals T21 and T22.

Figure 13:
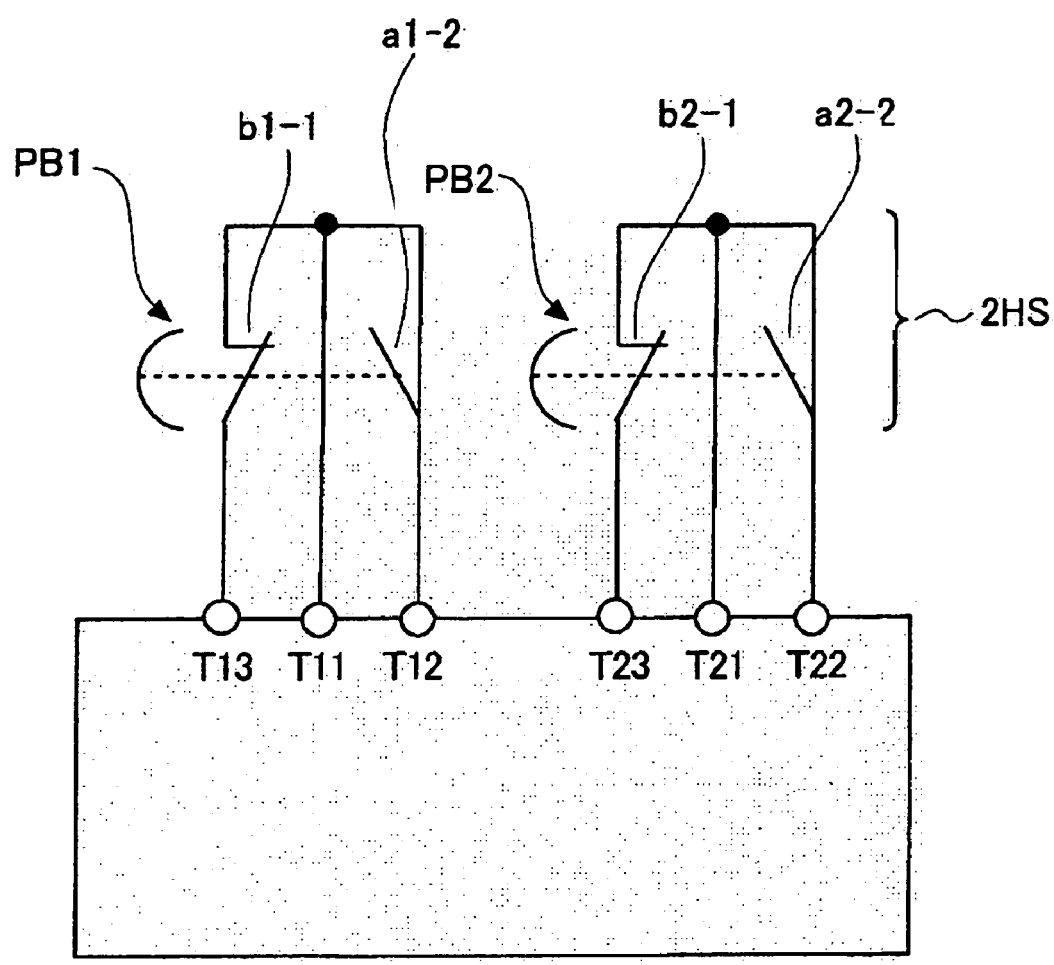
FIG. 13 shows a wiring diagram showing a method for wire-connecting terminal blocks of a two-hand-control switch.

FIG. 13 is a wiring diagram showing a method for wire-connecting terminal blocks of both operation switches. Also in the case of this example, six external terminals T13, T11, T12, T23, T21, and T22 are arranged in order on external terminal blocks for one safety switch. Moreover, a two-hand-control switch 2HS is provided with two pushbuttons PB1 and PB2, a pair of break and make contacts b1-1 and a1-2 of a first system to be operated while interlocking with operations of the pushbutton PB1, and a pair of break and make contacts b2-1 and a2-2 of a second system to be operated while interlocking with operations of the pushbutton PB2. Furthermore, the break contact b1-1 is connected between the external terminals T13 and T11 and the make contact a1-2 is connected between the external terminals T11 and T12. Furthermore, the break contact b2-1 is connected between the external terminals T23 and T21 and the make contact a2-2 is connected between the external terminals T21 and T22.

Figure 14:
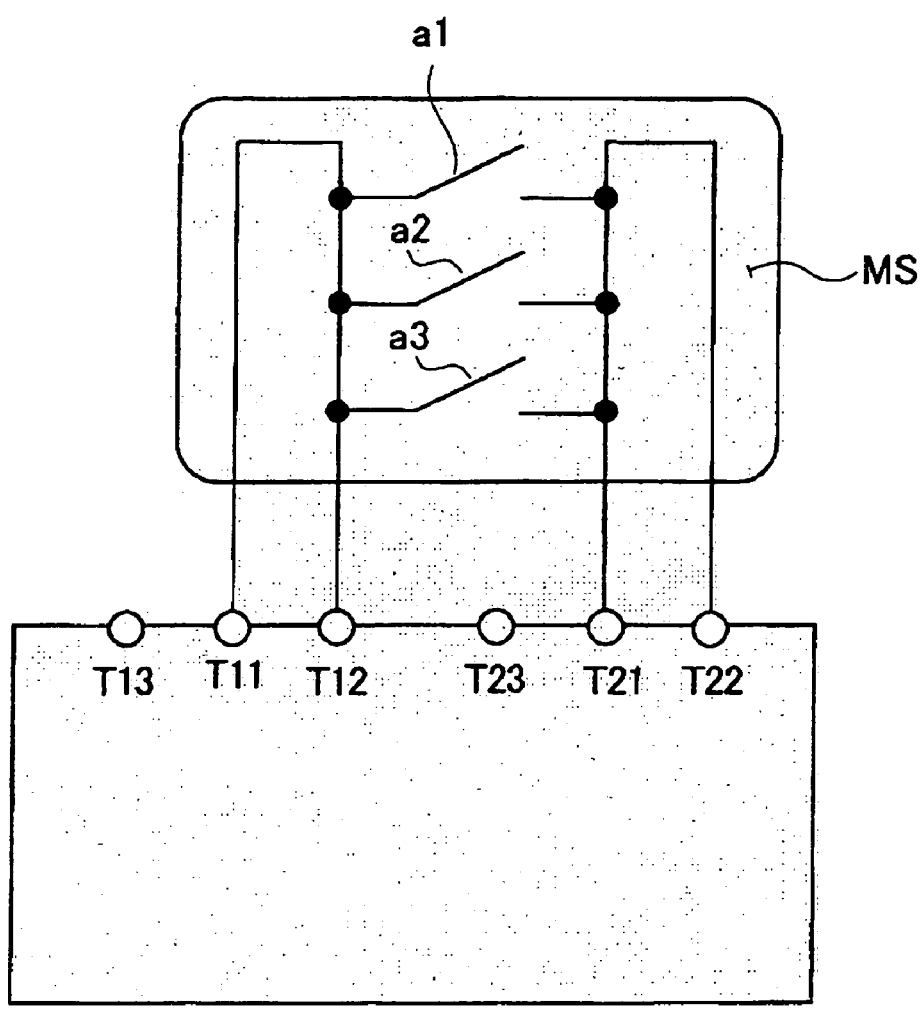
FIG. 14 shows a wiring diagram showing a method for wire-connecting terminal blocks of a mat switch.

FIG. 14 is a wiring diagram showing a method for wire-connecting terminal blocks of a mat switch. Also in the case of this example, six external input terminals T13, T11, T12, T23, T21, and T22 are arranged in order on external terminal blocks corresponding to one safety switch. The mat switch MS includes a plurality of make contacts a1, a2, and a3 which are parallel each other. Moreover, a common line at one end (first system) of a group of these make contacts is connected between the terminals T11 and T12 and moreover, another common line (second system) of a group of make contacts is connected between the terminals T21 and T22.

Figure 15:
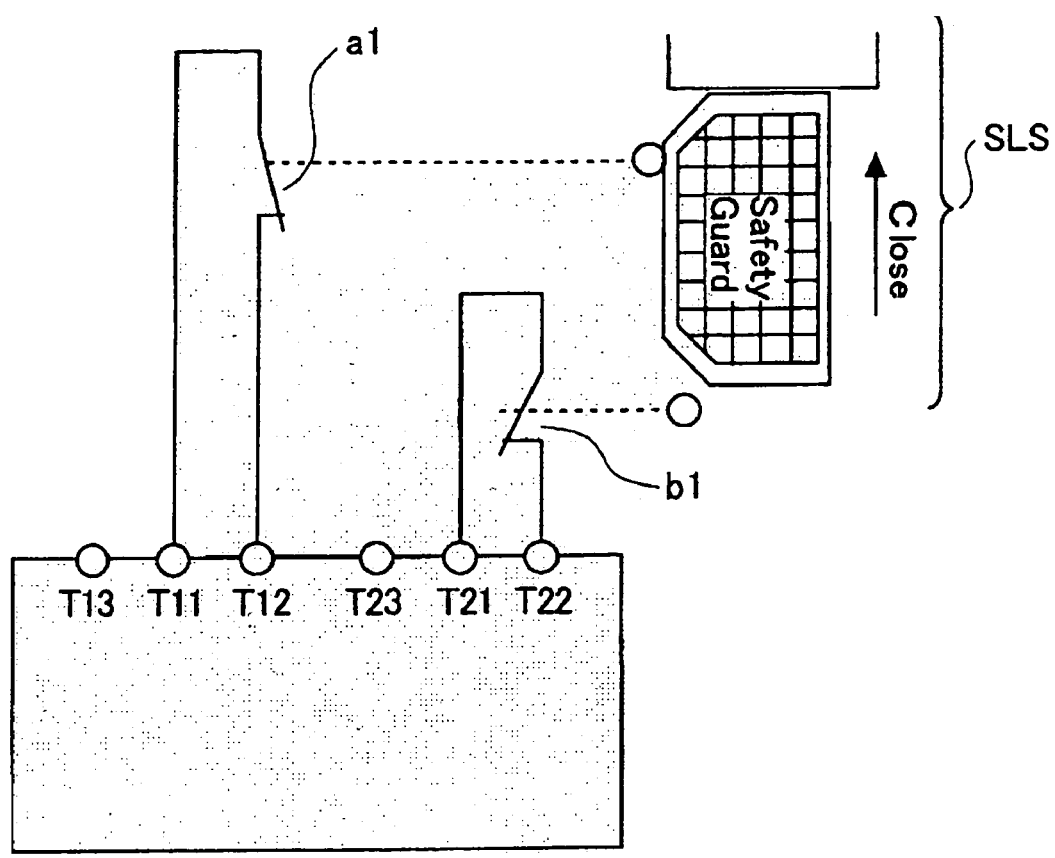
FIG. 15 shows a wiring diagram showing a method for wire-connecting terminal blocks of a safety limit switch.

FIG. 15 is a wiring diagram showing a method for wire-connecting terminal blocks of a safety limit switch. As shown in FIG. 15, also in the case of this example, six input terminals T13, T11, T12, T23, T21, and T22 are arranged in order on external input terminal blocks for one safety switch. Moreover, a safety limit switch SLS includes a pair of make contact al and a break contact b1 to be operated while interlocking with operations of a safety guard serving as an actuator of the limit switch. Furthermore, the make contact (first system) al is connected between the terminals T11 and T12. The break contact (second system) b1 is connected between the terminals T21 and T22.

Figure 16:
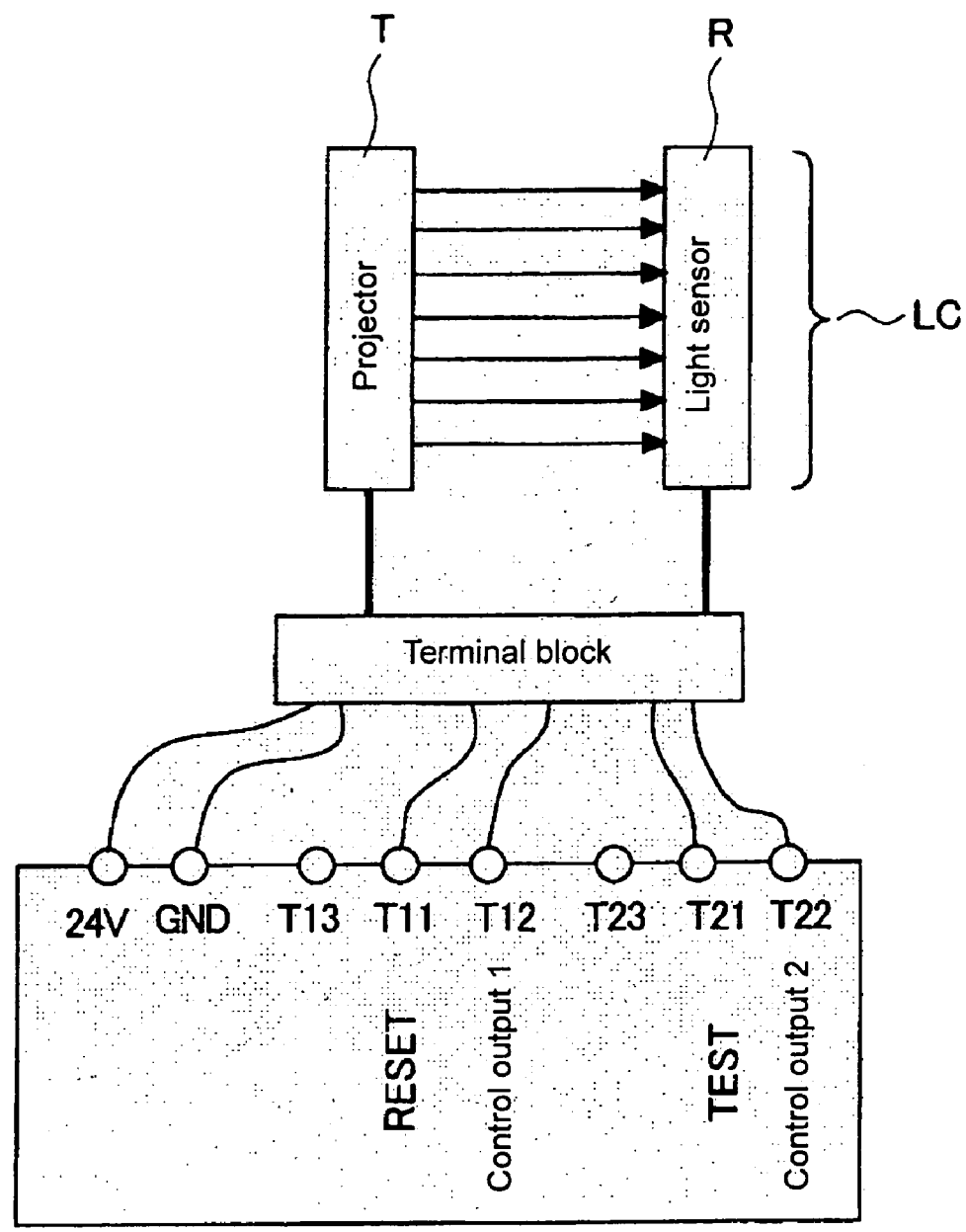
FIG. 16 shows a wiring diagram showing a method for wire-connecting terminal blocks of a light curtain.

FIG. 16 is a wiring diagram showing a method for wire-connecting terminal blocks of a light curtain. In the case of this example, two power supply terminals (24 V, GND) and six eternal input terminals T13, T11, T12, T23, T21, and T22 are arranged in order on external terminal blocks corresponding to one safety switch. Moreover, a reset signal (RESET) corresponds to the terminal T11 which is the first system, a control output 1 corresponds to T12, a test signal (TEST) corresponds to T21 which is the second system, and a control output 2 corresponds to the terminal T22. As well known, a porous-axis light curtain LC if formed between a projector T and a light sensor R to generate the control outputs 1 and 2 when a human body contacts the curtain.

Figure 17:
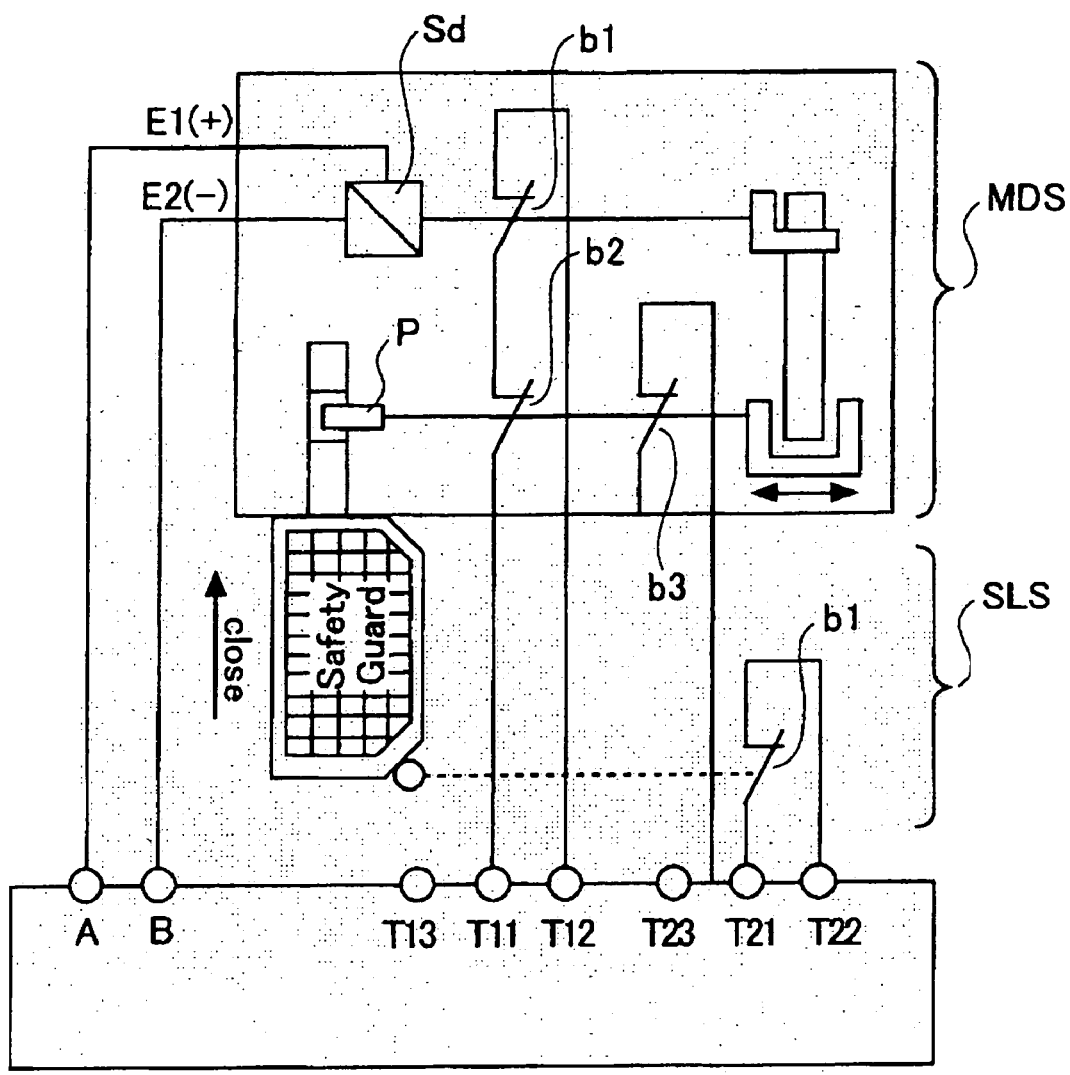
FIG. 17 shows a wiring diagram showing a method for wire-connecting terminal blocks of an electromagnetically-locking safety door switch and a safety limit switch.

FIG. 17 is a wiring diagram showing a method for wire-connecting an electromagnetically-locking safety door switch and a safety limit switch. In the case of this example, solenoid driving terminals (A, B) and six external input terminals T13, T11, T12, T23, T21, and T22 are arranged in order on external terminal blocks for one safety switch. A safety limit switch SLS is provided with one break contact b1 to be driven by a slide actuator (safety guard) and an electromagnetically-locking safety door switch MDS includes a break contact b1 (for confirming solenoid operations) to be operated while interlocking with operations of a solenoid SOL and two break contacts b2 and b3 (inoperative) to be operated while interlocking with the haunting operation of a removal-preventive lock pin p. Moreover, two break contacts b1 and b2 serving as the first system are connected between the terminals T11 and T12. Similarly, the break contact b1 of the safety limit switch SLS is connected between the terminals 21 and 22.

As described above, in the case of input terminal blocks of a safety controller of the present invention, six external input terminals T13, T11, T12, T23, T21, and T22 are arranged in order in areas for one safety switch to make it possible to correspond to various safety switches (emergency stop switch ES, two-hand-control switch 2HS, mat switch MS, safety limit switch SLS, light curtain LC, and electromagnetically-locking safety door switch MDS).

Figure 18:
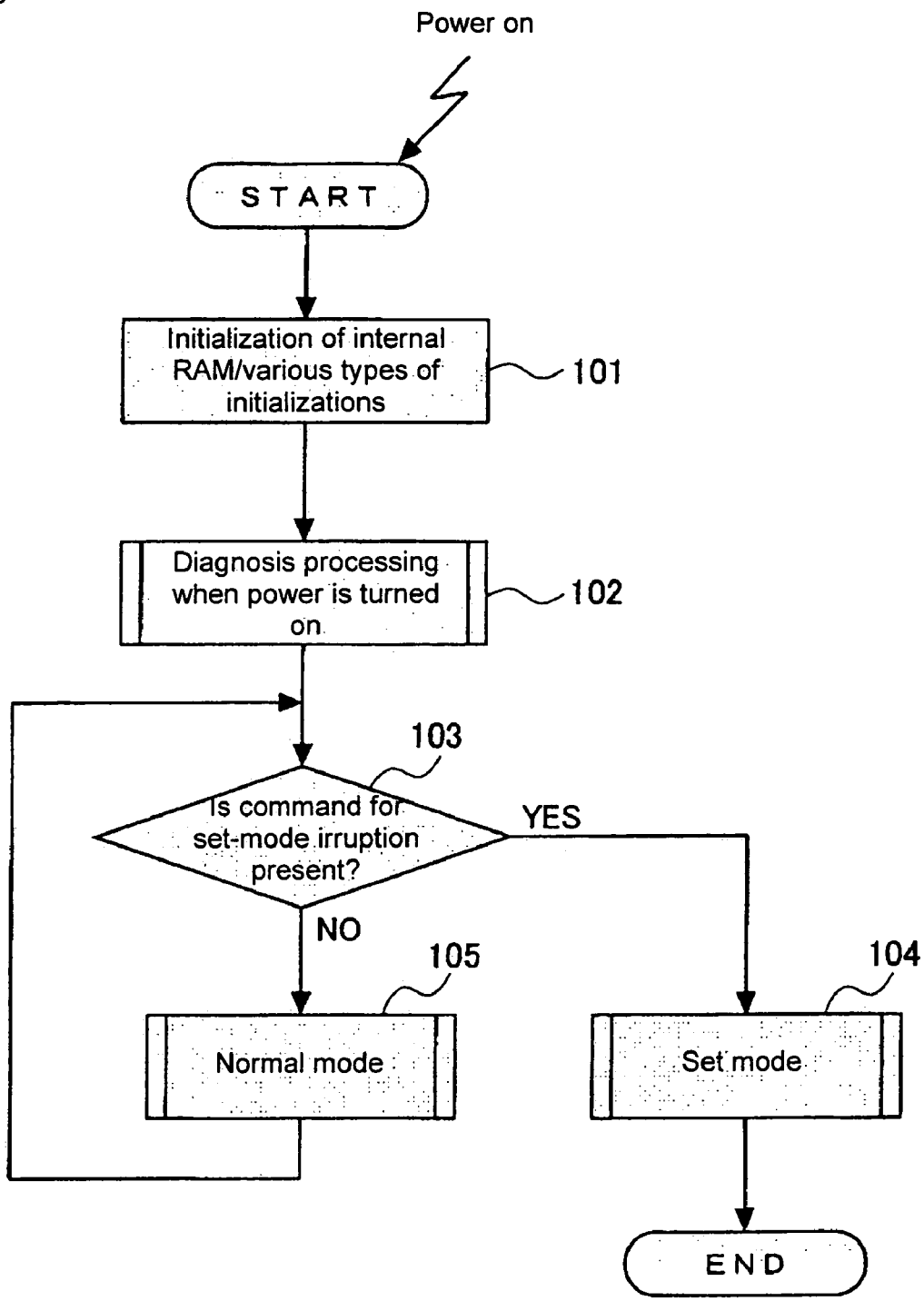
FIG. 18 shows a flowchart schematically showing the whole of a control program to be executed by first and second CPUs.

FIG. 18 is a flowchart schematically showing the whole of a control program to be executed by first and second CPUs. Execution of the flowchart is started by turning on power. In FIG. 18, when the first processing is started, initialization of an internal RAM and various initializations are executed (step 101). The internal RAM in this case denotes a RAM or the like constituting work areas in the first CPU 201 and second CPU 202. In the case of the subsequent diagnosis processing when power is turned on (step 102), various diagnostic processings for improving the reliability of a safety system are executed as to be described later in detail. In the case of the subsequent determination processing on whether a command for set-mode irruption is present (step 103), it is determined whether a predetermined command generated by operating the personal computer (PC) 6 reaches the basic module 2. In this case, it is determined that the command for set-mode irruption is present (YES in step 103), the processing of a set mode (step 104) is executed. However, when the set-mode-irruption command does not reach the basic module 2 (NO in step 103), the processing of the normal mode (step 105) is executed.

Figure 19:
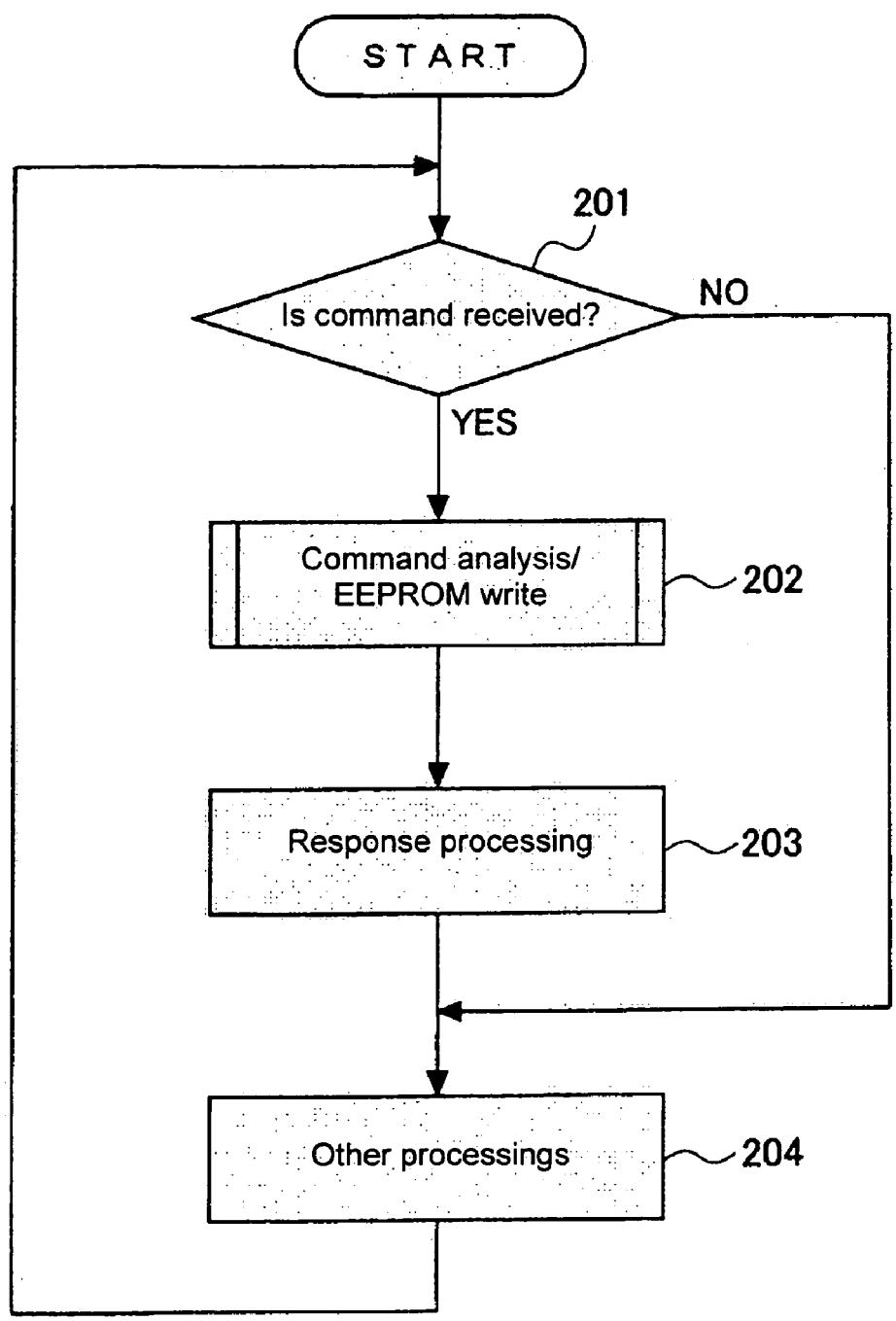
FIG. 19 shows a flowchart showing the whole of a control program to be executed in a set mode.

FIG. 19 is a flowchart showing the whole of a control program to be executed in a set mode. In FIG. 19, when the first processing is started, processings in various set modes are executed (step 204) while checking whether a command is received (NO in step 201). Other processings (step 204) in this case will be described later according to necessity.

When it is confirmed that the command is received (YES in step 201), the command is analyzed and data is written (step 202) in EEPROMs 202*a* and 202*b* (refer to FIG. 4). When write of the data is completed, the response processing (step 203) is executed and a response showing normal end or abnormal end of write is returned to the personal computer (PC) 6 through the communication circuit (RS-232C) 207.

Figure 20:
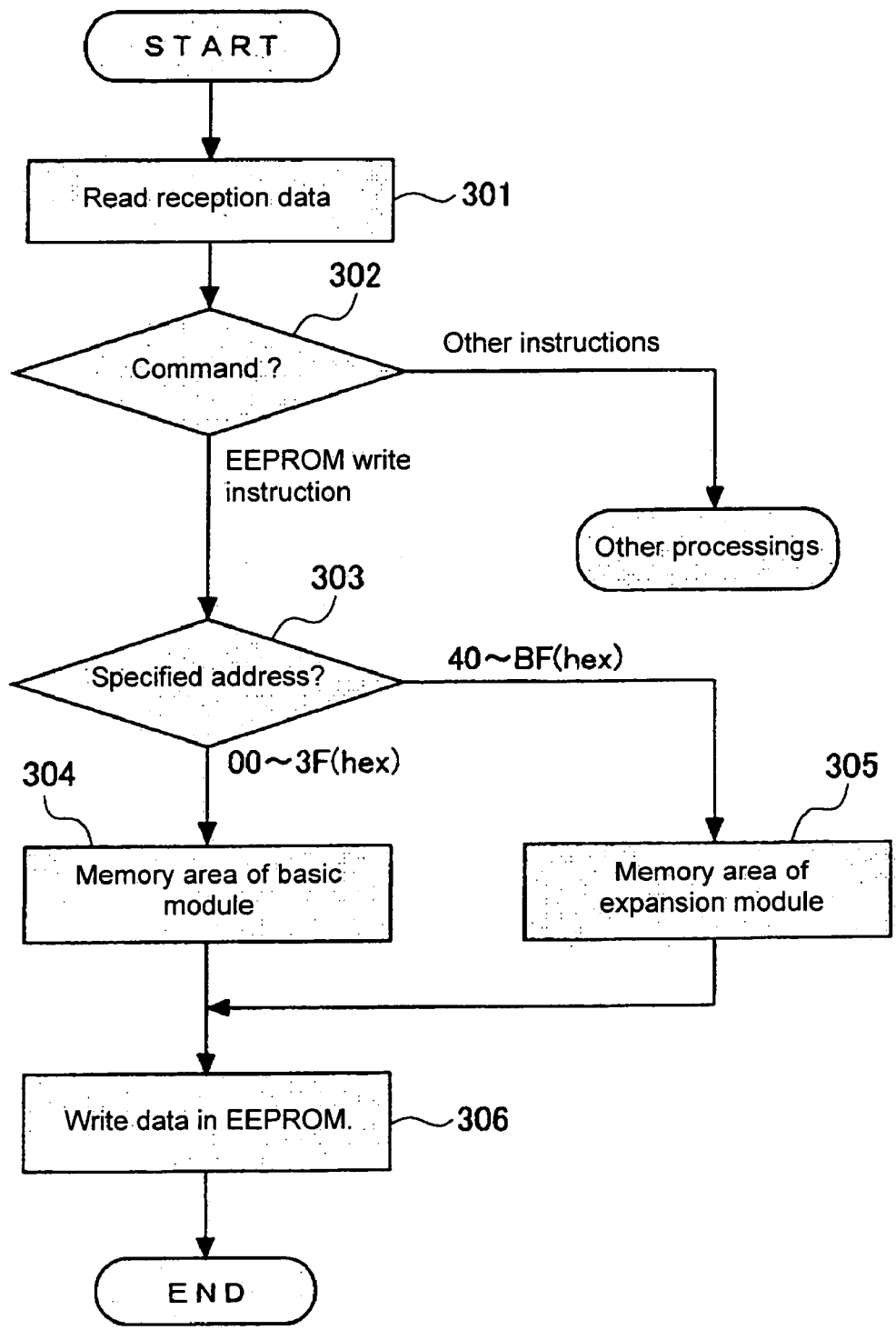
FIG. 20 shows a flowchart showing details of command analysis/EEPROM write processing.

FIG. 20 is a flowchart showing details of the command analysis and EEPROM write processing. In FIG. 20, when the first processing is started, received data is read (step 301) and it is determined whether the content of a read command is an EEPROM write command (step 302). In this case, when a command other than the EEPROM write command is received, the processing is shifted to the other-command processing. However, when the EEPROM write command is received, the specified address of the data to be written in the EEPROM is determined (step 303). In this case, the specified address is determined as 00 to 3F (hex), the reception data is address-designated to the memory area concerned of the basic module and written in the EEPROM of the area concerned (step 306). However, when it is determined that the specified address is 40 to BF (hex), the reception data is address-designated to the memory area concerned of an expansion module (step 305) and the data is written in the both EEPROMs 209a and 209b (refer to FIG. 4) (step 306).

FIG. 21 is an illustration showing the whole of the data arrangement in the EEPROMs 209a and 209b in the form of a table. As shown in FIG. 21, a memory area relating to common specification setting and basic module setting and a memory area relating to expansion module setting are formed in the address space in an EEPROM. The following are stored as areas relating to the common specification setting and basic module setting: CRC (0-FFFFh) as two bytes from address 0, delay time table (0–300) as 30 bytes from address 2, spare space (reserve) as one bye from address 20, delay mode (0: off-delay, 1: on-delay) as one byte from address 21, delay time (0–300) as two bytes from address 22, main module: operation mode as one byte from address 24: (0: 2N, C: emergency stop switch or the like, 1: 1N, C+1N, O, 2: two-hand switch, 3: mat switch, 4: light curtain), spare space (reserve) as one byte from address 25, digital filter value (1–255) as 30 bytes from address 26, allowance of time difference between safety input systems (0: infinite, 1–255) as one byte from address 30, manual reset-on maximum time (0: infinite, 1–255) as one byte from address 31, format data as eight bytes from address 32, spare space (reserve) as two bytes from address 3A, and hardware version (0,00–99,99) as four bytes from address 3C. In this case, the "allowance of time difference between safety input systems" denotes the value of an "inter-system-sync monitoring timer", which is used for processings in FIGS. 39 and 40 to be described later.

Data values corresponding to connection modules 1 to 8 are stored in areas for setting expansion modules as 16 bytes respectively from addresses 40, 50, 60, 70, 80, 90, A0, and B0.

FIG. 22 is an illustration showing the data arrangement for expansion input modules in an EEPROM in the form of a table. As shown in FIG. 22, the following are stored in memory areas assigned to expansion input modules:
(1) module ID (00H: no-connection), 11H: input module, 12H: specific-switch input module 1, 13H: specific-switch input module 2, 14H: specific-switch input module 3, . . . ) as one byte from address 0,
(2) operation mode (0: emergency stop, 1: emergency stop+ input 1 reversal, 2: 2 hands, 3: mat, 4: light curtain as one byte from address 1,
(3) allowance of time difference between safety input systems (0: infinite, 1–255) as one byte from address 2,
(4) spare space (reserve) as one bye from address 3,
(5) digital filter value (1–255) as two bytes from address 4,
(6) operation mode (0: emergency stop, 1: emergency stop+ input 1 reversal, 2: two hands, 3: mat, 4: light curtain) as one byte from address 6,
(7) allowance of time difference between safety input systems (0: infinite, 1–255) as one byte from address 7,
(8) spare space (reserve) as one byte from address 8,
(9) digital filter value (1–255) as two bytes from address 9, and
(10) spare space (reserve) as one byte from address B, and
(11) hardware version (0, 00–99, 99) as four bytes from address C. Thereby, each expansion input module is able to handle two independent safety switches.

FIG. 23 is an illustration showing the data arrangement for expansion output modules in an EEPROM in the form of a table. As shown in FIG. 23, the following are stored in memory areas for expansion output modules:
(1) module ID (00H: no-connection, 01H: AC semiconductor output module, 02H: relay output module, . . . ) for one byte from address 0,
(2) delay mode (0: off-delay, 1: on-delay) as one byte from address 1,
(3) delay time (0–300) as two bytes from address 2,
(4) spare space (reserve) on eight bytes from address 4, and
(5) hardware version (0, 00–99, 99) as four bytes from address C.

In the above-described each data value, the delay mode and delay time are used to allow each expansion output module to generate on-delay output or off-delay output and the delay time can be freely set in a range of 0 to 300(×100) msec. It is a matter of course that the processing for realizing a corresponding output function by referring to contents and delay times of those delay modes are built in the operation program for expansion output modules correspondingly to the table.

Figure 24:
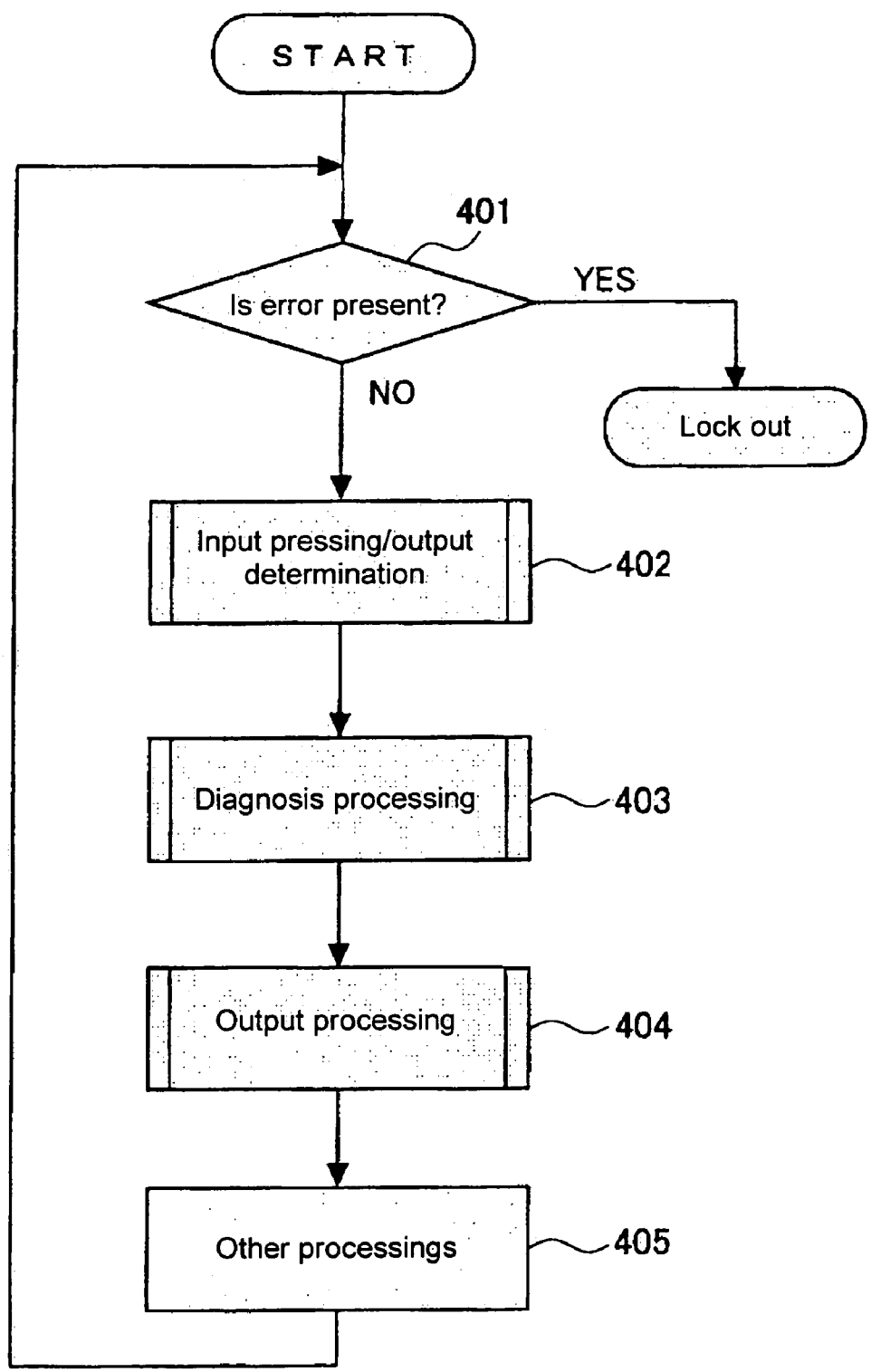
FIG. 24 shows a flowchart showing the whole of a control program to be executed in the normal mode.

FIG. 24 is a flowchart showing the whole of a control program to be executed in the normal mode. In FIG. 24, when the first processing is started, input processing/output determination processing (step 402), diagnosis processing (step 403), output processing (step 404), and other processings (step 405) are repeated in order by premising that no error occurs (NO in step 401).

Figure 25:
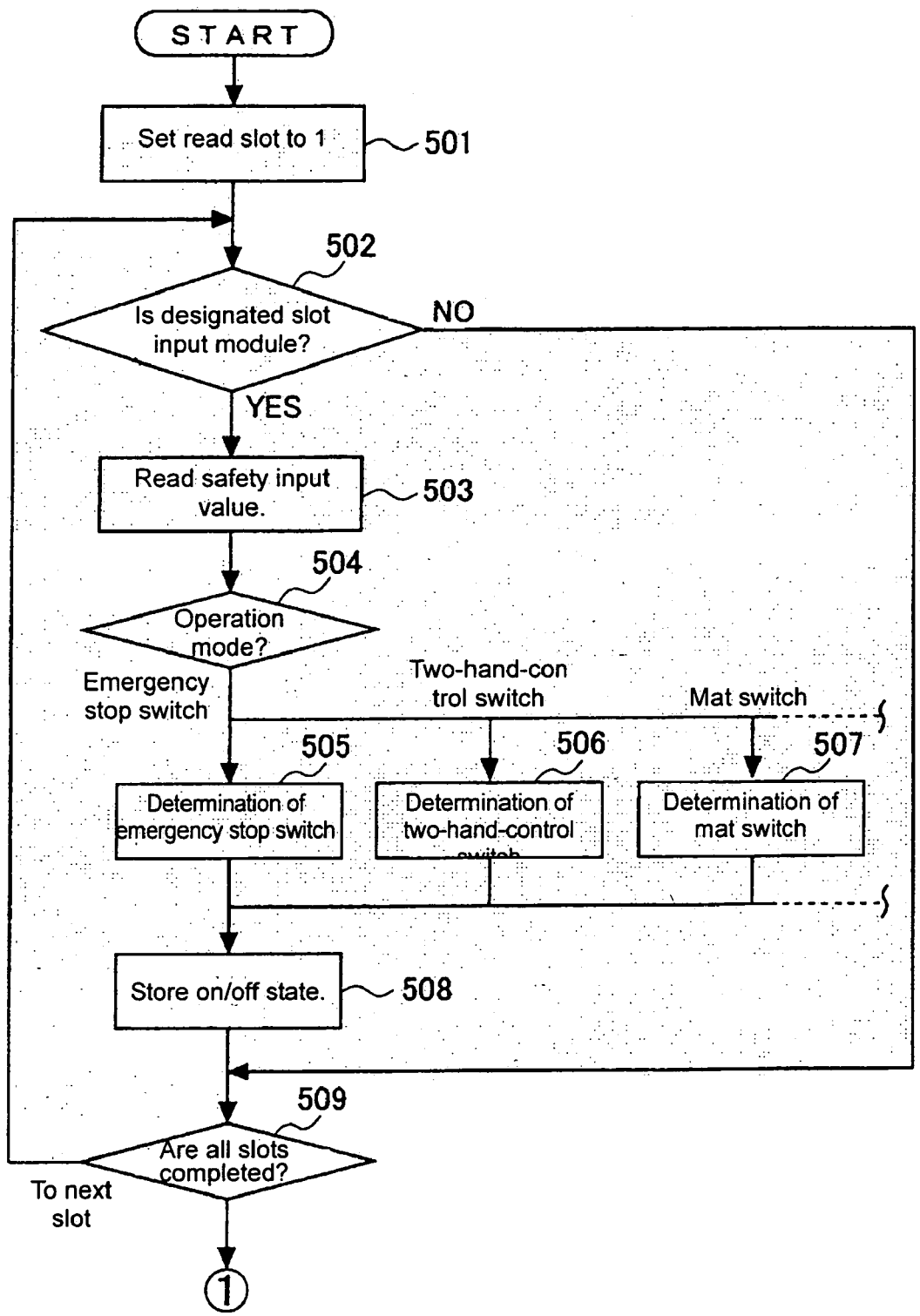
FIG. 25 shows a flowchart showing details of input processing/output determination processing.
Figure 26:
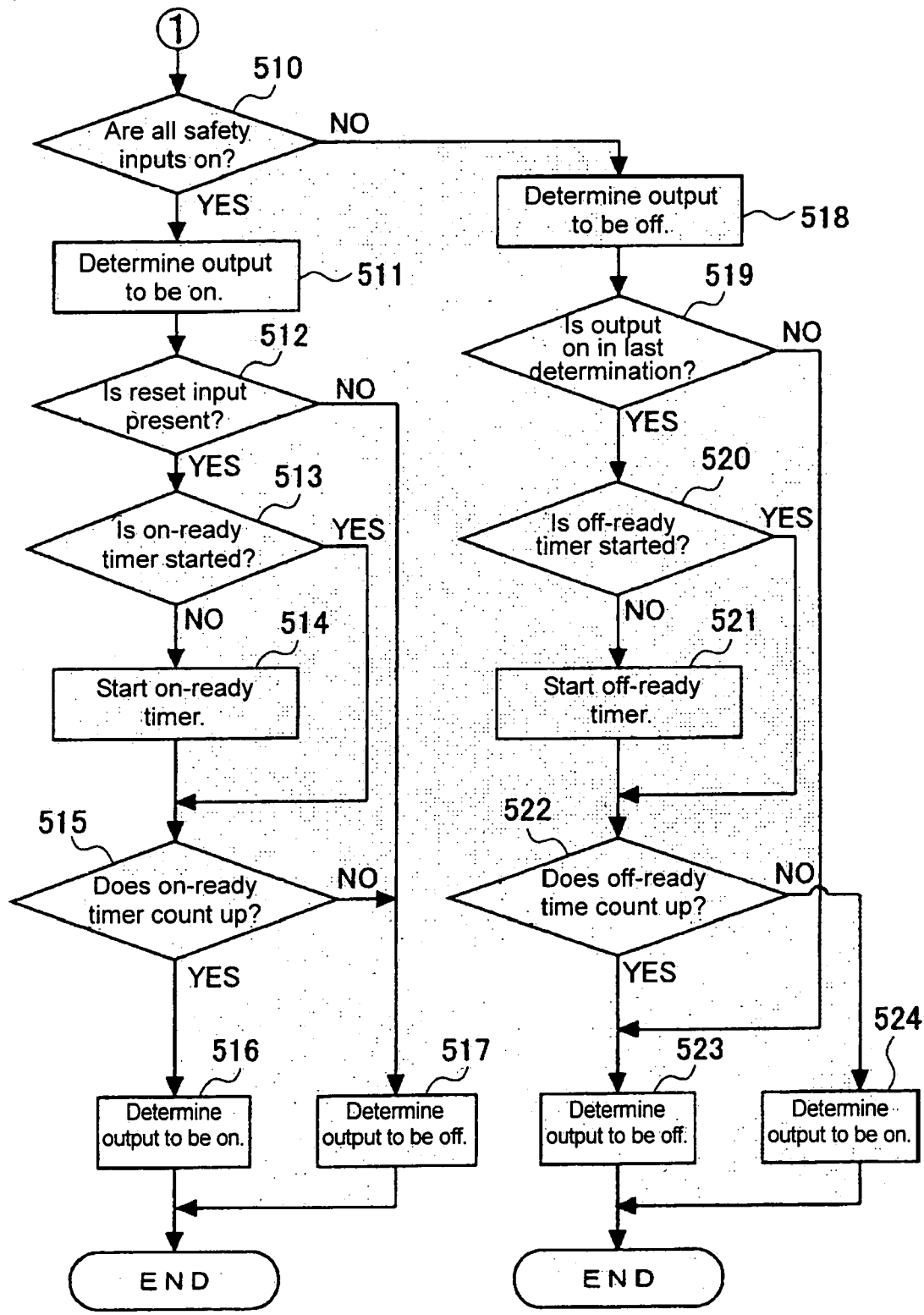
FIG. 26 shows a flowchart (2) showing details of output determination processing.

FIG. 25 is a flowchart (1) showing details of the output determination processing and FIG. 26 is a flowchart (2) showing details of the output determination processing.

In FIGS. 25 and 26, when the first processings are started, the number for a read slot is set to "1" in step 501. In step 502, it is determined whether the designated slot is an input module. In this case, when it is determined that the slot is an input module (YES in step 502), reading a safety input value is executed (step 503). Then, the operation mode requested to the module set to the slot is determined and any one of the output determination processings (steps 505, 506, 507, . . . ) of the switch concerned is executed in accordance with the fact that the operation mode is "emergency stop switch", "two-hand-control switch", or "mat switch". In these determination processings, the present on/off state of the safety switch concerned is determined by executing a predetermined safety operation program correspondingly to the type and internal structure of each safety switch. The on or off state thus determined is stored in a memory (step 508).

The above operations are executed in order for the expansion module set to each expansion slot while updating the number for an expansion slot by +1. That is, when these processings (steps 505, 506, 507, and 508) are executed for all slots, the on/off state of each safety switch is stored in a memory. Thus, when processings for all slots are completed (step 509), it is determined whether all safety inputs are on in FIG. 26 (step 510).

In this case, when it is determined that all the safety inputs are on (YES in step 510), it is determined that the outputs are turned on (step 511). Thereafter, presence or absence of a reset input is determined (step 512). When there is a reset input (YES in step 512), the start processing of an on-delay timer is executed (step 514) by premising that the on-delay timer is not started yet (NO in step 513) and it is determined that outputs are off (step 517) until the on-delay timer counts up (NO in step 515). However, when counting-up by the on-delay timer is confirmed (YES in step 515), it is determined that outputs are on. Thereby, an on-delay function for external outputs is realized. When there is no reset input (NO in step 512), it is immediately determined that outputs are off (step 517).

Presence or absence of the reset input determined in step 512 is based on a signal sent from a reset button connected to the first input circuit 203 or second input circuit 204 of the basic module. That is, in the case of this type of safety system, a small pushbutton to be lightly operated by a finger tip is set to perform the reset operation of the whole system to reset the start of the whole system by operating the pushbutton in general.

However, when it is determined that any one of inputs is off (NO in step 510), outputs are determined to be off (step 518) and then, it is determined whether outputs are on in the last determination (step 519). In this case, when outputs are on as a result of the last determination (YES in step 519), the start processing of an off-delay timer is executed (step 521) by premising that the off-delay timer is not started yet (NO in step 520) and it is determined that outputs are on until counting-up by the off-delay timer is confirmed (NO in step 522). However, when counting-up by the off-delay timer is confirmed during the above operations (YES in step 522), it is determined that outputs are off (step 523). Thereby, the off-delay function for external outputs is realized. However, when it is determined in the last determination that outputs are not on (NO in step 519), it is immediately determined that outputs are off (step 523).

In the case of the flowchart in FIG. 26 described above, on-delay processing is automatically executed when all safety inputs are on and off-delay processing is executed when all safety inputs are off. These processings are executed when allocating one output to a plurality of safety input switches. In the case of a safety controller of the present invention, however, it is also possible to relate a plurality of expansion output modules to a plurality of safety switches. The data arrangement for an expansion output module shown in FIG. 23 previously described is prepared by assuming the above case. That is, as previously described, a delay mode and delay time can be set for each expansion output module. Therefore, when these are set, either of the on-delay processing (steps 511 to 517) and the off-delay processing (steps 518 to 524) described in FIG. 26 is executed for an expansion output mode to which the delay mode is set. As a result, the on-delay processing or off-delay processing is executed for each of a plurality of expansion output modules.

Figure 27:
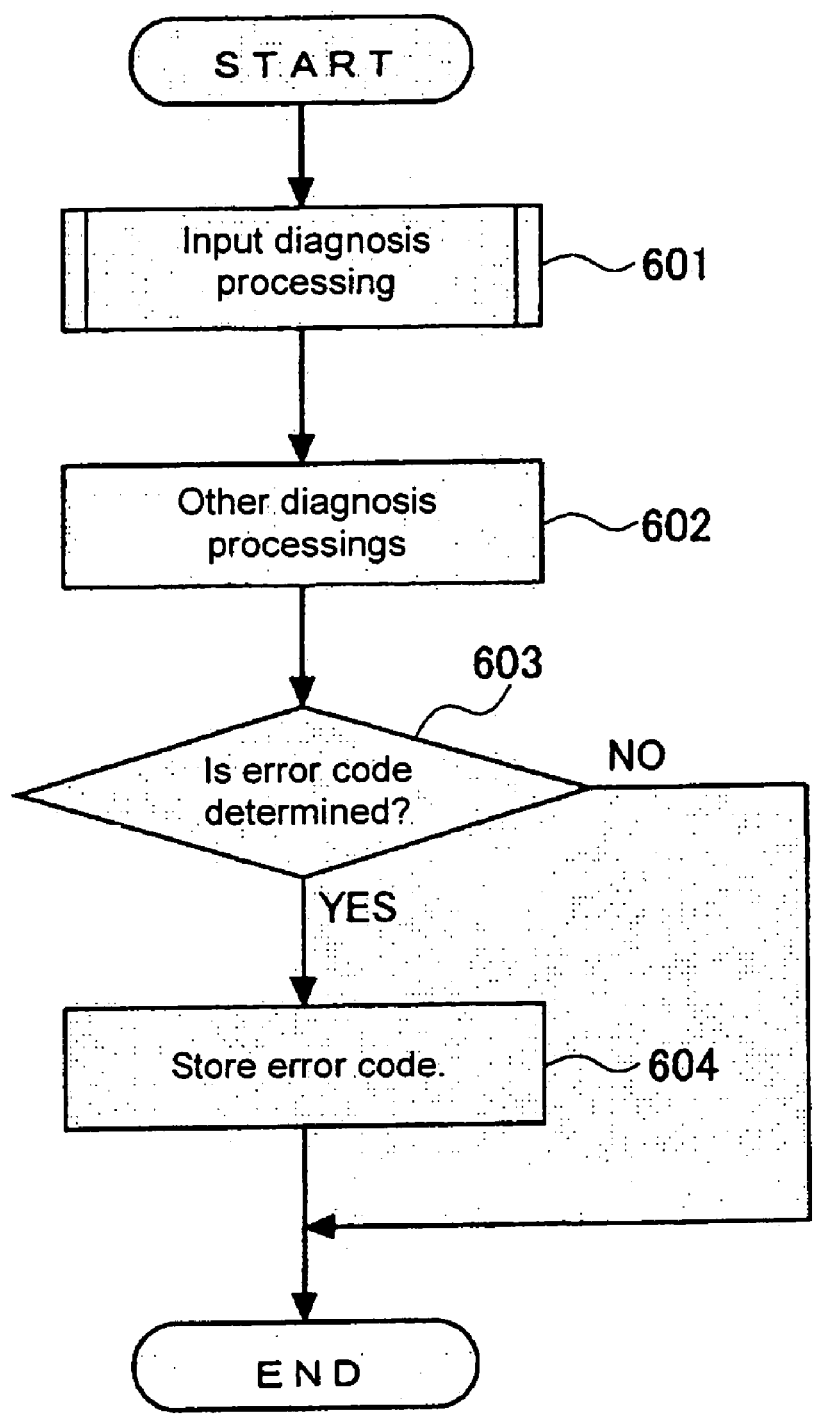
FIG. 27 shows a flowchart showing details of diagnosis processing.

FIG. 27 is a flowchart showing details of the diagnosis processing. As shown in FIG. 27, in this processing, when an error code is determined (YES in step 603) in either of the input diagnosis processing (step 601) and other diagnosis processing (step 602) while executing the both processings, the processing for storing the error code in a memory is executed (step 604).

Then, the input diagnosis processing is described below by referring to FIGS. 28 to 37. The input diagnosis processing has two large functions. The first function is to diagnose a safety switch externally connected to an input terminal block. The second function is to diagnose states of an output circuit and input circuit present in an input terminal block. In this case, the output circuit denotes a drive circuit for selectively supplying a voltage to each terminal constituting the input terminal block and the input circuit denotes a level sift circuit for lowering 24 V supplied to the terminal block form an external unit to 5 V for an logic IC and a gate set to the rear stage of the level shift circuit.

The contact configuration of a safety switch includes a no-voltage contact and a voltage contact. An emergency stop switch, mat switch, and two-hand-control switch mainly correspond to the no-voltage contact. A light curtain or the like corresponds to the voltage contact.

Figure 34:
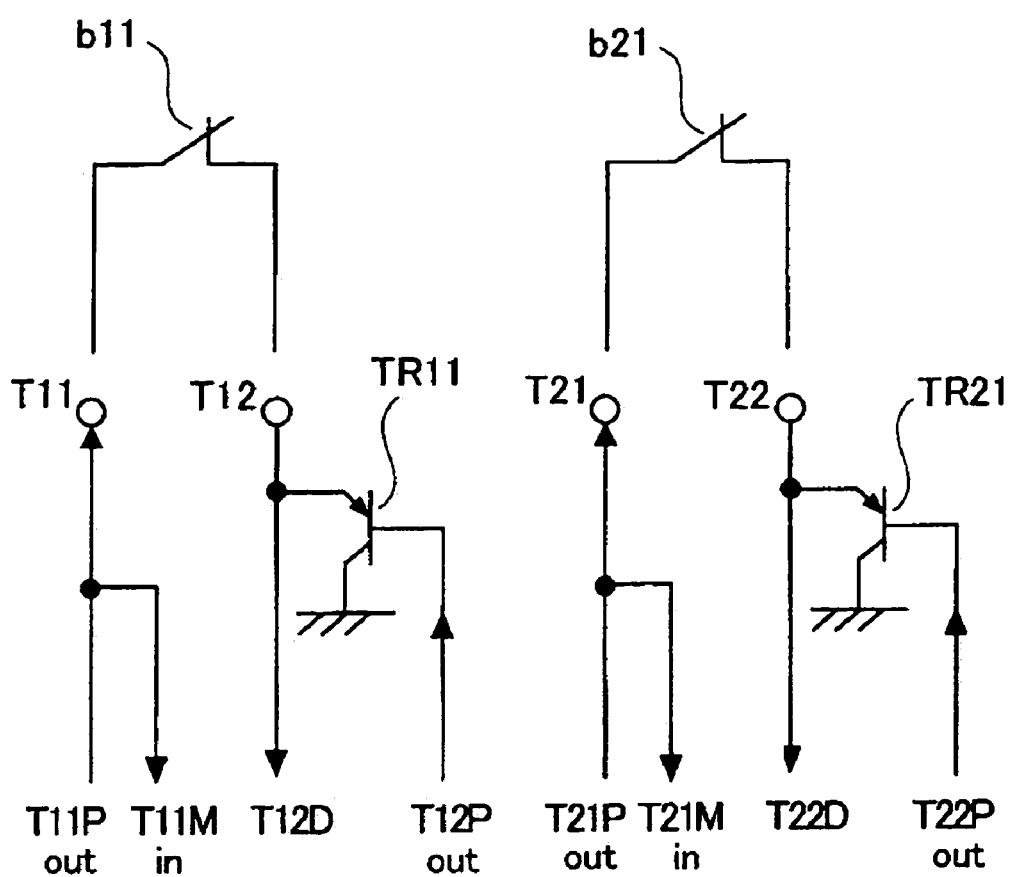
FIG. 34 shows an illustration showing wire connections between input-terminal hardware configuration and safety switches (corresponding to no-voltage contact).
Figure 35:
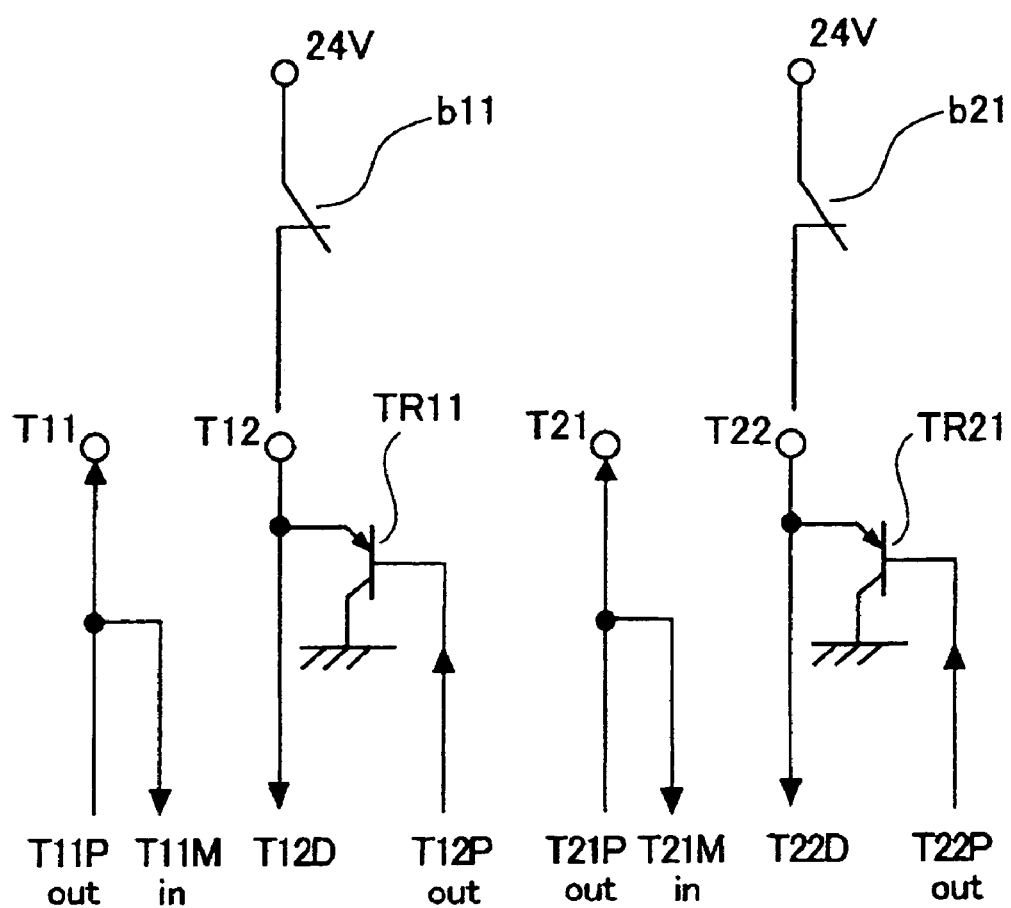
FIG. 35 shows an illustration showing wire connections between put-terminal-block hardware configuration and safety switches.

FIG. 34 is an illustration sowing a wire connection between a hardware configuration and a safety switch of an input terminal block (corresponding to no-voltage contact) and FIG. 35 is an illustration showing a wire connection between a hardware configuration and a safety switch of an input terminal block (corresponding to voltage contact). As shown in FIGS. 34 and 35, the input terminal block is provided with four terminals of T11, T12, T21, and T22. Moreover, when using the terminals so as to correspond to a no-voltage contact, the break contact b11 of the first system of a safety switch is connected between the terminals T11 and T12. However, the break contact b21 of the second system is connected between the terminals T21 and T22.

An input circuit and output circuit set in this terminal block are constituted as described below. An output circuit and input circuit are connected to the terminal block in anti-parallel though they are not illustrated in terminal T11. In this case, a signal output from the output circuit is expressed as T11P (out) and a signal input to the input circuit from the terminal T11 is expressed as T11M (in). An input circuit and output circuit are also set to the terminal T12 though they are not illustrated. A signal input to an input circuit from the terminal T12 is expressed as T12D and a signal output from an output circuit to drive a transistor TR11 is expressed as T12P (out).

The configuration of the second system is described below. The terminal T21 is provided with an output circuit and input circuit in anti-parallel though they are not illustrated. In this case, a signal output to the terminal T21 from the output circuit is expressed as T21P (out) and a signal input to the input circuit from the terminal T21 is expressed as T21M (in). Moreover, an input circuit and output circuit are also set to the terminal T22. In this case, a signal input to the input circuit from the terminal T22 is expressed as T22D and a signal output from the output circuit to drive a transistor TR21 is expressed as T22P (out).

As clarified by comparing FIG. 34 with FIG. 35, in the case of no-voltage contact correspondence, the contact b11 of the first system of a safety switch is connected between the terminals T11 and T12. Moreover, the break contact b21 of the second system is connected between the terminals T21 and T22. In the case of the voltage-contact correspondence, however, the break contact b11 of the first system is connected between the power supply 24 V and the terminal T12. Furthermore, the break contact b21 of the second system is connected between the power supply 24V and the terminal T22.

Then, on the assumption of the circuit configuration in FIGS. 34 and 35, the configuration of the diagnosis d processing newly developed by the present inventor et al. is described below by referring to FIGS. 28 to 33. This input diagnosis processing is executed while operating the first CPU 201 and second CPU 202 in parallel. Moreover, in the first half of the whole processing, the first CPU takes charge of the diagnosis on the break contact of the first system and the second CPU executes the diagnosis processing on the break contact of the second system. In the second half of the whole processing, functions are reversed, that is, the first CPU executes the diagnosis processing on the break contact of the second system and the second CPU executes the diagnosis processing on the break contact of the first system.

Moreover, though these diagnosis processings are processings of properly supplying output signals to the terminals T11, T12, T21, and T22 previously explained, functions are previously fixed about outputting voltages to these terminals. That is, it is assumed that outputting voltages to the terminals T11 and T12 of the first system is perform by the first CPU and outputting voltages to the terminals T21 and T22 of the second system is performed by the second CPU. These relations are fixed in hardware. However, signals can be received from those four terminals T11, T12, T21, and T22 by the first CPU and second CPU in parallel. That is, signals can be received from these four terminals T11, T12, T21, and T22 by both the first CPU and second CPU.

Figure 28:
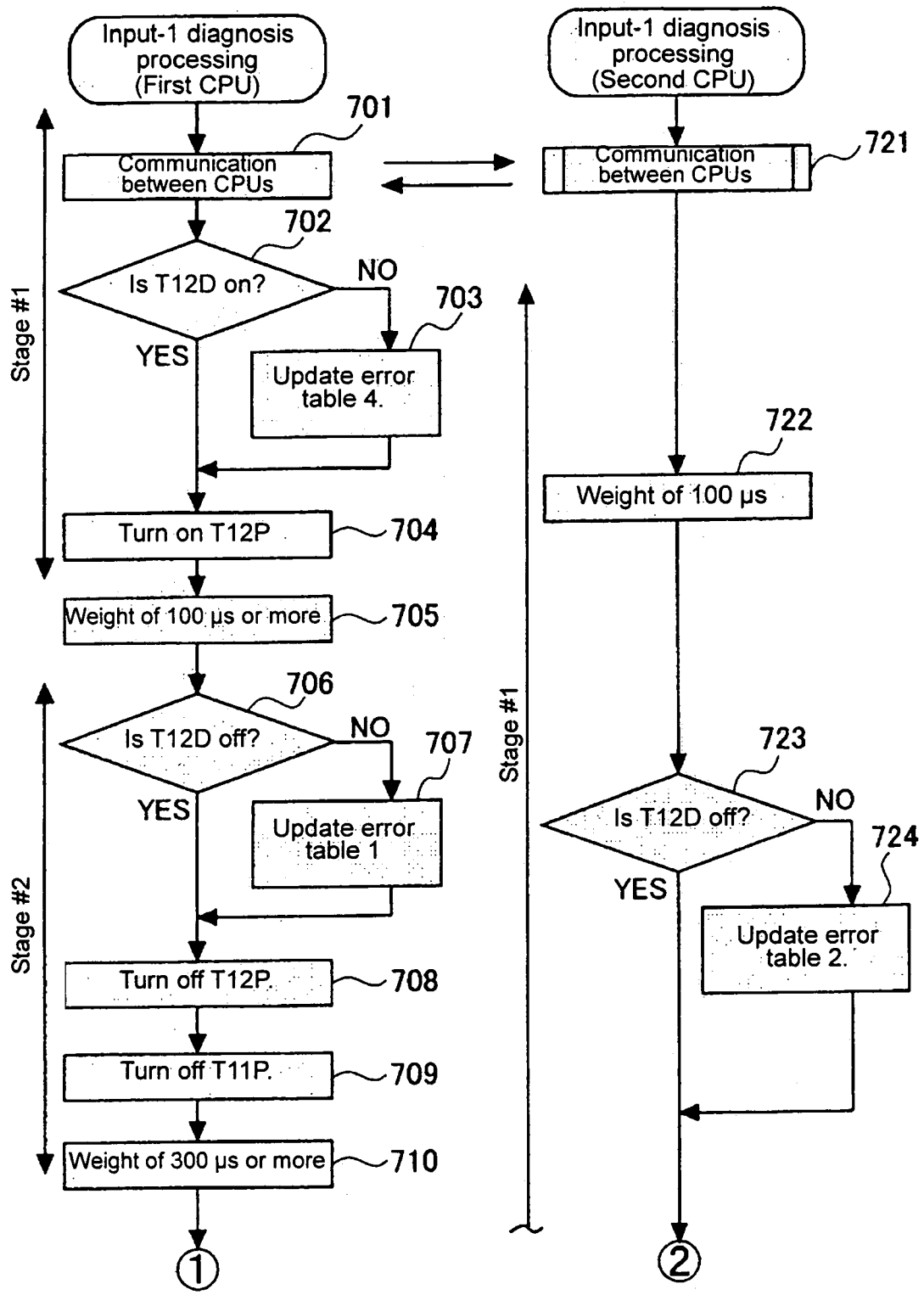
FIG. 28 shows a flowchart (1) showing details of input diagnosis processing.
Figure 29:
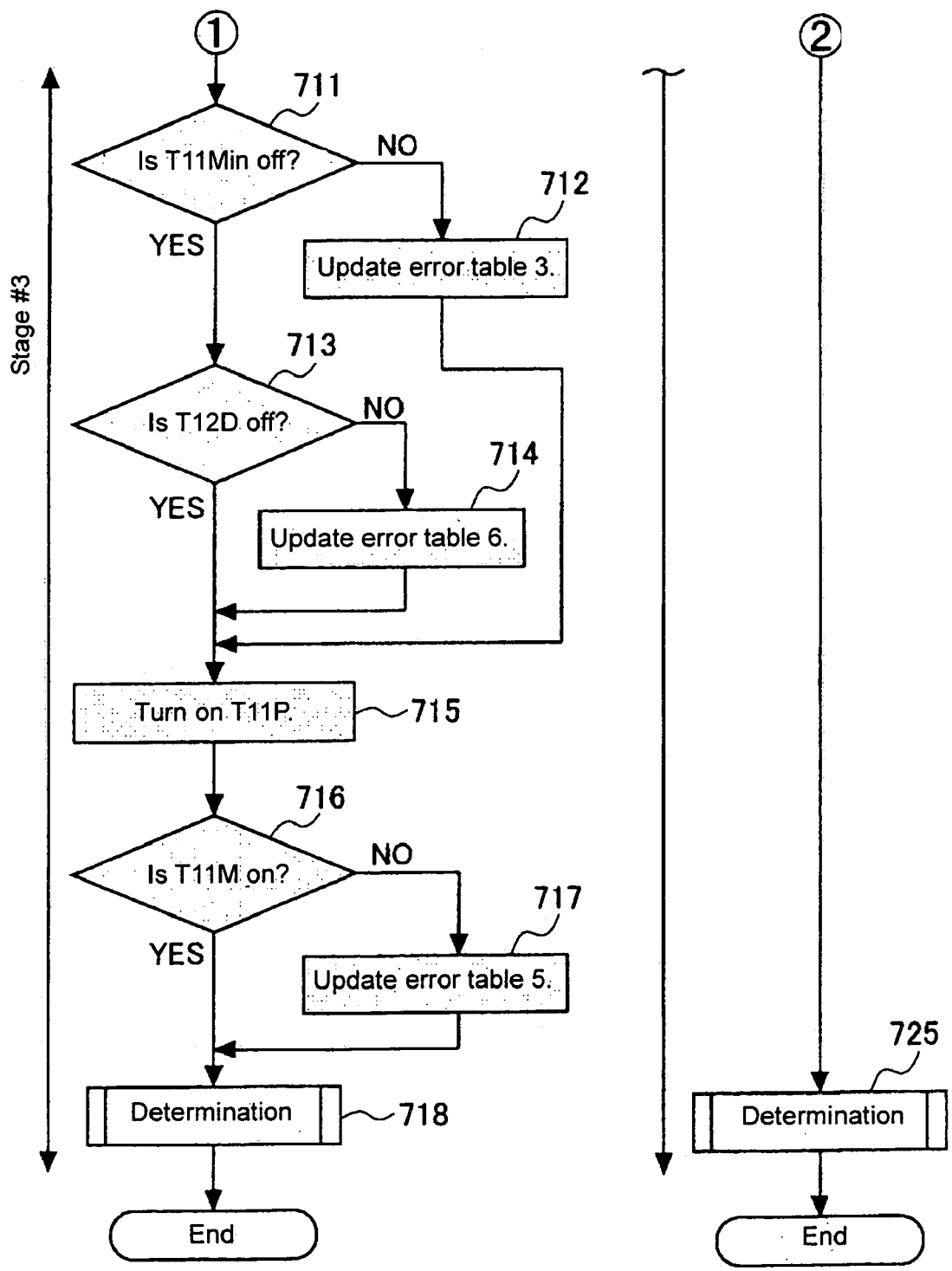
FIG. 29 shows a flowchart (2) showing details of input diagnosis processing.

Then, first-half processings of the input diagnosis processing are described below by referring to FIGS. 28 and 29. In FIGS. 28 and 29, When the first processings are started, the first CPU and second CPU first establish synchronization by executing communication between the CPUs each other (steps 701 and 721).

Then, the first CPU determines whether T12D is on (step 702). As shown by the circuit in FIG. 34, it is possible to determine whether the break contact b11 of the first system is disconnected or it is not electrified by confirming whether the T12D is on ("H") or off ("L") when the T11P (out) is on ("H"). In this case, it is determined that the T12D is not on (NO in step 702), an error table 4 (described later) is updated (step 703) and occurrence of the disconnection or not-electrification is stored. However, when T12D is on ("H") (YES in step 702), it is determined that the disconnection or not-electrification does not occur.

Then, the first CPU turns on T12P ("H") (step 704) and executes the weight processing of 100 us or more (step 705) and then, determines whether T12D is off ("L") (step 706). In this case, determining whether T12D is off ("L") while turning on T12P ("H") represents to diagnose the state of the input circuit connected to the terminal T12. In this case, when it is determined that T12D is not off ("L") (NO in step 706), a predetermined error table 1 is updated (step 707) and the trouble of the input circuit built in the terminal T12 at the first system is stored.

Then, the first CPU turns off T12P ("L") (step 708) and turns off T11P ("L") (step 709), executes the weight processing of 300 µs or more (step 710), then in FIG. 29, determines whether T11min is off ("L") (step 711). In this case, determining whether T11min is off ("L") while turning off T12 ("L") and turning off T11P ("L") represents to determine whether a short circuit occurs between the break contact b11 of the first system and the break contact b21 of the second system. In this case, when it is determined that T11min is not off ("L") (NO in step 711), an error table 3 is updated (step 712) and the above described short circuit between the first system and the second system is stored.

Moreover, the first CPU executes to determine whether T12D is off ("L") (step 713). In this case, determining whether T12D is off ("L") represents a case in which wiring of 24 V to a mat switch is erroneously connected or disconnected particularly when a safety switch is the mat switch. In this case, when it is determined that T12D is not off ("L") (NO in step 713), an error table 6 is updated (step 714) and the fact that an abnormal wiring is applied to the mat switch is substantially stored.

Then, the first CPU turns on T11P ("H") and determines whether T11M is on ("H") (step 716). In this case, determining whether T11M is on ("H") while turning on T11P ("H") represents that a circuit built in the terminal T11 of the first system is troubleshot. In this case, when it is determined that T11M is not on ("H") (NO in step 716), an error table 5 is updated (step 717) and a trouble of the circuit built in the terminal T11 is stored.

However, during the processing by the first CPU, the second CPU performs the communication between the CPUs (step 721), executes the weight processing of 100 µs (step 722), then determines whether T12D is off ("L") (step 723). In this case, the fact that T12D is off ("L") is the same as the processings (in steps 706 and 707) previously executed at the first CPU. This represents that the second CPU also determines whether the internal input circuit in the T12 is normal.

Thus, stages #1, #2, and #3 are successively executed at the first CPU and finally, the both CPUs execute determination processings (in steps 718 and 725) when the state of the stage #1 is completed at the second CPU.

Figure 36:
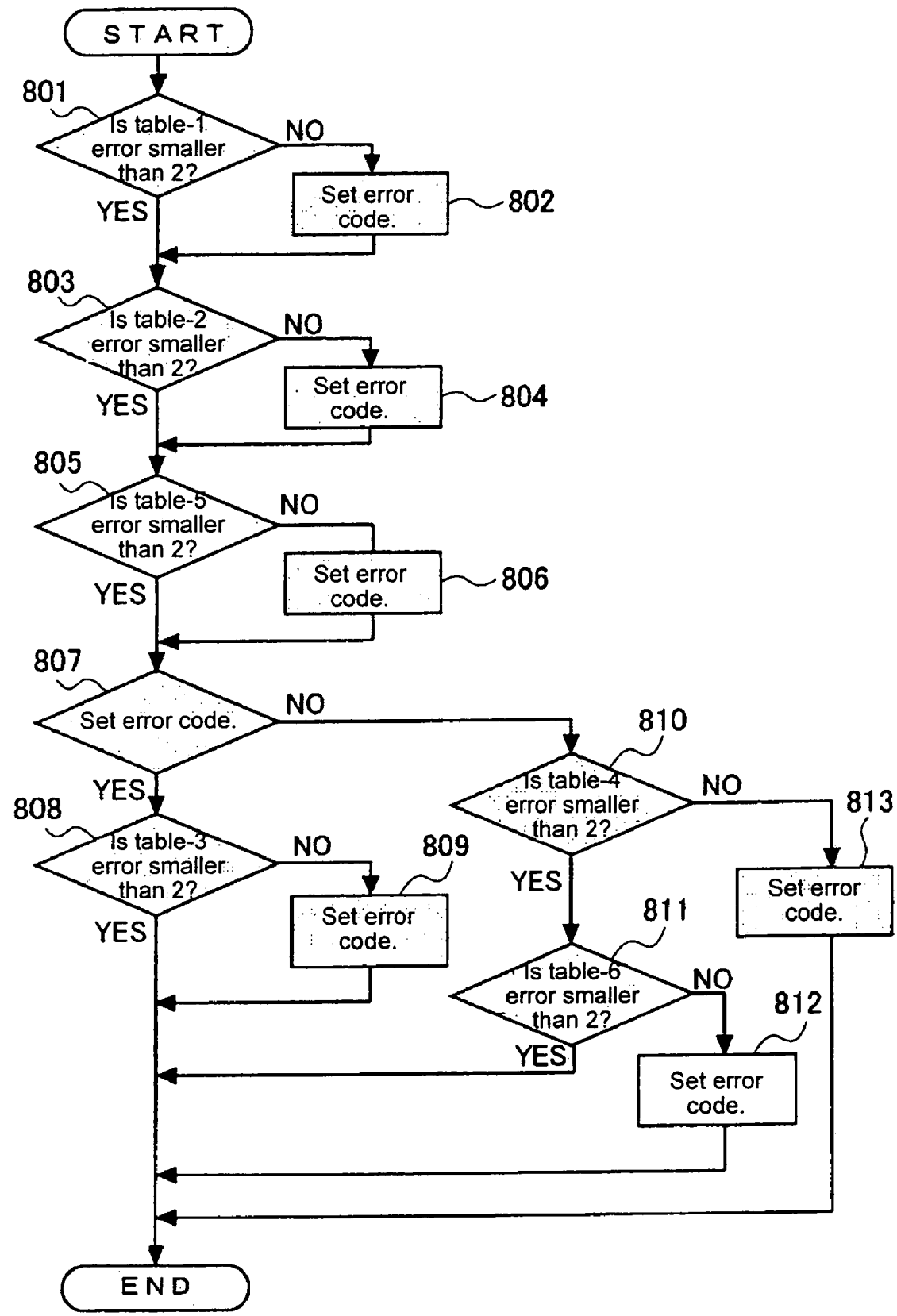
FIG. 36 shows a flowchart showing details of determination processing.

FIG. 36 is a flowchart showing details of determination processing. This determination processing determines a trouble of a safety switch and/or troubles of the input and output circuits built in an input terminal block by referring to the contents of the error table shown in FIG. 37. That is, as shown in FIG. 37, a diagnosis result storage area is provided for the basic module and each of the expansion modules 1 to 8 in the input-diagnosis table. Moreover, in FIG. 37, the area in which "mode" is written shows operation modes of the modules. In this case, as previously described, "0" denotes an emergency stop mode, "1" denotes an emergency stop+input-1 active reverse mode, "2" denotes a two-hand-control switch mode, "3" denotes a mat switch mode, "4" denotes a light curtain mode, and "−1" denotes no-connection. Moreover, five areas constituted by "table-1 self-input-section trouble", "table-2 other-input-section trouble", "table-3 safety input", "tables 4, 6 disconnection", and "table-5 monitor circuit trouble" are formed in the diagnosis result storage area. Furthermore, a diagnosis result is stored in each area with a predetermined code. In this case, "0" denotes diagnosis not executed (regularly cleared by a system), "−1" denotes normal end, "1" denotes first-time trouble once, and "2" denotes second-time trouble. Therefore, by referring to contents of the error table for input diagnosis, it is possible to accurately determine a trouble of a safety switch, and/or troubles or a trouble of an input circuit and/or an output circuit of a terminal block by confirming a diagnosis result while referring to the mode of a basic module or that of each of expansion modules.

Figure 30:
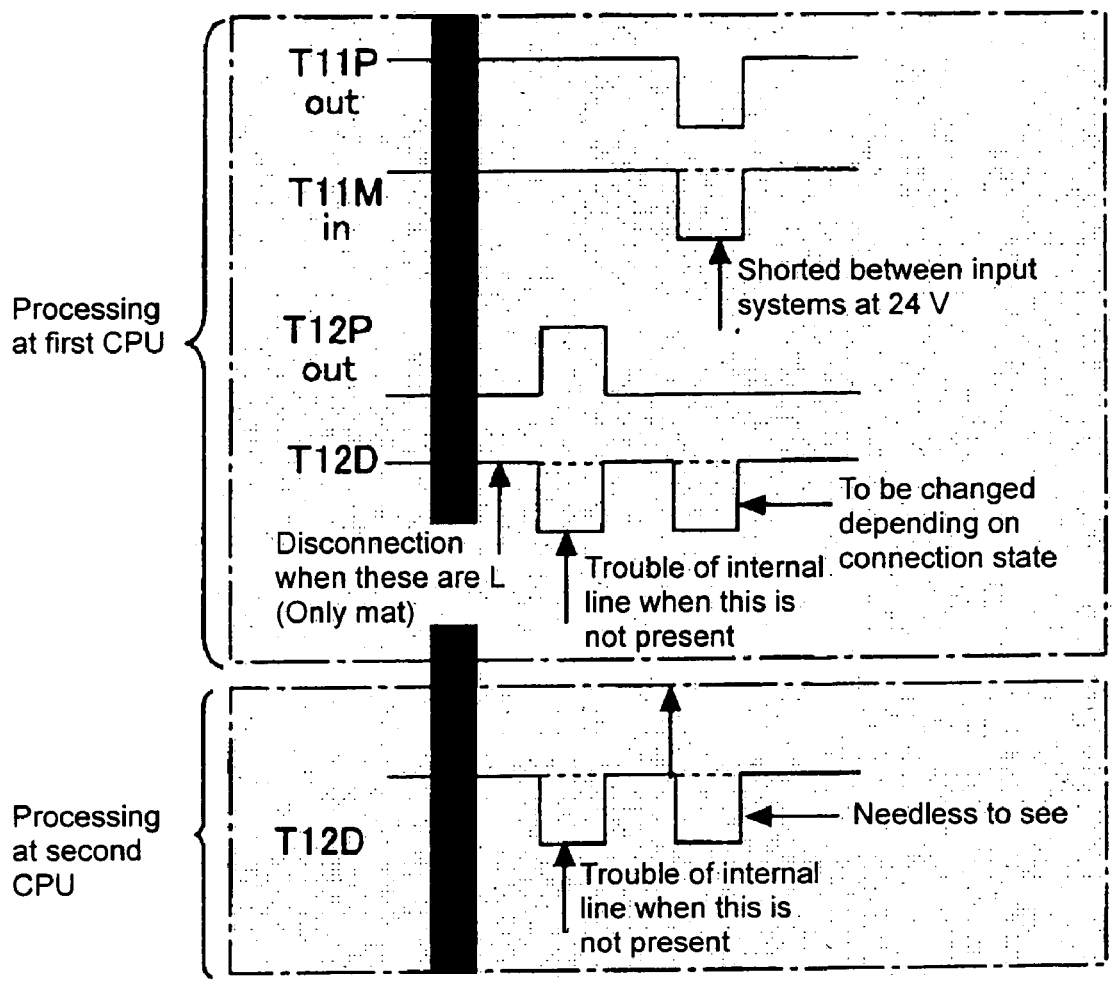
FIG. 30 shows a time chart showing input-circuit diagnosis processing.

Then, signal states in the first-half processings described above are described below in accordance with the time chart shown in FIG. 30. In FIG. 30, the upper side denotes processings by the first CPU and the lower side denotes the processing by the second CPU. As shown in FIG. 30, the processing by the first CPU makes it possible to determine a trouble state of an internal circuit by referring to the signal state of T12D while turning on T2P (out) ("H"). Moreover, the processing makes it possible to determine a trouble state of the internal circuit as a short circuit between input systems by referring to the state of T11M (in) while turning off T11P (out) ("L"). Furthermore, the processing makes it possible to determine a trouble state of the internal circuit as disconnection only in the case of a mat switch when the signal state of T12D is kept at "L" from the beginning as a result of referring to it. Moreover, in the case of the processing by the second CPU, it is possible to properly determine a trouble state of the internal circuit by referring to T12D.

Figure 31:
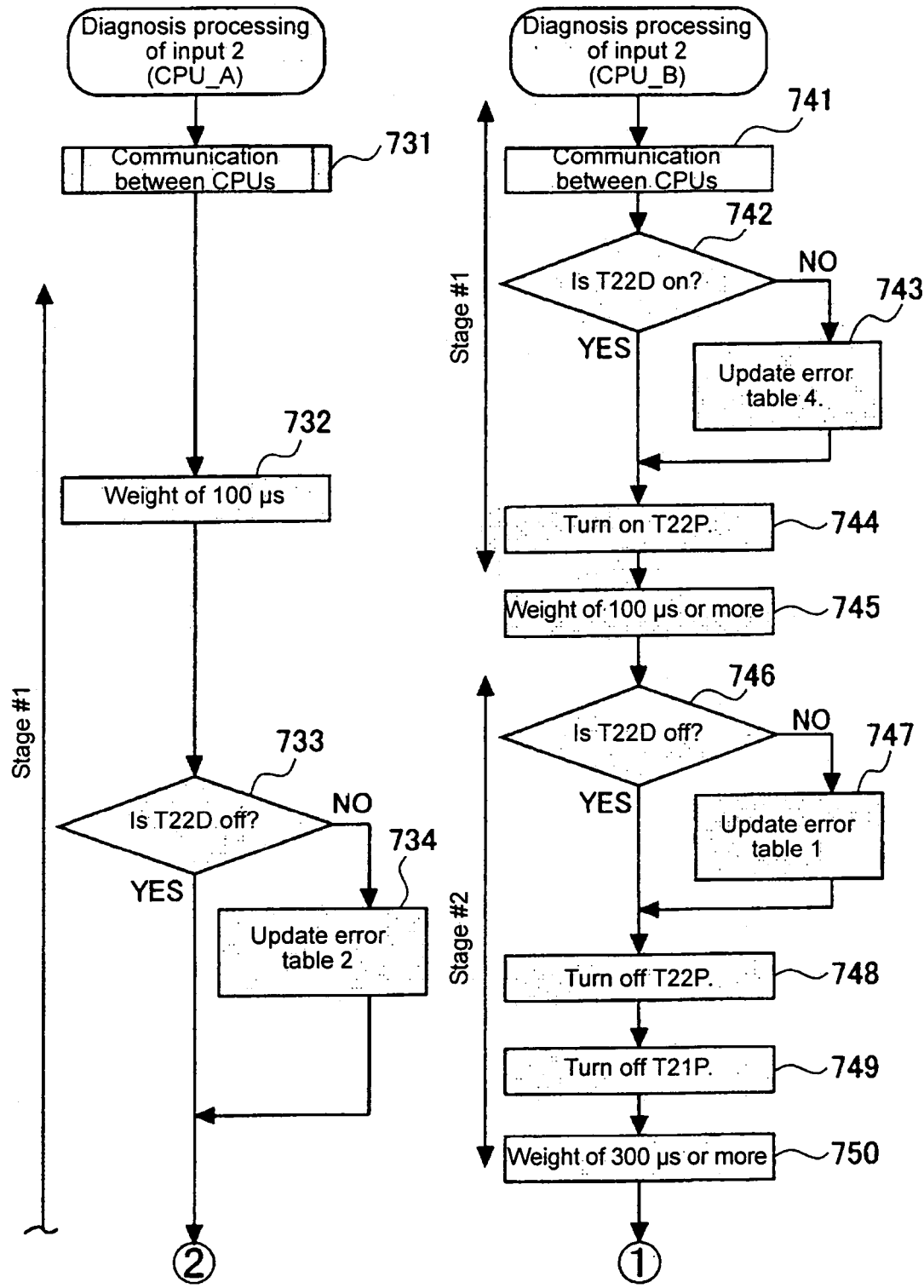
FIG. 31 shows a flowchart (3) showing details of input diagnosis processing.
Figure 32:
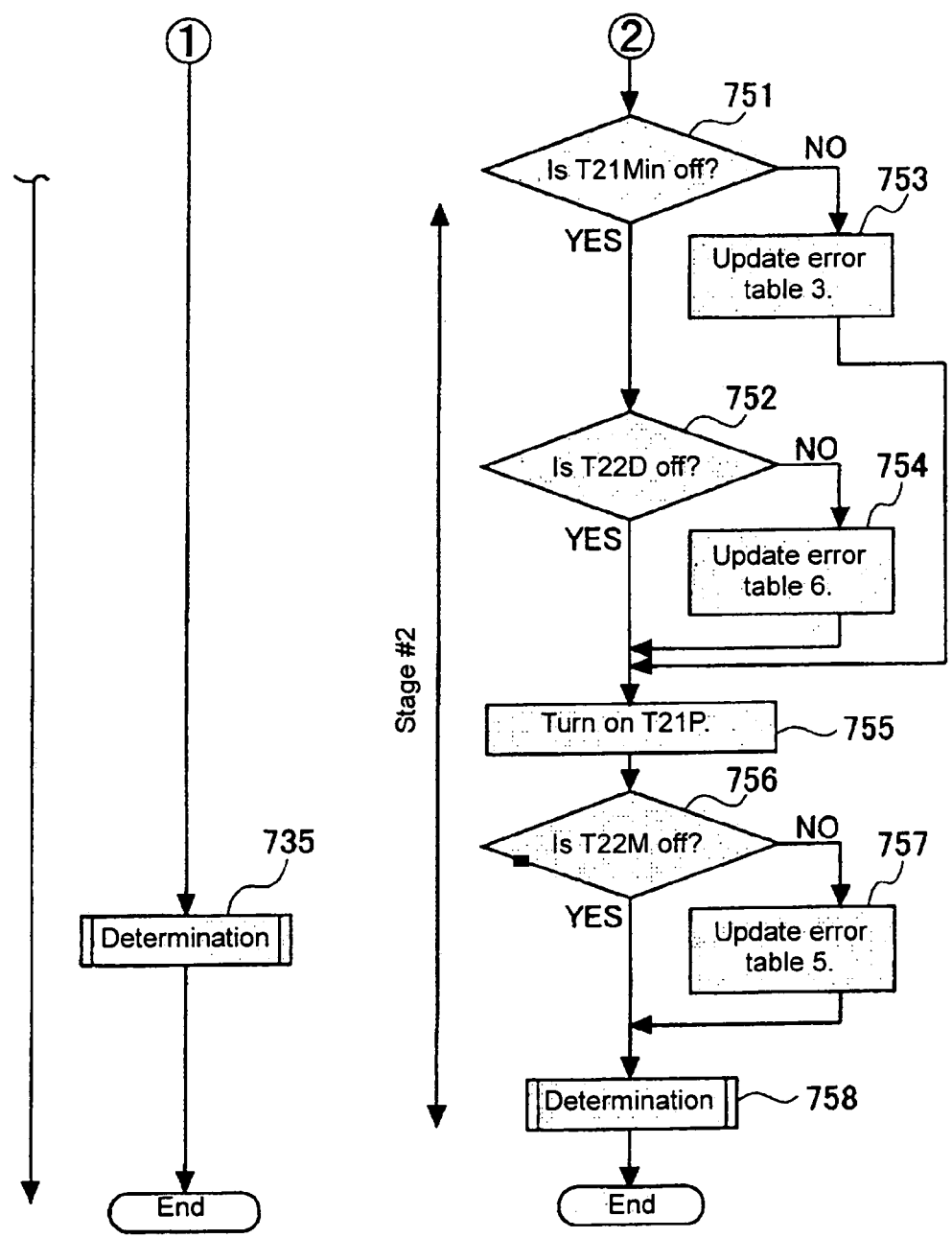
FIG. 32 shows a flowchart (4) showing details of input diagnosis processing.
Figure 33:
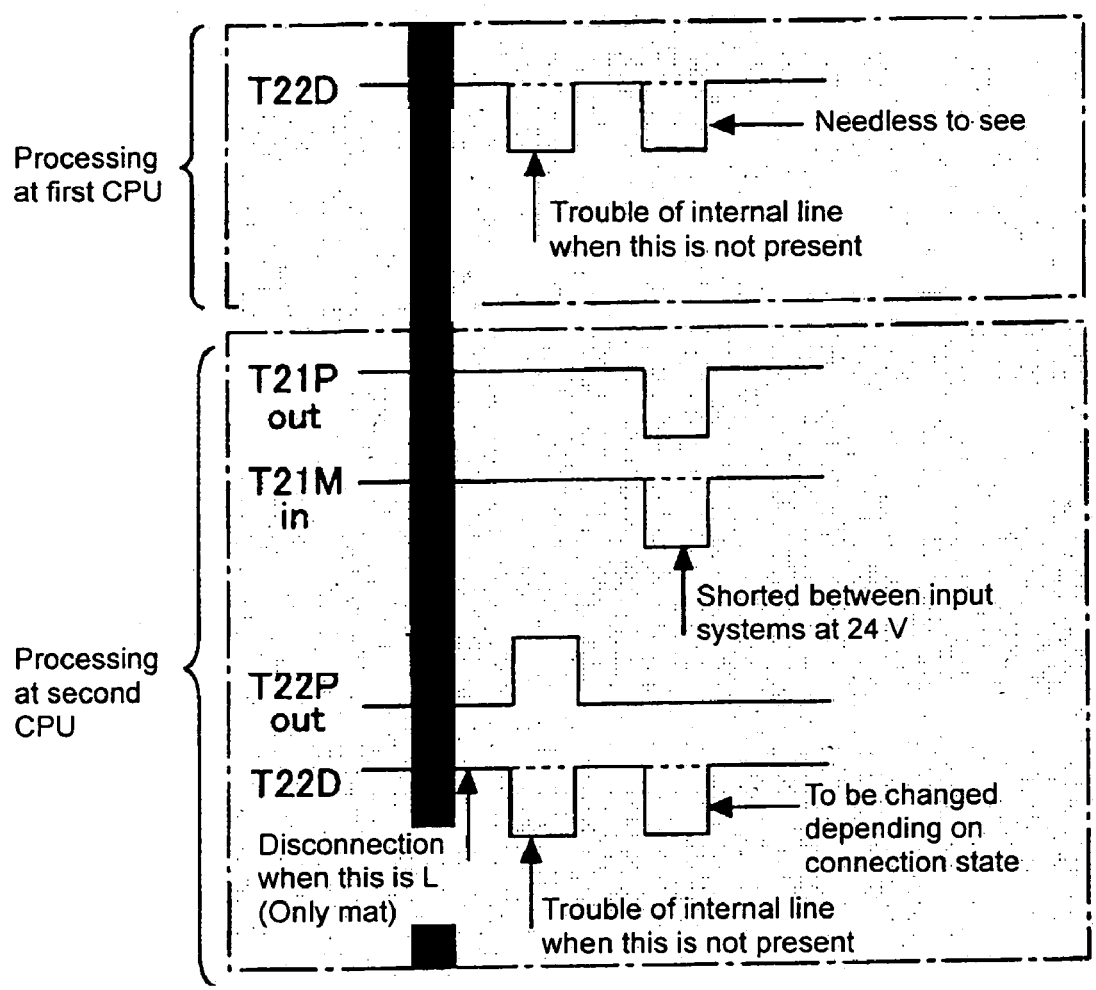
FIG. 33 shows a time chart showing second-input-circuit diagnosis processing.

Then, second-half processings of the input diagnosis processing are described below by referring to FIGS. 31 to 33. These processings correspond to the previously-described first-half processings in which the first CPU and second CPU are replaced each other. That is, in the case of this embodiment, it is possible to securely detect a short circuit between two systems of connected safety switches by alternately executing the same processing by the first CPU and second CPU and thereby providing a time difference between troubleshooting periods. The processings in FIGS. 31 to 33 are completely the same as those in FIGS. 28 to 30. Therefore, detailed description is omitted.

Finally, FIG. 36 is a flowchart showing details of determination processing. In FIG. 36, when the first processing is started, table-1 error<2 is first determined (step 801). In this case, only when not table-1 error<2 is determined (NO in step 801), an error code is set (step 802).

Then, table-2 error<2 is determined (step 803). In this case, only when not table-2 error<2 is determined (NO in step 803), an error code is set (step 804).

Then, table-5 error<2 is determined (step 805). In this case, only when not table-5 error<2 is determined (NO in step 805), an error code is set (step 806).

Then, it is determined whether the operation mode is a mat mode (step 807). In this case, when it is determined that the operation mode is not a mat mode (YES in step 807), table-3 error<2 is determined (step 808). In this case, only when not table-3 error<2 is determined (NO in step 808), an error code is set (step 809).

However, when the operation mode is determined as a mat mode (NO in step 807), table-4 error<2 is determined (step 810). In this case, only when not table-4 error<2 is determined (NO in step 810), an error code is set (step 813).

However, when table-4 error<2 is determined (YES in step 810), table-6 error<2 is determined (step 811). In this case, only when not table-6 error<2 is determined (NO in step 811), an error code is set (step 812).

When error codes are set as described above (in steps 802, 804, 806, 809, 813, and 812), the safety controller stops operations and is shifted to the so-called lock-out state. That is, when a safety switch connected to an external unit is disconnected or short-circuited or an input circuit output circuit built in an input terminal block has a trouble, operations of the safety controller are immediately stopped and shift to a dangerous state due to these troubles is prevented.

Figure 38:
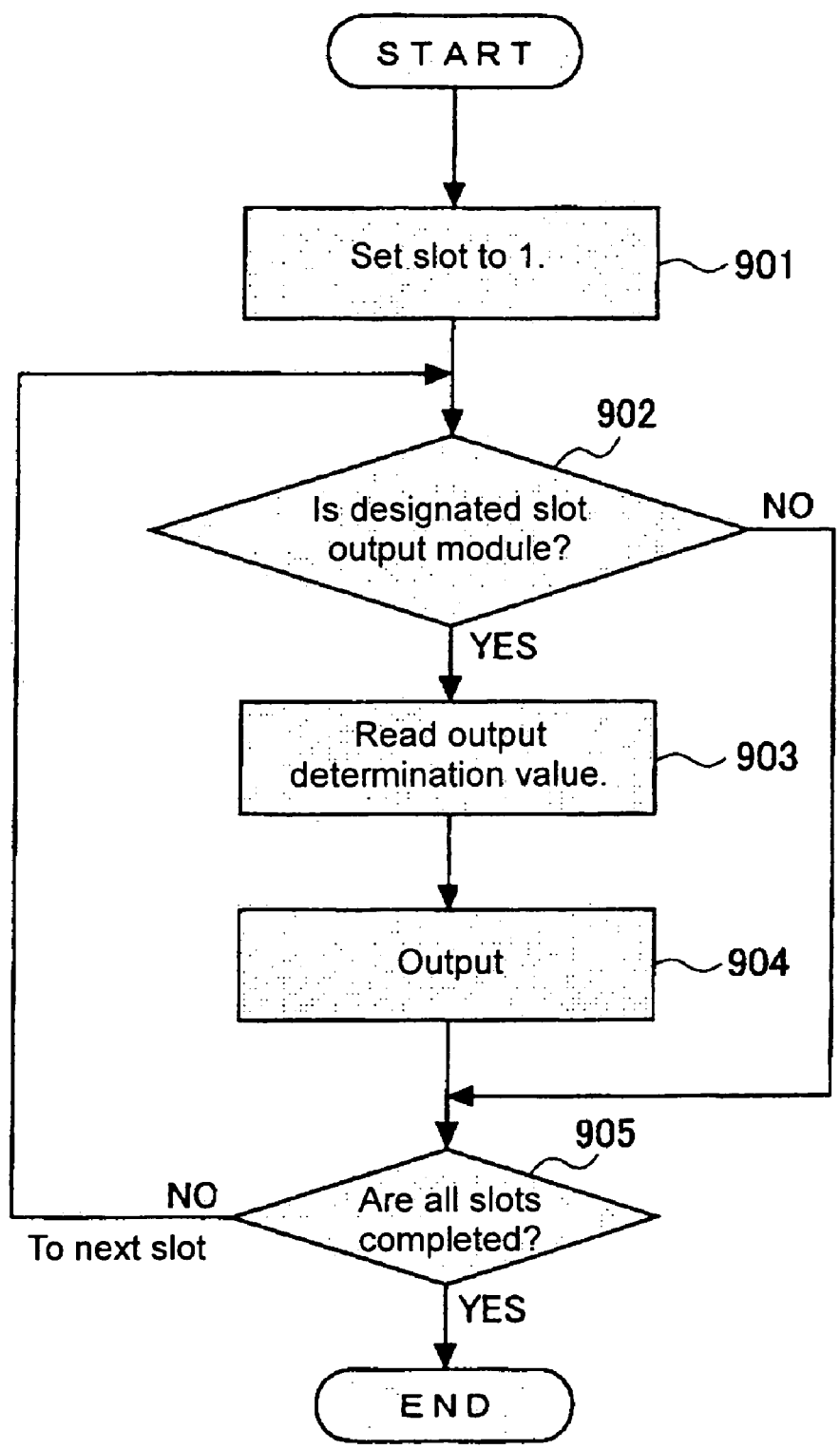
FIG. 38 shows a flowchart showing details of output processing.

FIG. 38 is a flowchart showing details of the output processing executed by a basic module or an expansion module. In FIG. 38, when the first processing is started, a pointer for designating a slot is initialized to "+1"(step 901) and then, it is determined whether the module (basic module or expansion module) set to the slot designated by the pointer is an output module (step 902). In this case, when it is determined that the module is an output module (YES in step 902), output determination values stored in steps 516, 517, 523, and 524 in the flowchart in FIG. 26 are read (step 903) and output processings corresponding to the determination values are executed (step 904).

Hereafter, it is determined whether a corresponding slot is an output module while updating the value of a pointer designated by a slot+1 by +1. When the slot is an output module, an output signal is transmitted to an external unit from a corresponding output terminal block of a basic module or expansion module by repeating the above processings (steps 903 and 904).

As described above in detail, a safety controller of the present invention stores a safety operation program for defining the relation between the state of a safety input signal and the state of a safety output signal in the program memories 202*a* and 202*b* in the basic memory 2 for each type of predetermined safety switches while setting an external input terminal section and the type of safety switches to be connected to the external terminal section through the personal computer (PC) 6. Thereafter, the controller selects a safety operation program corresponding to the switch type set by setting part among a plurality of safety operation programs stored in the program memories 202*a* and 202*b* serving as operation program storing part in the operation mode and executes the selected program for the external input terminal section set by the setting part. Therefore, it is possible to connect an optional type of safety switches to a basic and an expansion module and efficiently realize a desired safety system by properly executing operation programs corresponding to the safety switches and thereby variously combining an optional number of safety switches.

Moreover, in each input terminal block, not only externally-connected safety switches but also internal input and output circuits are properly troubleshot. Therefore, it is possible to operate a safety controller while maintaining a high safety together with the processing of them.

Then, details of an operation program (particularly, input value determining section of the operation program) corresponding to various types of switches are described below by referring to FIGS. 39 to 50.

Figure 39:
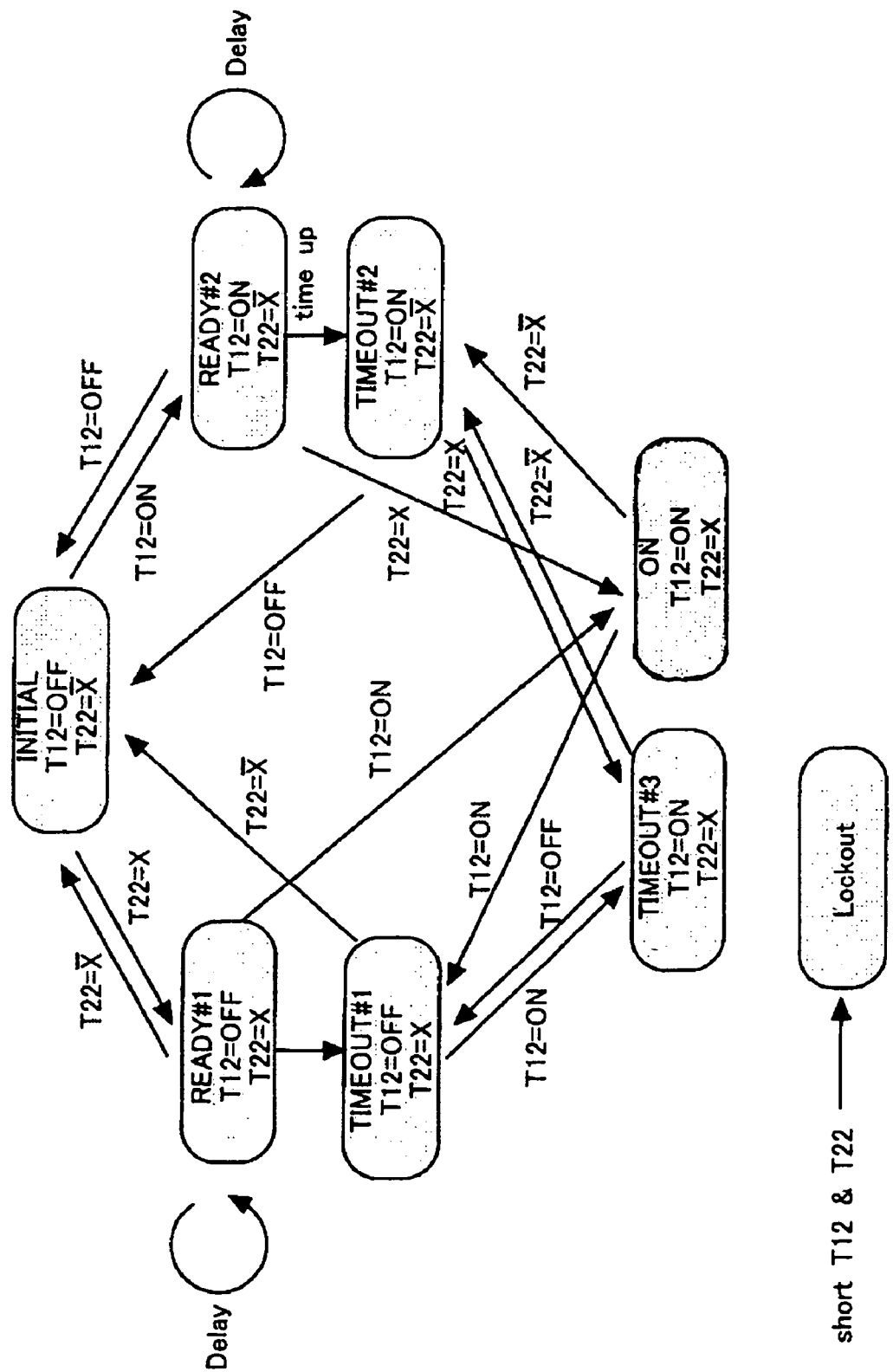
FIG. 39 shows a state transition diagram showing operations of a controller in an emergency stop switch mode.

FIG. 39 is a state transition diagram showing operations of a controller (input determining section) in an emergency stop switch. As shown in FIG. 39, the state transition diagram includes seven states such as "INITIAL", "READY#2", "TIMEOUT#2", "ON", "TIMEOUT#3", "TIMEOUT#1", and "READY#1". The transition between these states is performed when specific conditions are effected. In FIG. 39, these conditions are respectively expressed by an arrow and a symbol attached to the arrow.

For example, the shift from the state "INITIAL" to the state "READY#1" is performed when the condition T22=X is effected. However, the shift from the state "READY#1" to the state "INITIAL" is performed when the condition T22=reversal X (logic reversal of X) is effected. How to read the state transition diagram is easily understood by a person skilled in the art in accordance with the above procedure. However, main operations are understandably described below for confirmation by using a flowchart.

Figure 40:
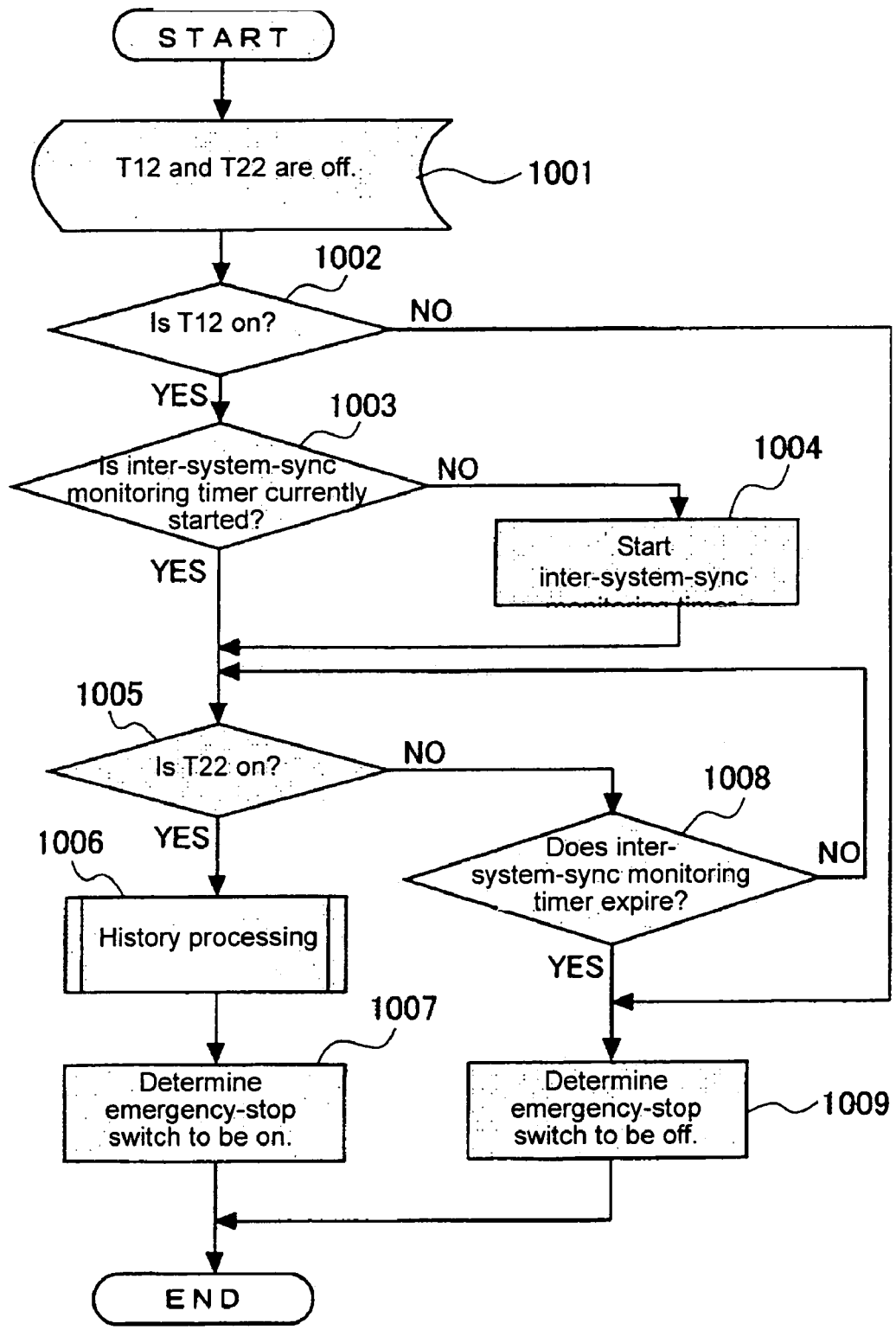

FIG. 40 is a flowchart showing a processing program for determining that an emergency stop switch is changed from off to on. In this case, it is assumed that the terminals T12 and T13 (refer to FIGS. 34 and 35) are off ("L") (step 1001). Then, in step 1002, it is determined whether T12 is on ("H"). In this case, when it is determined that T12 is not on ("H") (NO in step 1002), step 1009 is started and it is determined that the emergency stop switch is off. However, when T12 is on ("H") (YES in step 1002), a inter-system sync monitoring timer is started (step 1004) to determine whether T22 is on ("H") (step 1005) by premising that the inter-system-sync monitoring timer is not currently started (NO in step 1003). In this case, when T22 is not on ("H") (NO in step 1005), it is waited for the inter-system-sync monitoring timer to expire (step 1008). When it is determined that T22 is on ("H") during the period (YES in step 1005), the history processing to be described later (step 1006) is executed and then it is determined that the emergency stop switch is on (step 1007). However, the inter-system-sync monitoring timer expires (YES in step 1008), it is determined that the emergency stop switch is off (step 1009).

Figure 41:
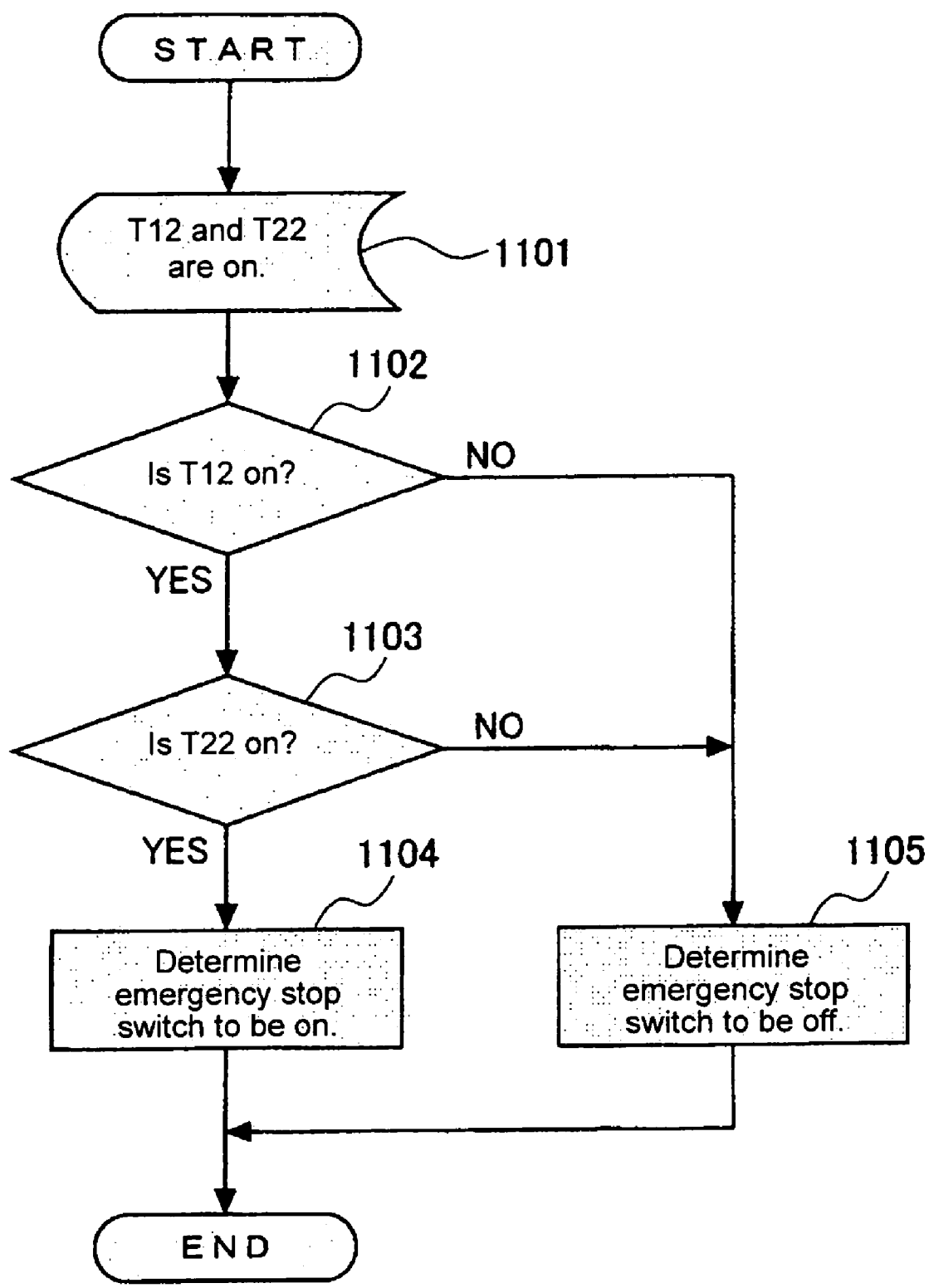
FIG. 41 shows a flowchart showing a processing program for determining that an emergency stop switch is changed from on to off.

FIG. 41 is a flowchart showing a processing program for determining that the emergency stop switch is changed from on to off. In this case, it is assumed that the terminals T12 and T22 are on ("H") (step 1101). Under the above state, when T12 is on ("H") (YES in step 1102) and T22 is also on ("H") (YES in step 1103), it is determined that the emergency stop switch is on. However, when it is determined that either of the terminals T12 and T22 is off ("L") (NO in step 1102 or 1103), it is determined that the emergency stop switch is off (step 1105).

Figure 44:
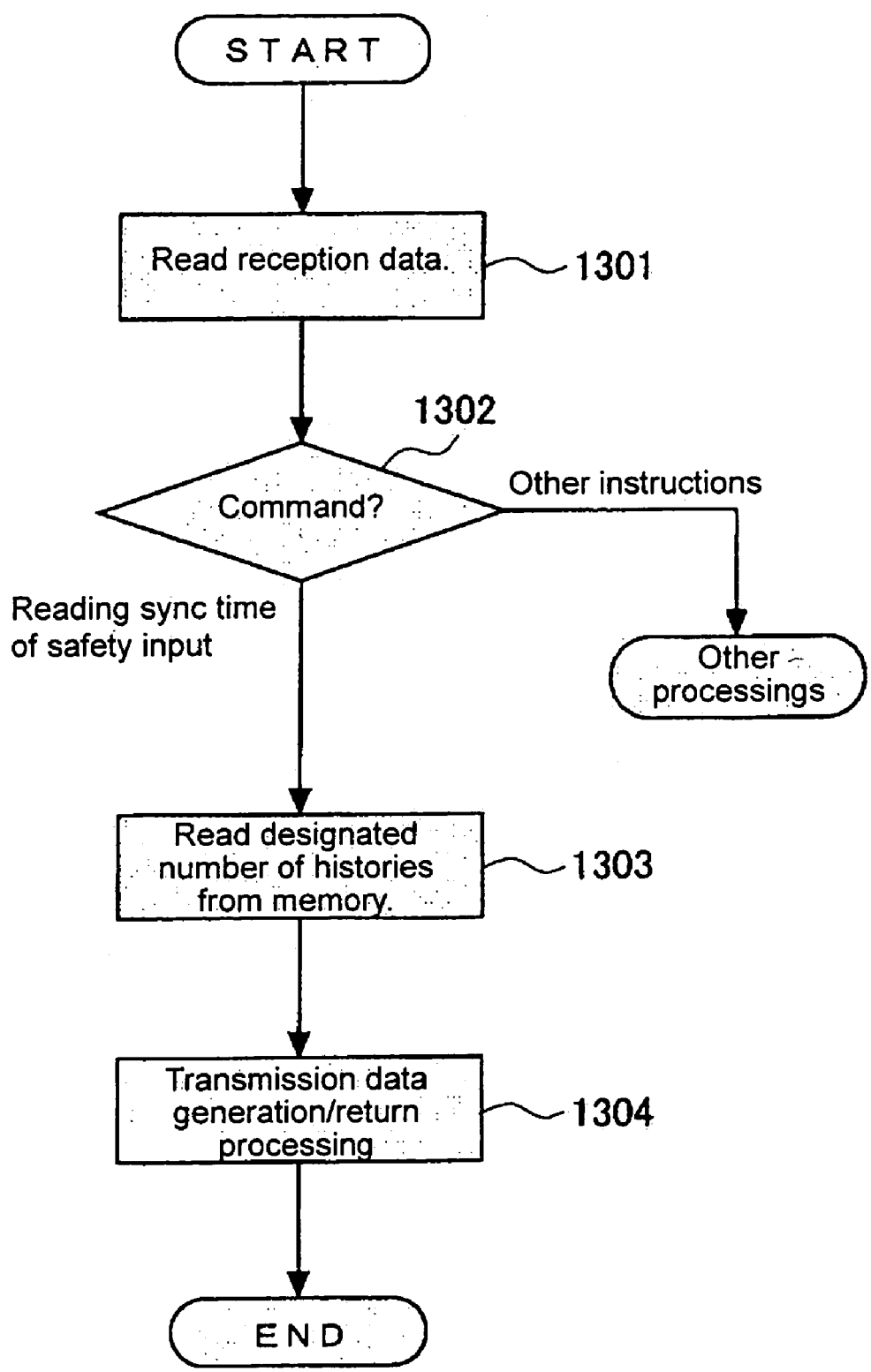
FIG. 44 shows a flowchart showing command analysis processing for history read.

Then, a contact welding diagnosis using the time when a safety switch operates is described below by referring to FIGS. 42 to 44. As previously described by referring to FIG. 40, the history processing is executed in step 1006 while a safety switch operates. The history processing (step 1006) measures the sync shift time between input timings on input signals T12 and T22 of two systems of a safety switch and stores the time in a memory in time series.

Figure 42:
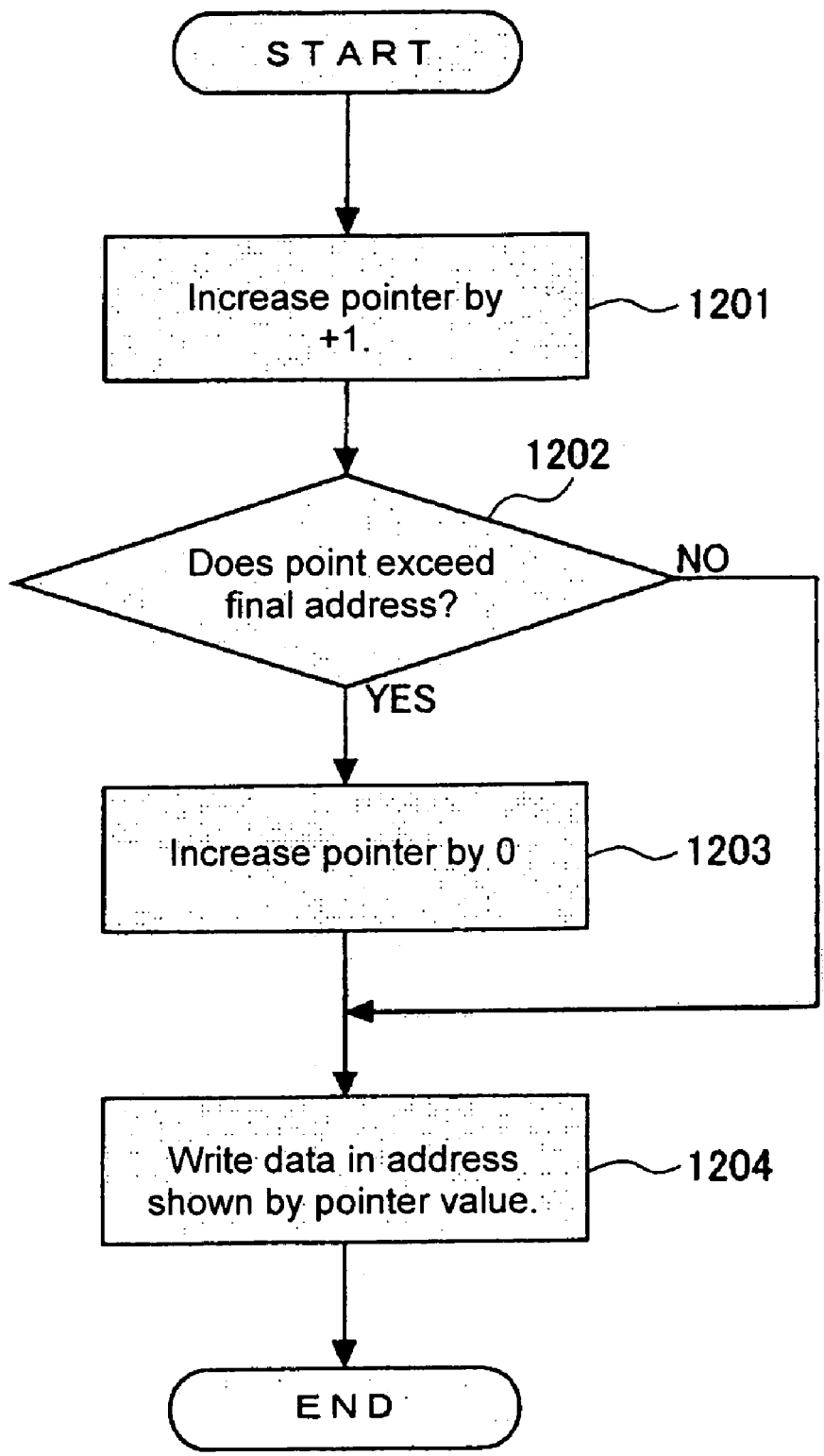
FIG. 42 shows a flowchart showing a processing program for history generation.

That is, as shown in FIG. 42, in the history processing (step 1006), the sync shift time T1 shown in FIG. 43B is stored in an address designated by a pointer in a memory area constituting an FIFO stack while making the pointer step+1 by +1 (step 1201). To realize the FIFO stack processing, contents of the pointer are cleared to 0 (step 1203) when the value of the pointer exceeds the final address (YES in step 1202).

As a result of repeating the above processings, the previously-described sync shift times (T1) are successively stored in the history generation area (refer to FIG. 43A) formed in the work area of a RAM of the basic module 2 as the measured times between safety input systems as shown in FIG. 43A. That is, in the case of the example in FIG. 43A, the sync shift times (T1) are stored in the area of addresses 0001, 0002, 0003, 0004, . . . , and 000F designated by the pointer as 95 ms, 100 ms, 102 ms, 100 ms, . . . , and 98 ms. The time chart in FIG. 43B shows the comparison between on-timings of input terminals T12 and T22 of two systems of a safety switch. Differences between rise times of the on-timings serves as the sync shift times (T1). These sync shift times (T1) are compared with a monitoring threshold value (Th). When any one of the sync shift times (T1) exceeds the monitoring threshold value (Th), it is determined that the emergency stop switch is off (step 1009) because of the expiry of the timer as shown by step 1008 in the previous flowchart.

However, contents of the history generation area shown in FIG. 43A can be properly read to the personal computer (PC) 6. That is, as shown by the flowchart in FIG. 44, a basic module reads reception data (step 1301) and when it is determined that a read command is a safety-input sync time read command (step 1302), memory contents are read by the number of designated histories (step 1303), and transmission data is generated in accordance with the memory contents and transmitted to the personal computer (PC) 6 outputting a read request (step 1304).

Thus, the safety controller detects the rise time differences (sync shift times T1) between input signals of the first and second systems constituting an input switch while performing normal operations as shown in FIG. 40 and stores the differences in the history generation area in time series as shown in FIG. 43A, transmits a predetermined read command from the personal computer (PC) 6 at the point of any time. Thereby, as shown in the flowchart in FIG. 44, the safety controller reads data from the history generation area, generates transmission data, and transmits the data to the personal computer (PC) 6. Thus, the personal computer (PC) 6 can be used for various purposes such as comparing a series of sync shift times (T1) read from the basic module with a proper threshold value, graphing the degree of the time-series change and thereby, determining the contact deterioration state of a safety switch to be handled, and estimating the remaining time up to seizure.

Figure 45:
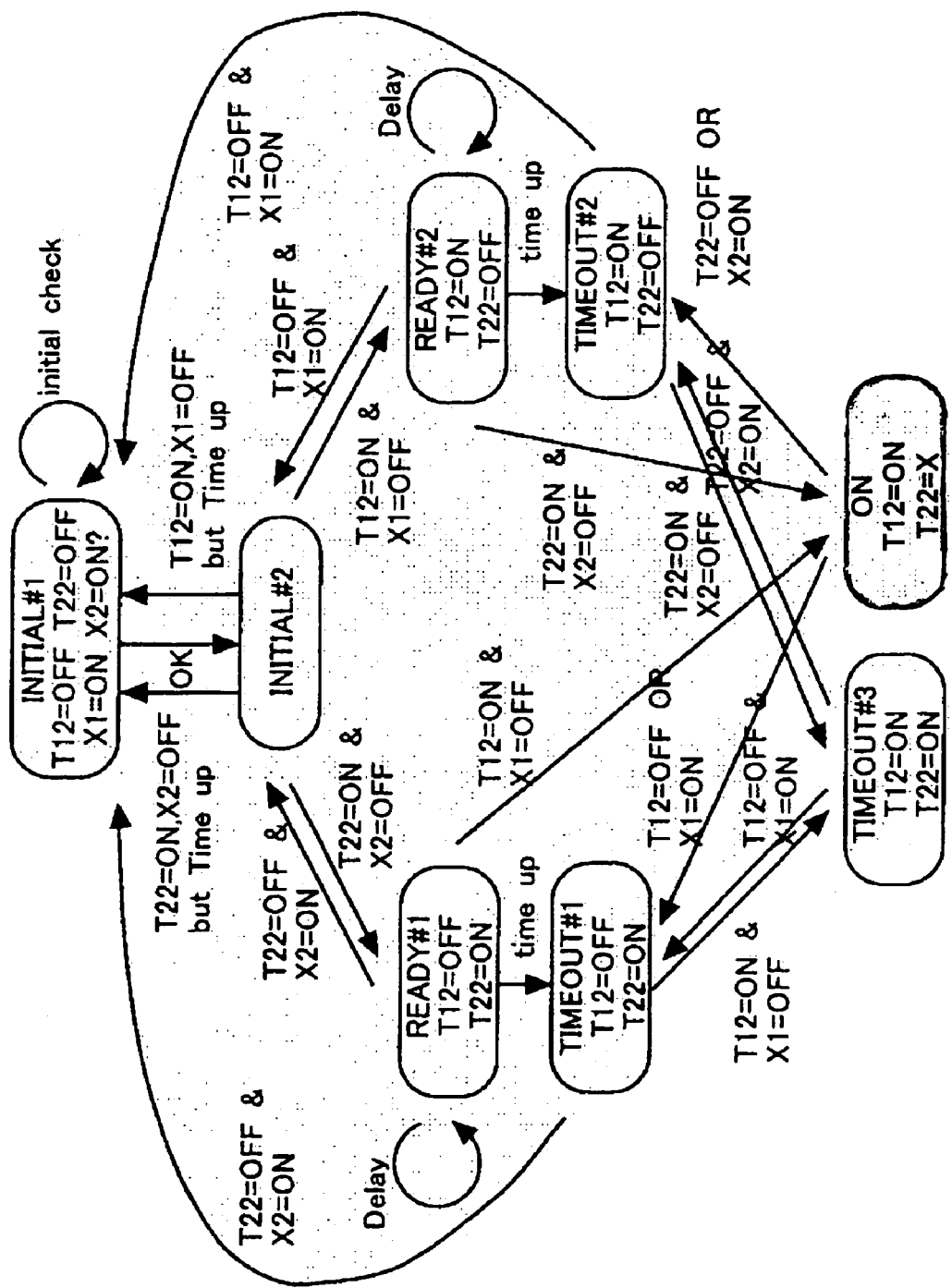
FIG. 45 shows a state transition diagram showing operations of a controller in a two-hand-control switch mode.

FIG. 45 is a state transition diagram showing operations (input determining section) of a controller in the two-hand-control-switch mode. As shown in FIG. 45, the state transition diagram includes 8 states such as "INITIAL#1", "INITIAL#2", "READY#1", "TIMEOUT#1", "TIMEOUT#3", "ON", "TIMEOUT#2", and "READY#2". Moreover, shift conditions between these states are respectively expressed by an arrow and a symbol attached to the arrow as previously explained. As previously described, a person skilled in the art will be able to easily understand the state transition diagram in accordance with the previous procedure. However, typical operations are understandably explained below for confirmation by referring to FIGS. 46 to 48.

Figure 46:
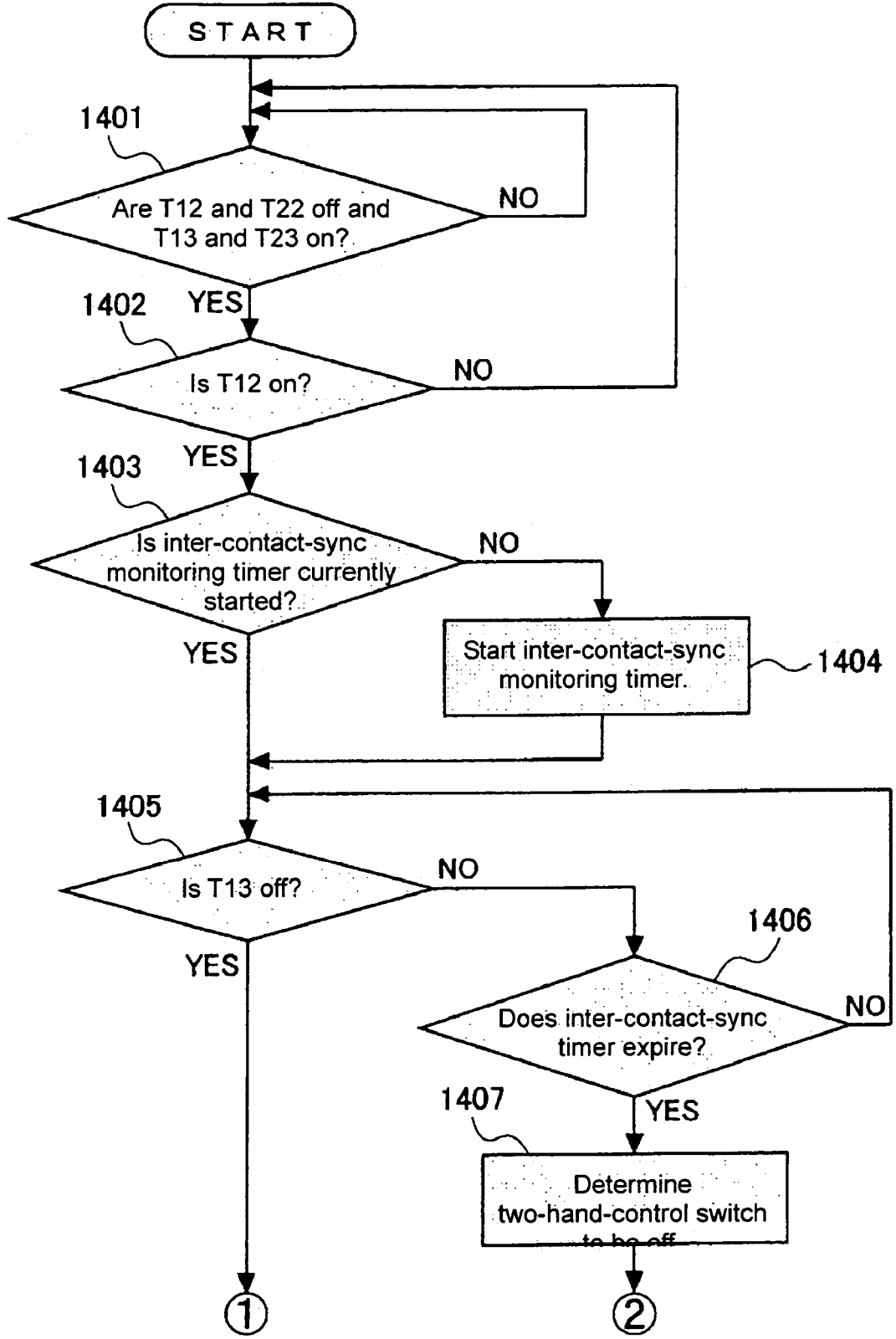
Figure 47:
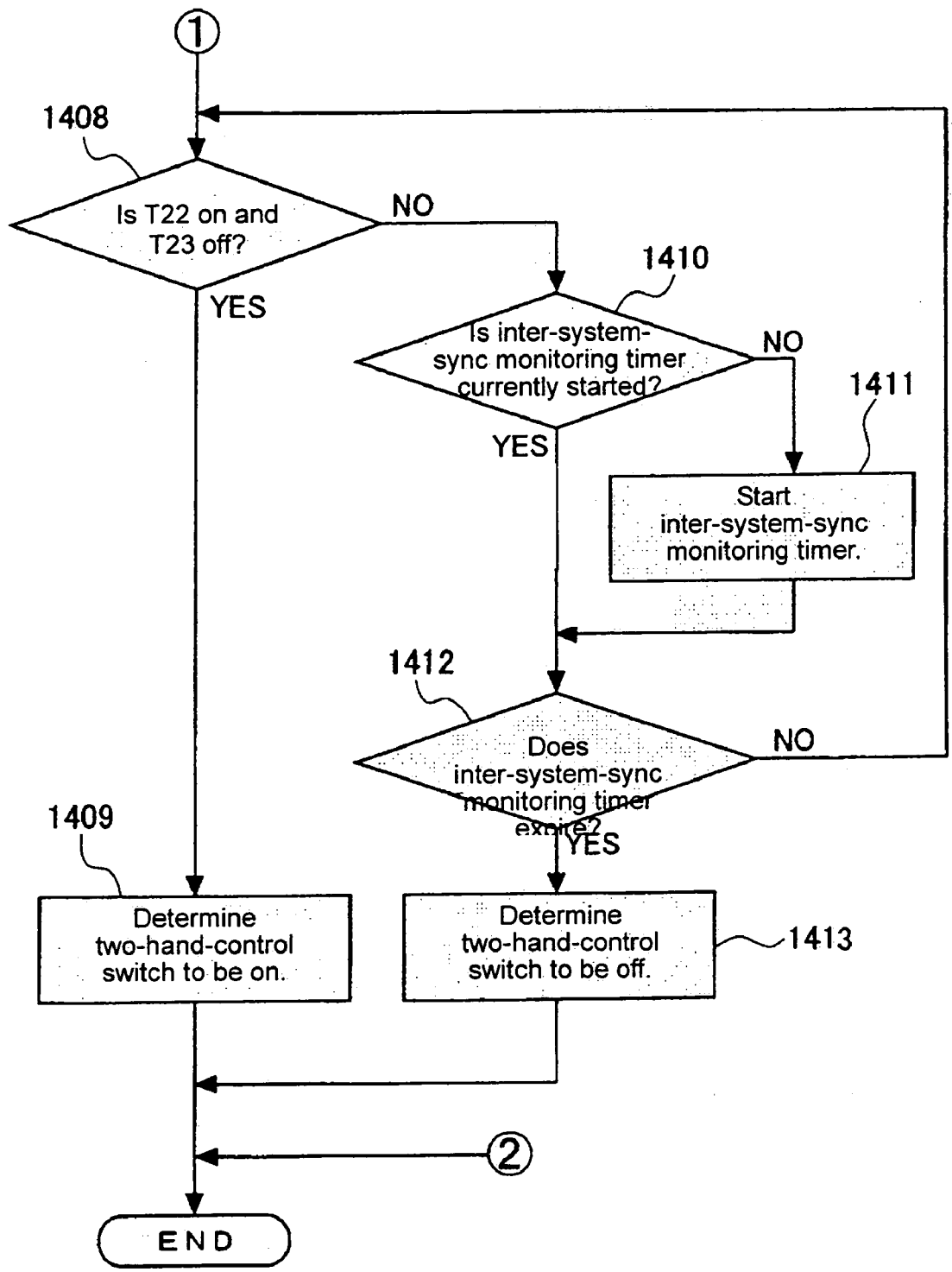

In FIG. 46, when the fist processing is started, it is waited for the terminals T12 and T22 to be off ("L") and the terminals T13 and T23 to be on ("H") (step 1401). Under the above state, when the terminals T12 and T22 become off ("L") and the terminals T13 and T23 become on ("H") (YES in step 1401), it is determined whether the terminal T12 is on ("H") (step 1402). In this case, when it is determined that the terminal T12 is also on ("H") (YES in step 1402), the inter-contact monitoring time is started (step 1404) and then it is determined whether the terminal T13 is off ("L") by premising that the inter-contact sync monitoring timer is not currently started (NO in step 1403). In this case, it is determined that the terminal T13 is off ("L") (YES in step 1405), it is determined whether the terminal T22 is on ("H") and the terminal T23 is off ("L") (step 1408). In this case, when it is determined that the terminal T22 is on ("H") and the terminal T23 is off ("L") (YES in step 1408), it is determined that the two-hand-control switch is on (step 1409).

However, when the inter-contact sync monitoring timer expires (YES in step 1406) while it is waited for the terminal T13 to be off ("L") (NO in step 1405), it is determined that the two-hand-control switch is off (step 1407) and the processing is completed. Moreover, unless the terminal T22 is on ("H") and T23 is off ("L") (NO in step 1408), the inter-system sync monitoring timer is started (step 1411) and then it is waited for the inter-system sync monitoring time to expire (NO in step 1412) by premising that the inter-system sync monitoring timer is not currently started (NO in step 1410). Under the above state, when the inter-system sync monitoring timer expires (YES in step 1412), it is determined that the two-hand-control switch is off (step 1413).

Figure 48:
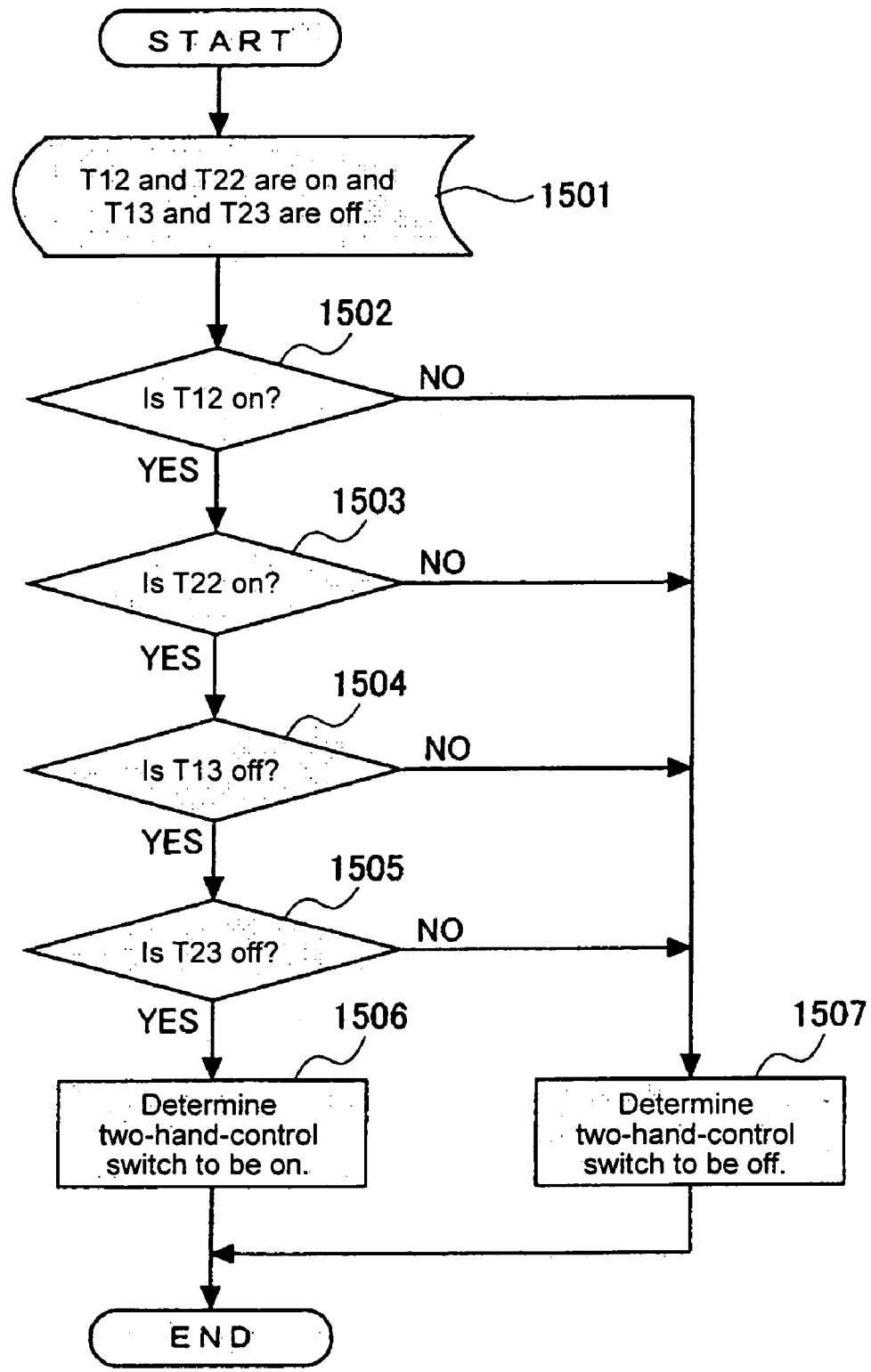
FIG. 48 shows a flowchart showing a processing program for determining that a two-hand-control switch is changed from on to off.

FIG. 48 is a flowchart for showing a processing program for determining that the two-hand-control switch is changed from on to off. In FIG. 48, it is assumed that the terminals T12 and T22 are on ("H") and the terminals T13 and T23 are off ("L") (step 1501). Under the above state, when it is determined that the terminal T12 is on (YES in step 1502), T22 is on (YES in step 1503), T13 is off (YES in step 1504), and T23 is off (YES in step 1505), it is determined that the two-hand-control switch is on (step 1506).

However, any one of the facts is determined that T12 is not on (NO in step 1502), T22 is not on (NO in step 1503), T13 is not off (NO in step 1504), and T23 is not off (NO in step 1505), it is determined that the two-hand-control switch is off (step 1507).

Figure 49:
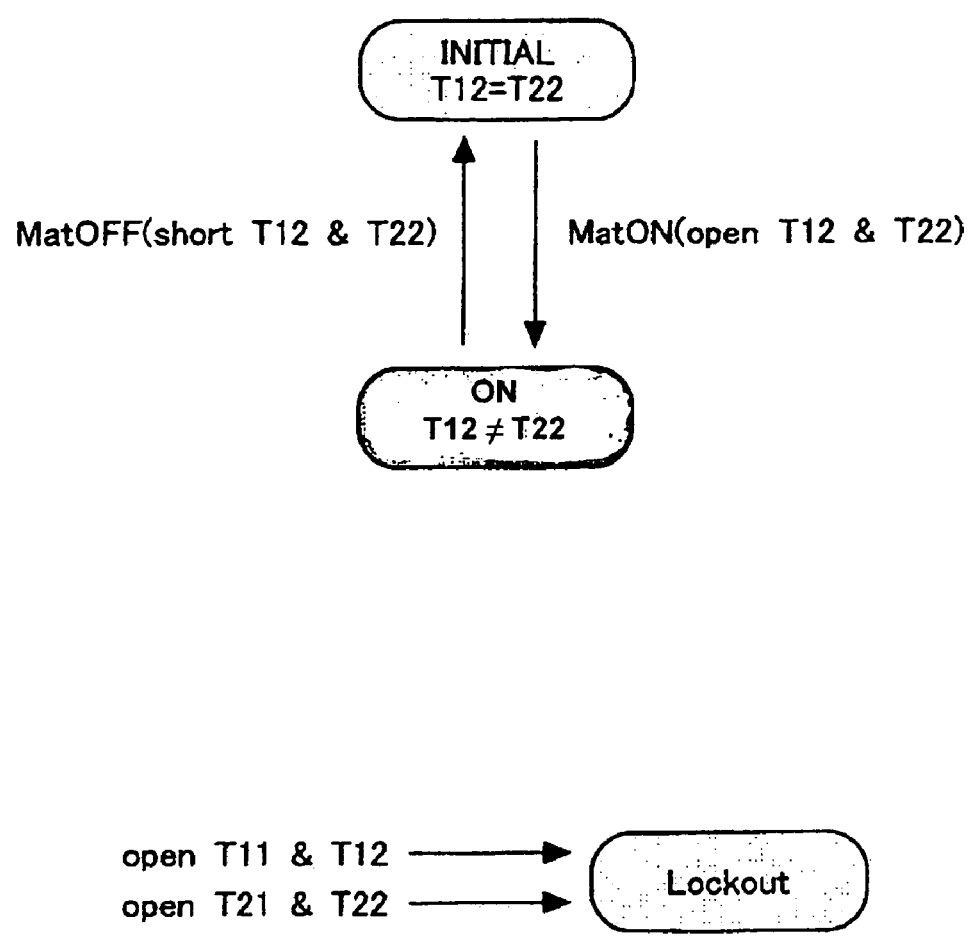
FIG. 49 shows a state transition diagram showing operations of a controller in a mat switch mode.
Figure 50:
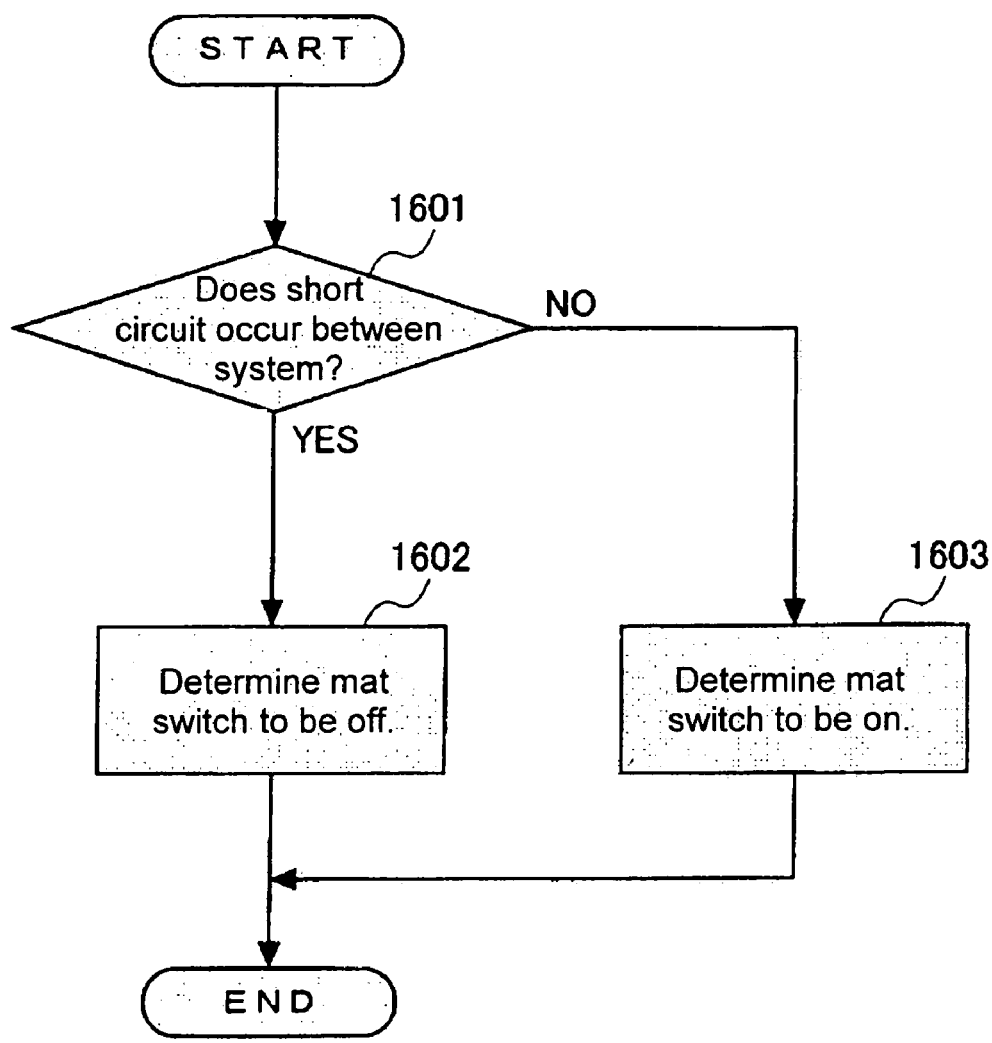
FIG. 50 shows a flowchart for determining a processing program for determining on/off of a mat switch.

FIG. 49 is a state transition diagram showing operations (input determining section) of a controller of a mat switch. The state transition diagram includes two states such as "INITIAL" and "ON". The shift between these states is performed in the case of mat-on or mat-off. Therefore, this is very simple. When showing the shift as by a flowchart in FIG. 50, it is determined that the mat switch is off (step 1602) or on (step 1603) in accordance with whether a short circuit occurs between systems (step 1601).

Figure 51:
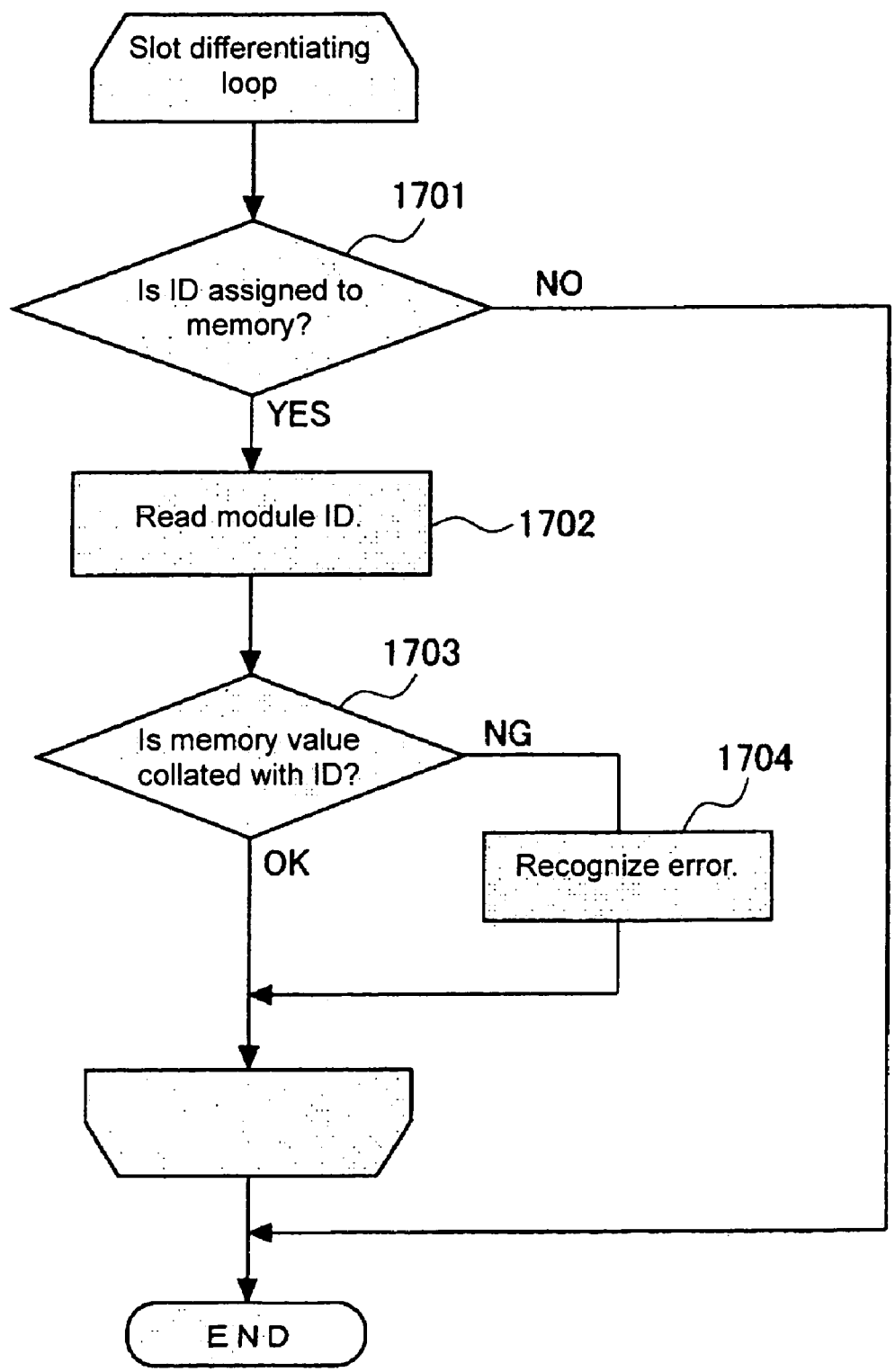
FIG. 51 shows a flowchart showing details of module check processing.

Then, various check processings are described in which is built in the basic module or expansion module of this embodiment. FIG. 51 is a flowchart showing details of module check processing. The module check processing makes it possible to self-diagnose the determination on whether an optional expansion slot set to an expansion slot on a mother board is a preset type of expansion module. The module check processing is executed in, for example, the other diagnosis processing (step 602) shown in FIG. 27.

In FIG. 51, when the first processing is started, it is determined whether an ID is assigned to a memory corresponding to the slot (step 1701). In this case, when the ID is assigned to the memory (YES in step 1701), the ID is read from an actual module (step 1702) and then, the ID stored in the memory is collated with the ID read from the module (step 1703), an error is recognized when the both IDs are mismatched (step 1704), and start of a controller is inhibited. Because the above processing is applied to every slot set to a mother board, a malfunction is prevented by executing the module check processing when a different type of expansion module is set to designated slot due to an error of an operator though various types of expansion modules are set to slots from a personal computer.

Figure 52:
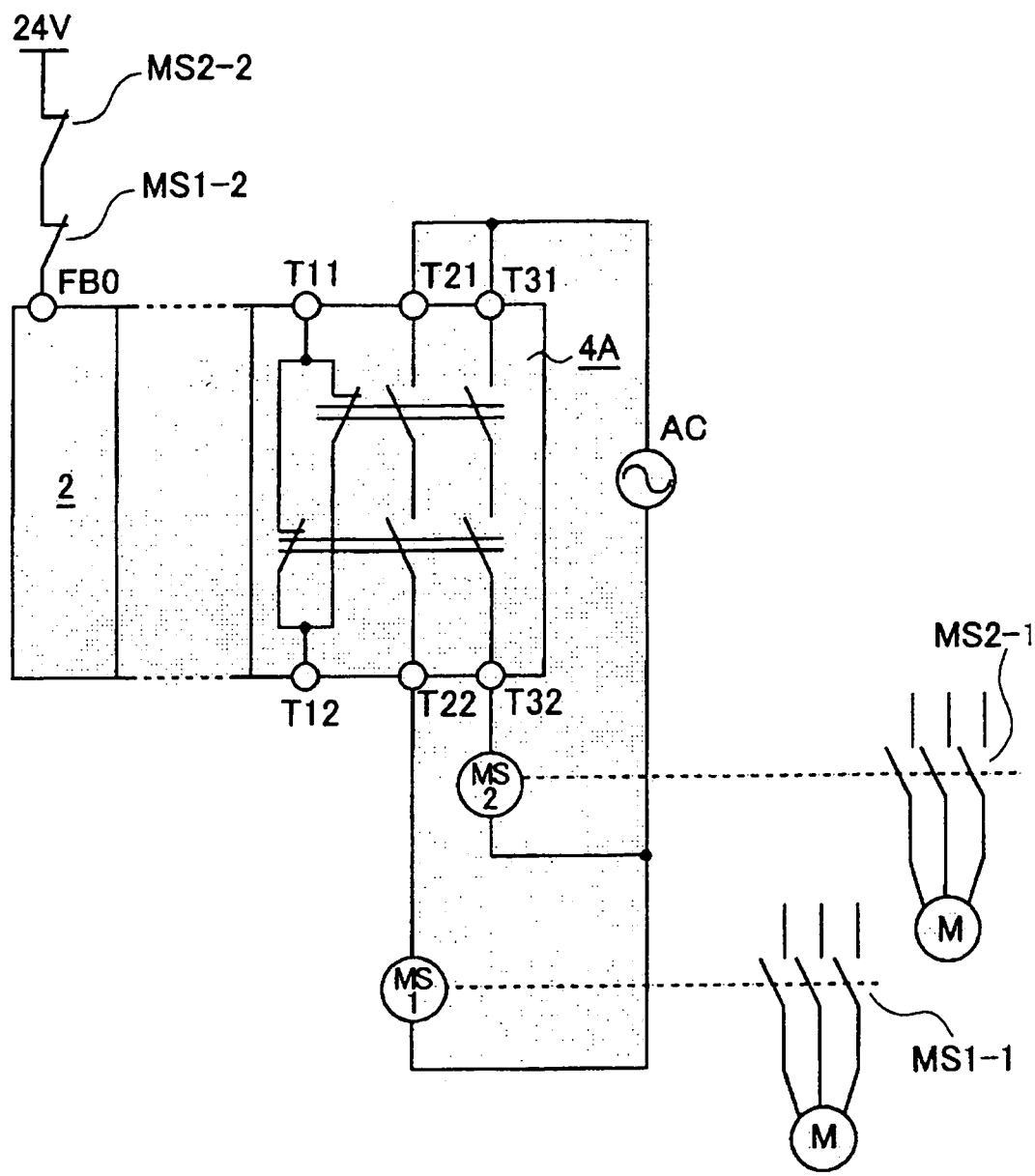
FIG. 52 shows a wiring diagram sowing a wire connection method for first back check.
Figure 53:
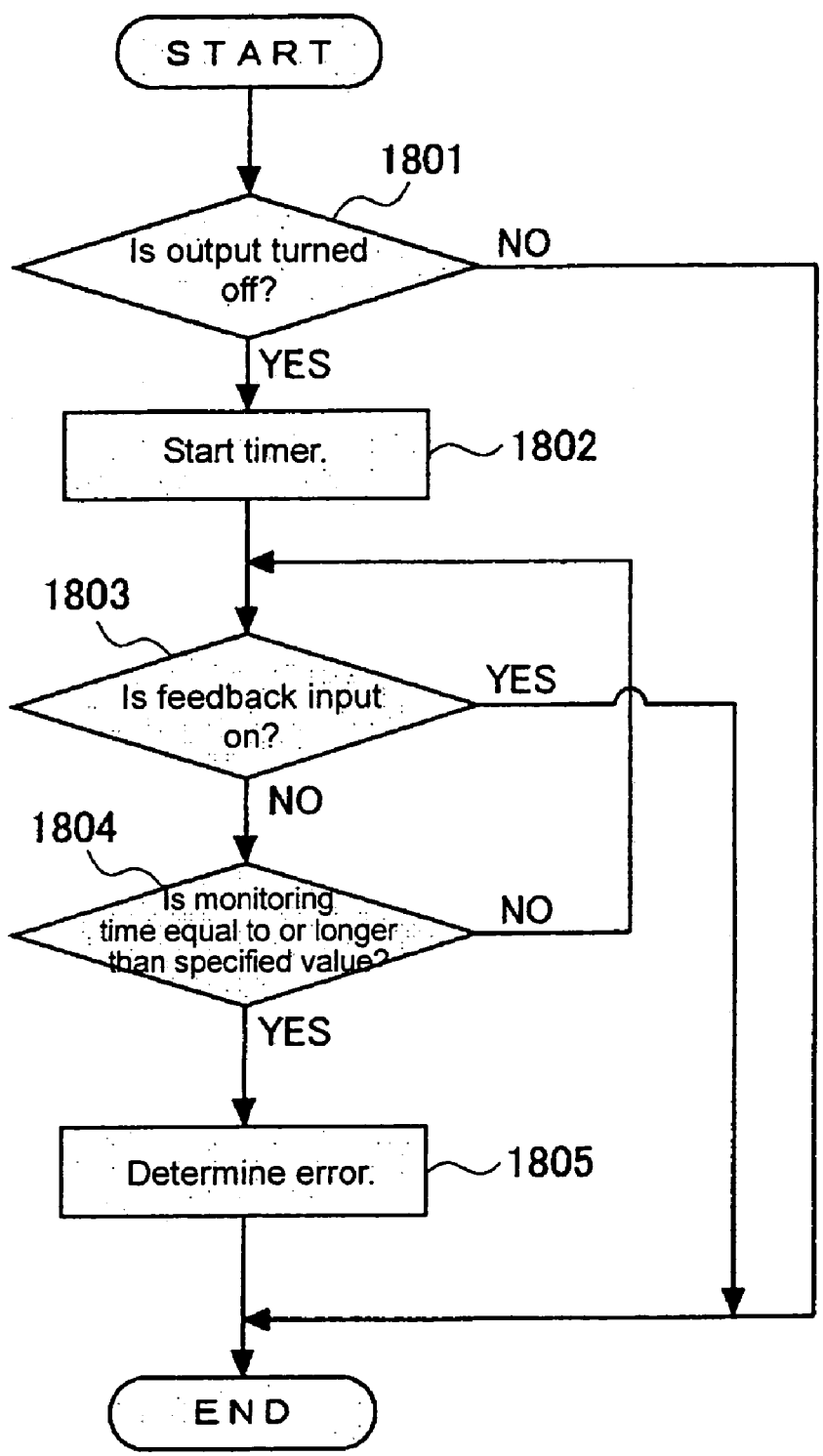
FIG. 53 shows a flowchart showing the processing for first back check.

FIG. 52 is a wiring diagram showing a wire connection method for first back check and FIG. 53 is a flowchart showing the processing for the back check. As shown in FIG. 52, a feedback terminal FB0 is set to the basic module 2. Moreover, the auxiliary break contact MS1-2 and of the magnet switch MS1 and auxiliary break contact MS2-2 of the magnet switch MS2 are set in series between the FB0 and the power supply 24 V. Therefore, by observing the voltage ("H" or "L") of the feedback terminal FB0, it is possible to confirm whether the main make contacts MS1-1 and MS2-1 of the magnet switches MS1 and MS2 are actually turned off after transmitting a safety output signal to the magnet switches. That is, as shown in FIG. 53, after a safety output is transmitted to the terminals T22 and T32, the point of time when the feedback terminal FB0 is turned off is monitored in the basic module 2 (NO in step 1801). Then, when a monitoring time exceeds a set value (YES in step 1804) while a feedback input is kept on (step 1803) after a timer is started (step 1802), it is possible to immediately detect a contact seizure trouble of the main contact of MS1-1 or that of MS2-1 of the magnet switches MS1 and MS2 by determining the fact that the monitoring time exceeds the set value as an error.

Figure 54:
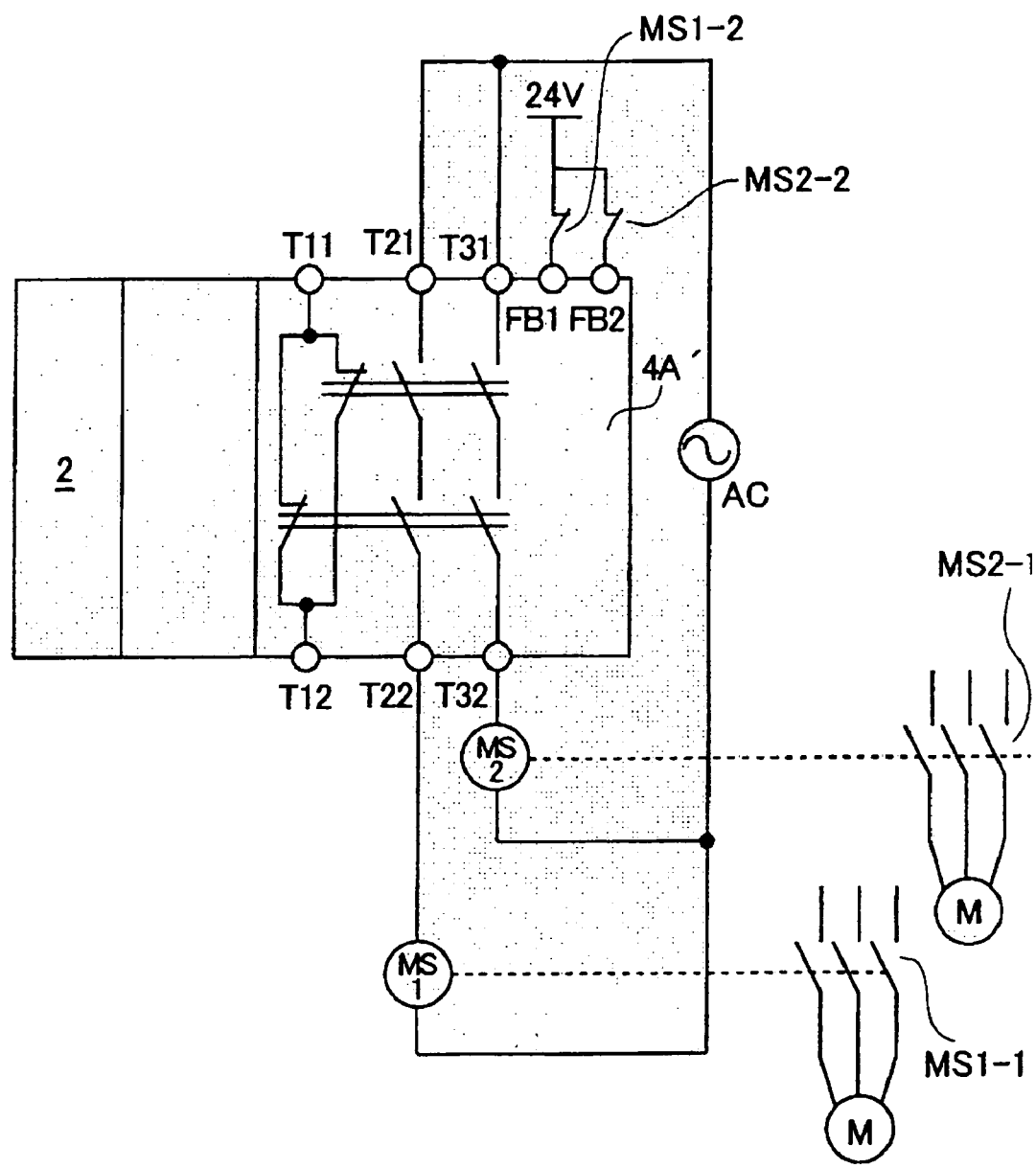
FIG. 54 shows a wiring diagram showing a wire connection method for second back check.
Figure 55:
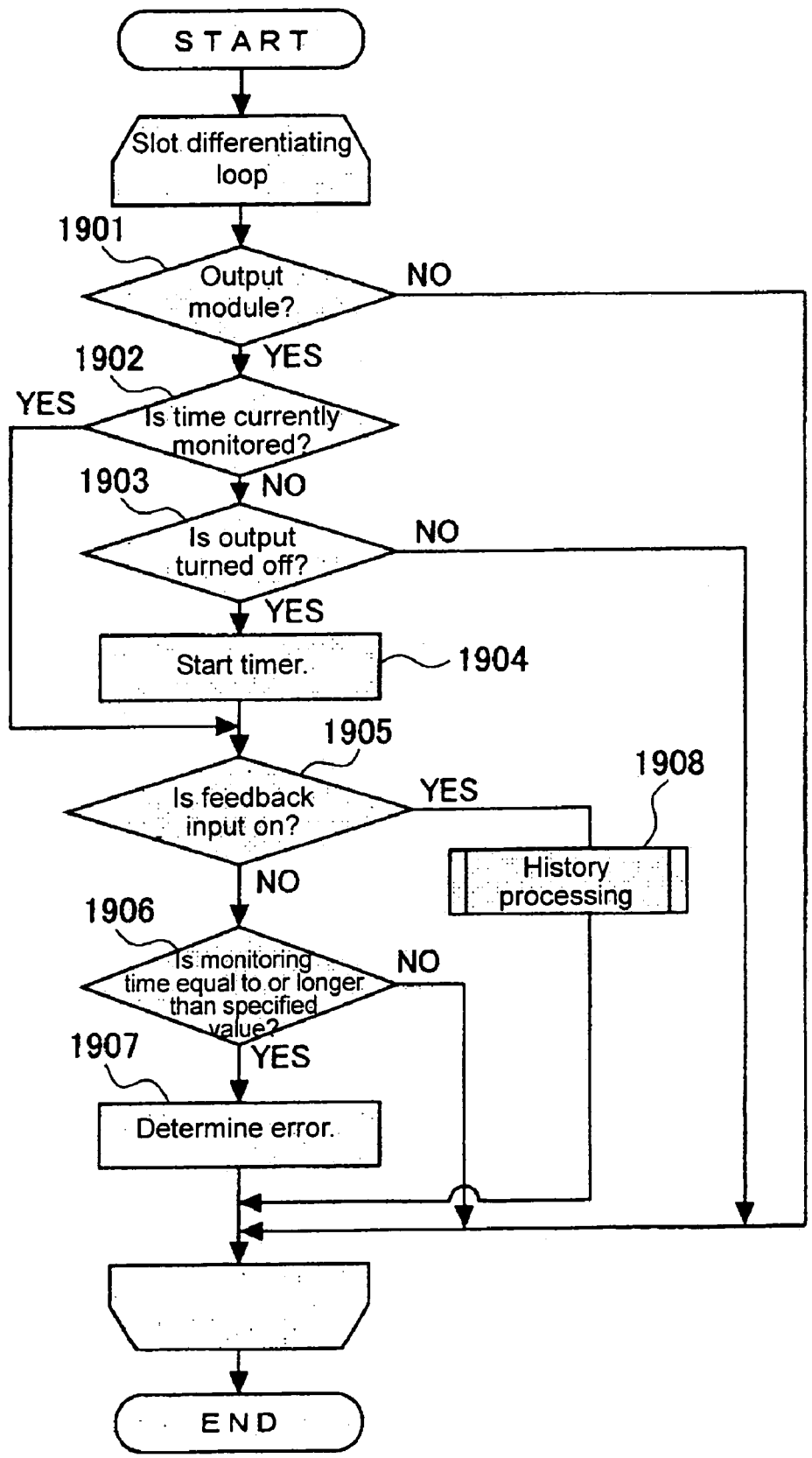
FIG. 55 shows a flowchart (1) showing the processing for second back check.

FIG. 54 is a wiring diagram showing a wire connection method for second back check, FIG. 55 is a flowchart (1) showing the processing for the second back check, and FIG. 56 is a flowchart (2) showing the processing for the second back check. In the case of this example, two feedback terminals FB1 and FB2 are set to an expansion unit 4A'. Moreover, in the case of these feedback terminals FB1 and FB2, the auxiliary break contacts MS1-2 and MS2-2 of the magnet switches MS1 and MS2 are connected each other through a power supply. Thereby, it is possible to individually perform the contact welding diagnosis of the magnet switches MS1 and MS2 in the basic module 2 by individually incorporating on/off states of the break contacts MS1-2 and MS2-2 into the expansion module 4A' and supplying the states to the basic module 2 through the bus on a mother board.

That is, as shown by the flowchart in FIG. 55, when an output module is determined while scanning each slot (YES in step 1901), it is waited for a feedback input to be turned on (YES in step 1905) while a predetermined monitoring time elapses (NO in step 1906) from the point of time when an output is turned off (YES in step 1903). Moreover, by executing the history processing (step 1908) whenever a feedback input is turned on (YES in step 1905), as shown in FIG. 57A, feedback measuring times are accumulated in the history generation area. FIG. 56A shows details of history generation processing (step 1908) and FIG. 56B shows details of history read processing. In the history generation processing (step 1908), as shown in FIG. 56A, by updating a pointer to 0 (step 2003) whenever the pointer exceeds the final address (step 2002) while updating the pointer +1 by +1 in the history generation area shown in FIG. 57A (step 2001), data is written in the address shown by a pointer value (step 2004). Then, as shown in FIG. 57B, it is possible to perform the contact welding diagnosis depending on whether the temporal displacement of a feedback time reaches a monitoring threshold value by observing the feedback time until a feedback input is turned on after turning off a safety output.

Contents of the history generation area shown in FIG. 57A can be properly read to the personal computer (PC) 6. That is, as shown by the flowchart in FIG. 56B, when reading reception data from the basic module (step 2101) and it is determined that a read command is a feedback-time read command (step 2102), contents of the memory are read by the specified number of histories (step 2103), and transmission data is generated in accordance with the read contents and transmitted to the personal computer (PC) 6 outputting a read request (step 2104).

Thus, as shown in FIG. 55, by detecting the time difference in which a feedback input is turned on while a predetermined monitoring time elapses, storing the time difference in the history generation area in time series as sown in FIG. 57A, and then transmitting a predetermined read command from the personal computer (PC) 6 at any point of time, data is read from the history generation area and transmission data is generated and transmitted to the personal computer (PC) 6 as shown by the flowchart in FIG. 56B. Moreover, the personal computer (PC) 6 can be used for various purposes such as comparing a series of feedback times read from the basic module with a proper threshold value, determining the contact deterioration sate of a magnet switch to be handled by graphing the degree of the time-series change of the feedback times, and estimating the remaining time up to seizure.

Figure 58:
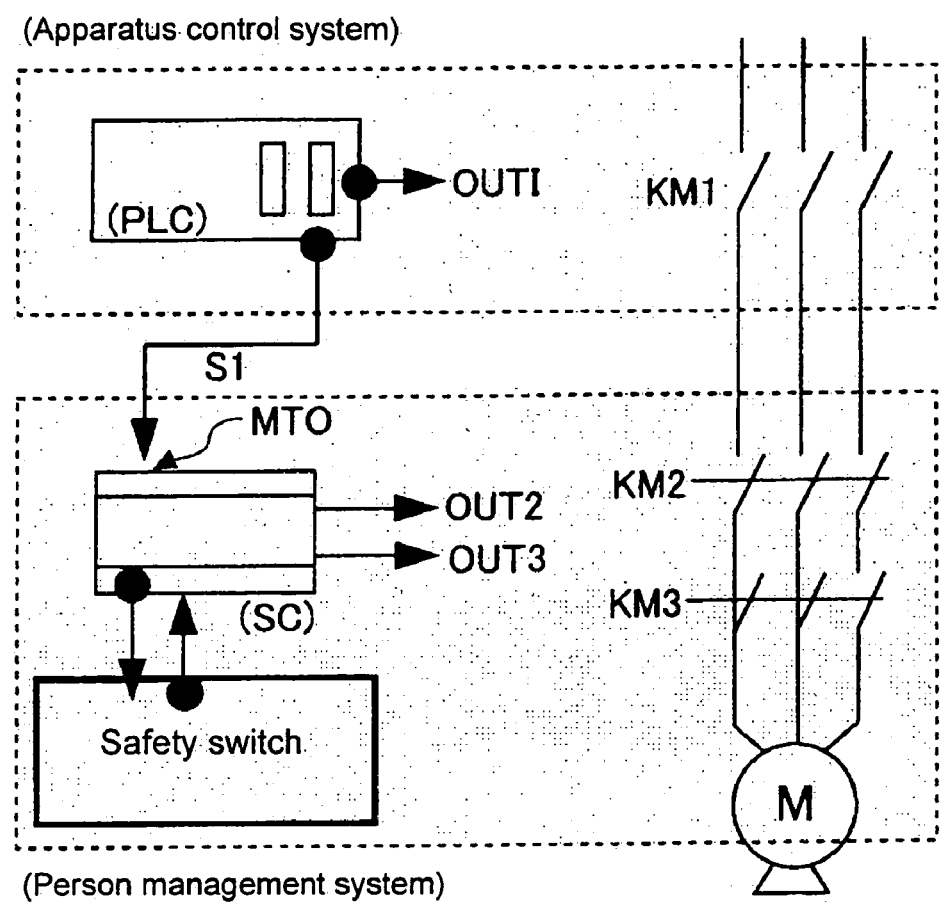
FIG. 58 shows an illustration (1) of a safety controller provided with an operation-state monitoring terminal.

FIG. 58 is an illustration (1) of a safety controller having an operation-state monitoring terminal. In the case of this example, by supplying a operation state signal S1 from a programmable controller (PLC) to a monitor terminal MT0 of a safety switch (SC) of the present invention, it is determined whether an apparatus to be controlled by the safety controller (SC) is operated. Moreover, when the PLC does not operate the apparatus to be controlled, contactors (KM2 and KM3) are prevented from being carelessly operated by the safety controller (SC) because the safety switch operates whenever a worker enters a dangerous area when maintenance or operation is stopped by not outputting a cutoff output OUT2 or OUT3 in accordance with a signal sent from the safety switch even if a dangerous state is determined. That is, the control system of the apparatus is controlled by the programmable controller (PLC) and a person management system is independently executed b the safety controller (SC). Thereby, as long as the control system of the apparatus is not in an active state, a cutoff output is not output from the safety controller even if a worker enters the dangerous area.

Figure 59A:
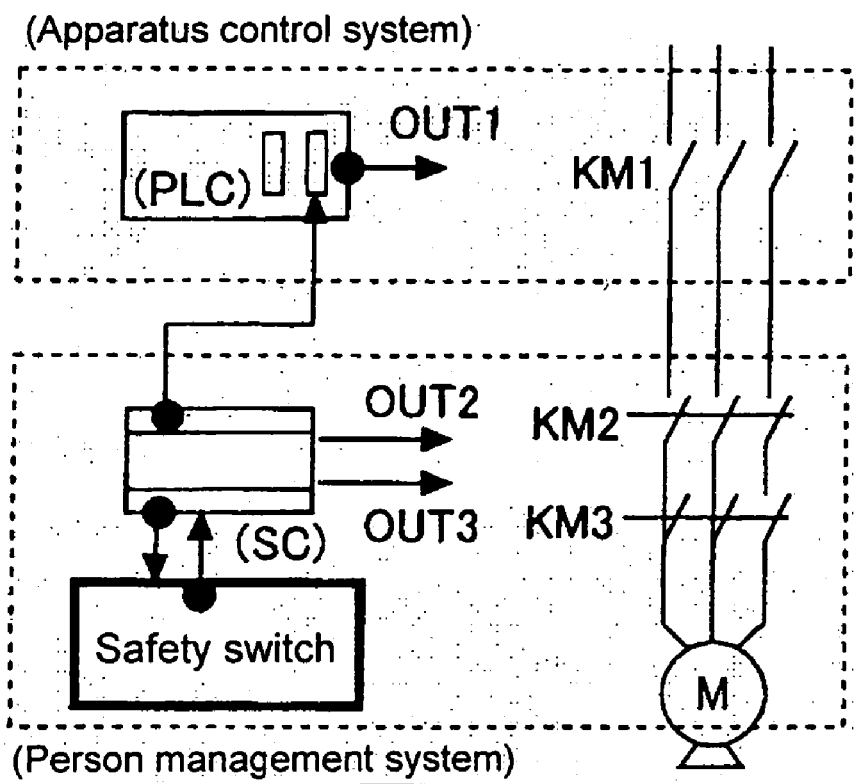
FIGS. 59A and 59B show illustrations (2) of a safety controller provided with an operation-state monitoring terminal.
Figure 59B:
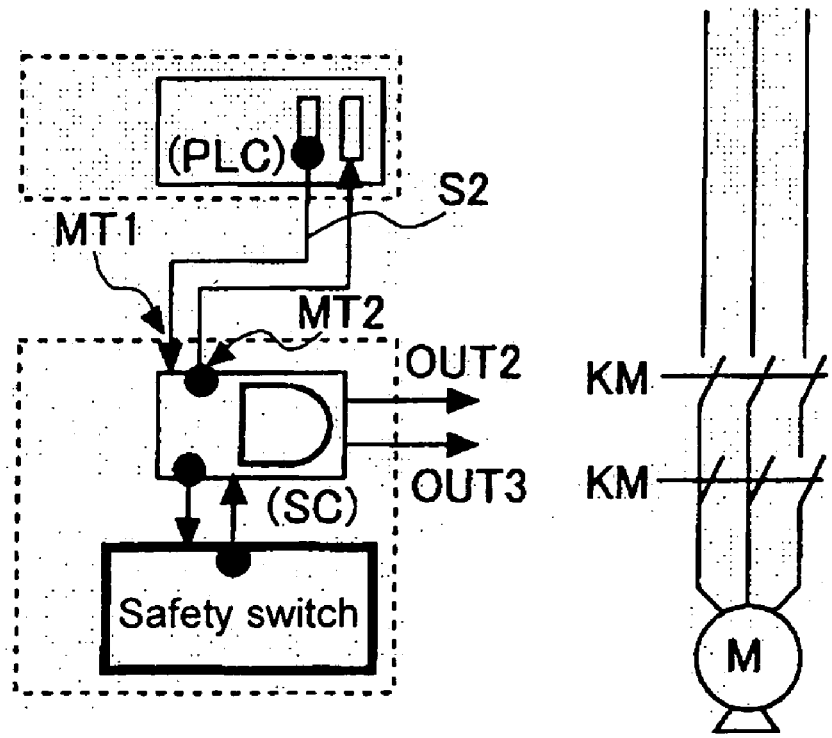

FIGS. 59A and 59B show illustrations (2) of a safety controller having an operation-state monitoring terminal. In the case of this example, as shown in FIG. 59A, magnet switches KM1, KM2, and KM3 are used for the control system and person management system of a conventional apparatus respectively and the switch KM1 is turned on/off by a programmable controller (PLC) and the switches KM2 and KM3 are turned on/off in accordance with outputs OUT2 and OUT3 of a safety controller (SC). As shown in FIG. 59B, however, it is possible to omit the cutoff switch KM1 of the control system of the apparatus by supplying an operation command signal S2 from the programmable controller (PLC) to the safety controller (SC), receiving the command by the monitor terminal (MT1) of the safety controller (SC), and applying an interlock so as not to output the cutoff output OUT2 or OUT3 when the programmable controller (PLC) is not operated.

FIGS. 60A and 60B show illustrations of solenoid cutoff using an input circuit. In the case of this example, by observing signals Ain and Bin while sending outputs Aout and Bout to the solenoid connection terminals E1 and E2 shown in FIG. 60A as shown by the time chart in FIG. 60B, it is possible to determine an electrification trouble and disconnection trouble of a solenoid SOL. This diagnosis processing can be performed at a proper timing, for example, immediately after power is turned on or during the diagnosis processing in the normal mode.

Finally, FIG. 61 shows an output control mode (1) of an operation program corresponding to each safety switch and FIG. 62 shows an output control mode (2) of the operation program.

FIG. 61A shows a mode of simultaneously turning off outputs of all output sections (OUTmain) of basic modules or outputs (OUT1 and OUT2) of all expansion output modules when it is determined that a safety switch is off in any one of input sections (INmain) of basic modules and two expansion modules (INadditional 1 and 2) under the control of the basic module (main).

The configuration shown in FIG. 61B instantaneously turns off the output section (OUTmain) of a basic module and the output section (OUT1) of a first expansion module and makes the output section (OUT2) of a second expansion module to execute off-ready output when it is determined that a safety switch is off in any one of the input section (INmain) of a basic module and two expansion input modules (INadditional 1 and 2) under the control of the basic module (main).

The configuration shown in FIG. 62A instantaneously turns off the output section (INmain) of a basic module when the input section (OUTmain) of a basic module determines that a safety switch is off under the control of the basic module (main) while instantaneously turning off output sections (OUT1 and OUT2) of expansion modules when it is determined that a safety switch is off in either of input sections (INadditional 1 and 2) of two expansion modules.

The configuration shown in FIG. 62B instantaneously turns off the output section (OUTmain) of a basic module and output sections (OUT1 and OUT2) of two expansion modules when the input section (INmain) of a basic module determines that a safety switch is off under the control of the basic module (main) and instantaneously turns off output sections (OUT1 and OUT2) of two expansion modules when either of input sections (INadditional 1 and 2) of two expansion modules determines that a safety switch is off.

Thus, it is possible to previously build various modes in the relation between an input determination result and an output control state of a safety switch constituting a safety operation program.

Because the safety operation program described above is fixedly built in when it is shipped from a factory, it cannot be changed or operated by a user. Therefore, by previously obtaining the approval of the safety standard also for export for Europe, even if a user performs setting corresponding to any safety switch, it is not necessary to obtain the approval of the safety standard each time after constructing a system.

As clarified from the above description, the present invention makes it possible to easily set a necessary operation program to any type of safety switch as long as the safety switch is one of a plurality of types of predetermined safety switches and moreover, it is not necessary to obtain the approval of the safety standard whenever building the program in a safety system even in the case of export to Europe or the like. Furthermore, according to the present invention, it is possible to construct a safety system including many safety switches or increase the number of safety switches in an existing safety system at a low cost in addition to the above mentioned.

What is claimed is:

1. A safety controller comprising:
    a basic module;
    one or more extension modules; and
    a mother board provided with an extension slot for connecting the modules by a bus;
    wherein
        an input extension module which is one of the extension modules includes one or more input terminal sections capable of connecting one or more safety switches and an input circuit for receiving safety input signals from one or more external input terminal sections,
        an output extension module which is one of the extension modules includes an external output terminal section which can be connected to an output control system of a dangerous source and an output circuit for transmitting a safety output signal to an external output terminal section, and
        the basic module has an operation program storing part for storing a safety operation program for defining the relation between the state of a safety input signal and the state of a safety output signal on each of types of predetermined safety switches, a type-of-switch setting part for setting an external input terminal section and the type of a safety switch to be connected to the external input terminal section, and an operation program executing part for selecting a safety operation program corresponding to the type of the switch set by the setting part among a plurality of safety operation programs stored in the operation program storing part and executing the program for the external input terminal section set by the setting part.

2. The safety controller according to claim 1, wherein the basic module also includes:
    one or more external input terminal sections capable of connecting to one or more safety switches;

an input circuit for receiving safety input signals from one or more external input terminal sections;

an external output terminal section which can be connected to an output control system of a dangerous source; and an output circuit for transmitting a safety output signal to the external output terminal section.

3. The safety controller according to claim 1, wherein the basic module includes a part for executing a diagnostic program for diagnosing whether a predetermined extension module is set to each extension slot by collating the module identifying information read from an extension slot on a mother board with the module identifying information set to the basic module.

4. The safety controller according to claim 1, wherein the basic module is further provided with:

troubleshooting-program storing part which stores a troubleshooting program for troubleshooting a safety switch connected to an external connection terminal section, and troubleshooting-program executing part which selects a troubleshooting program corresponding to the type of a switch set by setting part among a plurality of types of troubleshooting programs stored in the troubleshooting-program storing part and executes the selected program for an external input terminal section set by the setting part.

5. The safety controller according to claim 4, wherein the troubleshooting program corresponds to an electromagnetic-locking door switch having an unlocking solenoid includes a solenoid diagnosing function for troubleshooting the unlocking solenoid.

6. The safety controller according to claim 4, wherein the troubleshooting program includes a history generating function for making it possible to diagnose the contact deterioration of a safety switch in accordance with aging of the time difference between signals of two systems coming from a pair of interlocking contacts included in a safety switch.

7. The safety controller according to claim 4, wherein the troubleshooting program includes a history generating function for making it possible to diagnose the contact deterioration of a contactor in accordance with aging based on the time difference until a feedback signal comes from a contactor auxiliary contact after transmitting a safety output signal.

8. The safety controller according to claim 1, wherein the basic module includes a part for executing an output monitoring program for monitoring the state of a contactor constituting the output control system of a dangerous source in accordance with a contactor auxiliary-contact signal received from a feedback input terminal set to the basic module or an extension module.

9. The safety controller according to claim 1, wherein the basic module includes a part for executing an interlocking program for controlling the propriety of an output operation which is an execution result of the safety operation program in accordance with a PLC operation state signal received from a PLC operation state input terminal set to the basic module or an extension module.

10. A safety system comprising the safety controller of claim 1 and one or more safety switches connected to the safety controller.

11. The safety controller according to claim 1, wherein an emergency stop switch is included as a predetermined type of safety switch, and a safety operation program corresponding to the emergency stop switch executes:

a first step of detecting a short circuit, disconnection, or discontinuity of each system by supplying output signals of two systems having on- and off-signals to the external terminal section of an input expansion module whose set switch type is an emergency stop switch through the bus connection, capturing input signals of two systems from emergency stop switches corresponding to the output signals respectively through a break contact, and confirming whether the input signals correspond to the output signals respectively and on- and off-signals can be obtained;

a second step of detecting a disconnection or discontinuity in either of input circuits of two systems by supplying an on-signal to each of input circuits of two systems for capturing the input signals of two systems, confirming whether on-signals can be obtained from the input circuits and/or supplying an off-signal to the input circuits, and confirming whether off-signals can be obtained from the input circuits; and a third step of confirming that a short circuit does not occur between two systems by outputting on- and off-signals to the output signals of two systems at timings reverse to each other, capturing input signals kept in the corresponding relation reverse to the corresponding relation in the first step; and a fourth step of transmitting a safety output signal to the external output terminal of the output expansion module through the bus connection and the output circuit when at least either of the two systems encounters a discontinuity in the first step, a disconnection or discontinuity occurs at least in either of the two systems in the second step, or a short circuit occurs between the two systems in the third step.

12. The safety controller according to claim 1, wherein a mat switch is included as a predetermined type of safety switch, and a safety operation program corresponding to the mat switch executes:

a fifth step of detecting a continuity, disconnection, or erroneous wiring of each system by supplying output signals of two systems having on- and off-signals to the external input terminal section of an input expansion module whose set switch type is the mat switch through the bus connection at the timing in which the signals of two systems do not overlap each other, capturing input signals of two system from mat switches corresponding to output signals respectively, and confirming whether on- and off-signals can be obtained correspondingly to the output signals;

a sixth step of detecting a disconnection or discontinuity in either of input circuits of two systems by supplying an on-signal to input circuits of two systems for capturing the input signals of two systems, confirming whether on-signals can be obtained from the input circuits and/or supplying an off-signal to an input circuit, and confirming whether off-signals can be obtained from the input circuit;

a seventh step of detecting a continuity or discontinuity between two systems by outputting on- and off-signals to the output signals of two systems at timings reverse to each other, capturing input signals kept in the corresponding relation reverse to the corresponding relation in the first step, and confirming that the supplied on-output signals are not obtained as input signals; and an eighth step of transmitting a safety output signal to the external output terminal of the output expansion module through the bus connection and the output circuit when at least either of the two systems detects a disconnection or erroneous wiring in the fifth step, a disconnection or discontinuity occurs in at least either of input circuits of two systems in the sixth step, or a discontinuity occurs between the two systems in the seventh step.

13. The safety controller according to claim 1, wherein a two-hand-control switch is included as a predetermined type of safety switch, and a safety operation program corresponding to the two-hand-control switch executes:

a ninth step of detecting that the two-hand-control switch is correctly operated by supplying output signals of two systems which are on-signals to the external input terminal of an input expansion module whose set switch type is a two-hand-control switch through the bus connection, capturing input signals of two systems through make contacts of two-hand-control switches corresponding to the output signals respectively, and confirming whether the input signals of two systems are turned on within a predetermined time;

a tenth step of detecting a disconnection or discontinuity in input circuits of two systems for capturing the input signals of two systems by supplying an on-signal to the input circuits, confirming whether on-signals can be obtained from the input circuits and/or supplying an off-signal to the input circuits, and confirming whether the off-signal can be obtained from the input circuits;

an eleventh step of confirming that a short circuit does not occur between two systems by outputting on- and off-signals to the output signals of two systems at timings reverse to each other, capturing input signals kept in the corresponding relation reverse to the corresponding relation in the first step, and confirming that the supplied on-signals are not obtained as input signals; and a twelfth step of transmitting a safety output signal to the external output terminal of the output expansion module through the bus connection and the output circuit when it is detected that the two-hand-control switch is correctly operated in the ninth step, a disconnection or discontinuity occurs in either of the circuits of two systems in the tenth step, or a short circuit occurs between the two systems in the eleventh step.

14. The safety controller according to claim 1, wherein a light curtain is included as a predetermined type of safety switch, and a safety operation program corresponding to the light curtain executes;

a thirteenth step of detecting that the light curtain is interrupted from light when input signals of two systems sent from the light curtain are captured from the external input terminal of an input expansion module whose set switch type is the light curtain through the bus connection to obtain an off-signal;

a fourteenth step of detecting a disconnection or discontinuity in input circuits of two systems by supplying an on-signal to input circuits of two systems for capturing the input signals of two systems, confirming whether on-signals can be obtained from the input circuits and/or supplying an off-signal to an input circuit, and confirming whether off-signals can be obtained from the input circuits; and a fifteenth step of transmitting a safety output signal to the external output terminal of the output expansion module through the bus connection and the output circuit when the light interrupted state of the light curtain is detected by detecting an off-signal by at least either of the two systems in the thirteenth step or a disconnection or discontinuity occurs in either of the input circuits of two systems in the fourteenth step.

* * * * *